(12) United States Patent
Sen et al.

(10) Patent No.: US 12,462,815 B2
(45) Date of Patent: Nov. 4, 2025

(54) SYNCHRONIZING ENHANCED AUDIO TRANSPORTS WITH BACKWARD COMPATIBLE AUDIO TRANSPORTS

(71) Applicant: QUALCOMM Incorporated, San Diego, CA (US)

(72) Inventors: Dipanjan Sen, Dublin, CA (US); Shankar Thagadur Shivappa, San Diego, CA (US); Nils Günther Peters, San Diego, CA (US); Ferdinando Olivieri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 593 days.

(21) Appl. No.: 16/450,682

(22) Filed: Jun. 24, 2019

(65) Prior Publication Data

US 2020/0013426 A1   Jan. 9, 2020

Related U.S. Application Data

(60) Provisional application No. 62/693,784, filed on Jul. 3, 2018.

(51) Int. Cl.
*G10L 19/008* (2013.01)
*G10L 21/055* (2013.01)
*H04L 65/80* (2022.01)

(52) U.S. Cl.
CPC .......... *G10L 19/008* (2013.01); *G10L 21/055* (2013.01); *H04L 65/80* (2013.01)

(58) Field of Classification Search
CPC ..... G10L 21/055; G10L 19/18; G10L 19/167; G10L 19/008; G10L 19/16; H04L 65/80; H04L 65/601; H04L 29/06
(Continued)

(56) References Cited

U.S. PATENT DOCUMENTS 6,226,616 B1 * 5/2001 You ...................... G10L 19/008
704/500
9,288,603 B2    3/2016 Sen et al.
(Continued)

FOREIGN PATENT DOCUMENTS

CN       1357136 A       7/2002
CN       1976448 A       6/2007
WO       2018089352 A2   5/2018

OTHER PUBLICATIONS

Dolby Laboratories Inc: "Encoding First-Order Ambisonics with HE-AAC", 3GPP TSG-SA4 Meeting #95, S4-170937, Belgrade, Serbia, Oct. 9-13, 2017, 7 pages.
(Continued)

*Primary Examiner* — Tonia L Dollinger
*Assistant Examiner* — Mehulkumar J Shah
(74) *Attorney, Agent, or Firm* — QUALCOMM Incorporated; Espartaco Diaz Hidalgo

(57) ABSTRACT

In general, techniques are described by which to synchronize enhanced audio transports with backward compatible audio transports. A device comprising a memory and one or more processors may be configured to perform the techniques. The memory may store a backward compatible bitstream conforming to a legacy transport format. The processor may obtain, from the backward compatible bitstream, a first audio transport stream, and obtain, from the backward compatible bitstream, a second audio transport stream. The processor(s) may also obtain, from the backward compatible bitstream, indications representative of synchronization information for the first audio transport stream and the second audio transport stream. The processor(s) may synchronize, based on the indications, the first audio transport stream and the second audio transport to obtain synchronized audio data stream. The processor(s) may obtain, based
(Continued)

the synchronized audio data, enhanced audio data, and output the enhanced audio data to one or more speakers.

28 Claims, 19 Drawing Sheets

(58) Field of Classification Search
USPC .......................................................... 704/201
See application file for complete search history.

(56) References Cited

U.S. PATENT DOCUMENTS

| | | | |
|---|---|---|---|
| 9,609,452 | B2 | 3/2017 | Peters et al. |
| 9,788,133 | B2 | 10/2017 | Sen et al. |
| 9,883,310 | B2 | 1/2018 | Peters et al. |
| 11,212,333 | B1* | 12/2021 | Duffy ...................... H04L 65/65 |
| 2006/0034375 | A1* | 2/2006 | Ward .................. H04N 21/2365 |
| | | | 375/240.28 |
| 2007/0121620 | A1* | 5/2007 | Yang ................ H04N 21/43072 |
| | | | 375/E7.278 |
| 2007/0208571 | A1* | 9/2007 | Lemieux ............... G10L 19/167 |
| | | | 704/500 |
| 2009/0046815 | A1 | 2/2009 | Oh et al. |
| 2011/0110436 | A1* | 5/2011 | Schierl ............... H04N 21/4305 |
| | | | 375/E7.2 |
| 2011/0249821 | A1 | 10/2011 | Jaillet et al. |
| 2014/0016784 | A1* | 1/2014 | Sen ....................... H04L 65/605 |
| | | | 381/17 |
| 2014/0016787 | A1 | 1/2014 | Neuendorf et al. |
| 2014/0126651 | A1* | 5/2014 | Erickson ................ H04N 19/44 |
| | | | 375/240.25 |
| 2015/0281746 | A1* | 10/2015 | Lam .................. H04N 21/23605 |
| | | | 725/116 |
| 2015/0348558 | A1* | 12/2015 | Riedmiller ............ G10L 19/167 |
| | | | 704/500 |
| 2018/0025738 | A1 | 1/2018 | Villemoes et al. |
| 2019/0007781 | A1 | 1/2019 | Peters et al. |
| 2019/0349676 | A1* | 11/2019 | Chen ...................... H04R 3/005 |
| 2019/0392845 | A1 | 12/2019 | Peters et al. |
| 2019/0392846 | A1 | 12/2019 | Kim et al. |

OTHER PUBLICATIONS

Peterson J., et al., "Virtual Reality, Augmented Reality, and Mixed Reality Definitions", EMA, version 1.0, Jul. 7, 2017, 4 Pages.
WG11: "Proposed Draft 1.0 of TR: Technical Report on Architectures for Immersive Media", ISO/IEC JTC1/SC29/WG11/N17685, San Diego, US, Apr. 2018, 14 pages.
Audio, "Call for Proposals for 3D Audio," International Organisation for Standardisation Organisation Internationale de Normalisation ISO/IEC JTC1/SC29/WG11 Coding of Moving Pictures and Audio, ISO/IEC JTC1/SC29/WG11/N13411, Geneva, Jan. 2013, pp. 1-20.
Audio Subgroup: "White Paper on AAC Transport Formats", ISO/IEC JTC1/SC29/WG11 N14751, Jul. 2014, 11 pages.
Dolby Laboratories Inc: "Draft CR to TR 26.918 on Encoding First-Order Ambisonics with HE-AAC", 3GPP TSG-SA4 Meeting #96, S4-171234, Albuquerque, NM, USA, Nov. 13-17, 2017, 9 pages.
DVB Organization: "TM-AVC1097r9_TS-101-154-v241DTS-UHD.docx", DVB, Digital Video Broadcasting, C/O EBU—17A Ancienne Route—CH-1218 Grand Saconnex, Geneva—Switzerland, Jun. 2, 2018 (Jun. 2, 2018), ETSI TS 1 01 154 V2.4.1, XP017855897, pp. 1-299.
ETSI TS 103 589 V1.1.1, "Higher Order Ambisonics (HOA) Transport Format", Jun. 2018, 33 pages.
Fersch C., et al., "Proposed Updates to MPEG-4", 118. MPEG Meeting; Apr. 3, 2017-Apr. 7, 2017; Hobart; (Motion Picture Expert Group or ISO/IEC JTC1/SC29/WG11), No. m40511, Apr. 5, 2017 (Apr. 5, 2017), pp. 1-20, XP030068856, Section 7.3.1; Figure 1.

Hellerud E., et al., "Encoding Higher Order Ambisonics with AAC", Audio Engineering Society—124th Audio Engineering Society Convention 2008, AES, 60 East 42nd Street, Room 2520, New York 10165-2520, USA, May 1, 2008, pp. 1-8, XP040508582, abstract, figure 1.
Herre, et al., "MPEG-H 3D Audio—The New Standard for Coding of Immersive Spatial Audio," IEEE Journal of Selected Topics in Signal Processing, vol. 9, No. 5, Aug. 2015, pp. 770-779.
Hollerweger F., "An Introduction to Higher Order Ambisonic," Oct. 2008, pp. 13, Accessed online [Jul. 8, 2013] at <URL: flo.mur.at/writings/HOA-intro.pdf>.
"Information technology—High Efficiency Coding and Media Delivery in Heterogeneous Environments—Part 3: 3D Audio," ISO/IEC JTC 1/SC 29/WG11, ISO/IEC 23008-3, 201x(E), Oct. 12, 2016, 797 Pages.
"Information technology—High efficiency coding and media delivery in heterogeneous environments—Part 3: Part 3: 3D Audio, Amendment 3: MPEG-H 3D Audio Phase 2," ISO/IEC JTC 1/SC 29N, ISO/IEC 23008-3:2015/PDAM 3, Jul. 25, 2015, 208 pp.
"Information technology—High efficiency coding and media delivery in heterogeneous environments—Part 3: 3D Audio," ISO/IEC JTC 1/SC 29N, Apr. 4, 2014, 337 pp.
International Search Report and Written Opinion—PCT/US2019/039029—ISA/EPO—Aug. 20, 2019.
Wikipedia: "MP3", Retrieved from the Internet: https://en.wikipedia.org/wiki/MP3, Nov. 5, 2019, 20 pages.
ISO/IEC 14496-3:2009(E), Information technology—Coding of audio-visual objects—Part 3: Audio, Fourth edition Sep. 1, 2009, 1416 pages.
ISO/IEC DIS 23008-3 Information Technology—High Efficiency coding and media delivery in heterogeneous environments—Part 3: 3D audio, Jul. 25, 2014 (Jul. 25, 2014), XP055205625, Retrieved from the Internet URL: http://mpeg.chiariglione.org/standards/mpeg-h/3d-audio/dis-mpeg-h-3d-audio [retrieved on Jul. 30, 2015], 433 pages.
ISO/IEC JTC 1/SC 29 N 14455; ISO/IEC CD 23003-4:2014E; Information technology—MPEG audio technologies—Part 4: Dynamic range control, Apr. 9, 2014, 73 pages.
"MPEG-4 Audio Third Edition", 72. MPEG Meeting; Apr. 18, 2005-Apr. 22, 2005; Susan; (Motion Picture Expert Group or ISO/IEC JTC1/SC29/WG11), No. N7129, Jul. 13, 2005 (Jul. 13, 2005), pp. 1-120, XP030013787, second paragraph of section 1.6.5.4.
Poletti M., "Three-Dimensional Surround Sound Systems Based on Spherical Harmonics," The Journal of the Audio Engineering Society, vol. 53, No. 11, Nov. 2005, pp. 1004-1025.
Riedmiller J., et al., "Delivering Scalable Audio Experiences Using AC-4", IEEE Transactions on Broadcasting, vol. 63, No. 1, Mar. 1, 2017 (Mar. 1, 2017), pp. 179-201, XP055611935, US, ISSN: 0018-9316. DOI: 10.1109/TBC.2017.2659623, sections II.A, II.E, III, IX.B, IX.C, X.B, XII.A XIV.A, XIV.C.
Schonefeld V., "Spherical Harmonics," Jul. 1, 2005, XP002599101, 25 Pages, Accessed online [Jul. 9, 2013] at URL:http://videoarch1.s-inf.de/~volker/prosem_paper.pdf.
Sen D., et al., "RM1-HOA Working Draft Text", 107. MPEG Meeting; Jan. 13, 2014-Jan. 17, 2014; San Jose; (Motion Picture Expert Group or ISO/IEC JTC1/SC29/WG11), No. m31827, Jan. 11, 2014 (Jan. 11, 2014), 83 Pages, XP030060280.
Sen D., et al., "Technical Description of the Qualcomm's HoA Coding Technology for Phase II", 109. MPEG Meeting; Jul. 7, 2014-Jul. 11, 2014; Sapporo; (Motion Picture Expert Group or ISO/IEC JTC1/SC29/WG11), No. m34104, Jul. 2, 2014 (Jul. 2, 2014), XP030062477, figure 1.
U.S. Appl. No. 16/450,698, filed Jun. 24, 2019, 90 pages.
Wikipedia: "Advanced Audio Coding", Retrieved from the Internet on: https://en.wikipedia.org/wiki/Advanced_Audio_Coding, Nov. 5, 2019, 15 pages.
Wikipedia: "Comparison of Audio Coding Formats", Retrieved from the Internet: https://en.wikipedia.org/wiki/Comparison_of_audio_coding_formats, Nov. 5, 2019, 12 pages.

(56) References Cited

OTHER PUBLICATIONS

ETSI TS 102 114: "DTS Coherent Acoustics; Core and Extensions with Additional Profiles", ETSI TS 102 114 V1.6.1 (Aug. 2019), pp. 1-298.

* cited by examiner

| ADTS_FRAME_1 407A | HEADER 319 | ADTS_FRAME_2 407B | ••• | ADTS_FRAME_M 407M | METADATA 317 |

FIG. 7A

| ADTS_FRAME_1 407A | HEADER 319 | FILL_ELE_1 350A | ADTS_FRAME_2 407B | FILL_ELE_2 350B | ••• | FILL_ELE_3 350C | ADTS_FRAME_M 407M | FILL_ELE_4 350D | METADATA 317 | 5 |

FIG. 7B

SYNCHRONIZING ENHANCED AUDIO TRANSPORTS WITH BACKWARD COMPATIBLE AUDIO TRANSPORTS This application claims the benefit of U.S. Provisional Application Ser. No. 62/693,784, filed Jul. 3, 2018, the entire contents of each being incorporated by reference as if set forth in their entirety herein.

TECHNICAL FIELD

This disclosure relates to processing audio data.

BACKGROUND

A higher order ambisonic (HOA) signal (often represented by a plurality of spherical harmonic coefficients (SHC) or other hierarchical elements) is a three-dimensional (3D) representation of a soundfield. The HOA or SHC representation may represent this soundfield in a manner that is independent of the local speaker geometry used to play back a multi-channel audio signal rendered from this SHC signal. The SHC signal may also facilitate backwards compatibility as the SHC signal may be rendered to well-known and highly adopted multi-channel formats, such as a 5.1 audio channel format or a 7.1 audio channel format. The SHC representation may therefore enable a better representation of a soundfield that also accommodates backward compatibility.

SUMMARY

This disclosure relates generally to generating a backward compatible bitstream having embedded enhanced audio transports that may allow for higher resolution reproduction of a soundfield represented by the enhanced audio transports (relative to legacy audio transports that conform to legacy audio formats, such as mono audio formats, stereo audio formats, and potentially even some surround sound formats, including a 5.1 surround sound format as one example). Legacy audio playback systems that are configured to reproduce the soundfield using one or more of the legacy audio formats may process the backward compatible bitstream, thereby maintaining backwards compatibility.

Enhanced audio playback systems that are configured to reproduce the soundfield using enhanced audio formats (such as some surround sound formats, including, as one example, a 7.1 surround sound format, or a 7.1 surround sound format plus one or more height-based audio sources—7.1+4H) may utilize the enhanced audio transports to enhance, or in other words, extend the legacy audio transport to support enhanced reproduction of the soundfield. As such, the techniques may enable backward compatible audio bitstreams that support both legacy audio formats and enhanced audio formats.

Further aspects of the techniques may enable synchronization between the enhanced audio transports and legacy audio transports to ensure proper reproduction of the soundfield. Various aspects of the time synchronization techniques may enable the enhanced audio playback systems to identify audio portions of the legacy audio transports that correspond to portions of the enhanced audio transports. The enhanced audio playback systems may then enhance or otherwise extend, based on the corresponding portions of the enhanced audio transports, the portions of the legacy audio transports in a manner that does not inject or otherwise result in audio artifacts.

In this respect, the techniques may facilitate backward compatibility that enables the legacy audio playback systems to remain in use while also promoting adoption of enhanced audio formats that may improve the resolution of soundfield reproduction relative to soundfield reproduction achieved via the legacy audio formats. Promoting adoption of the enhanced audio formats may result in more immersive audio experiences without rendering obsolete the legacy audio systems. The techniques may therefore maintain the legacy audio playback systems ability to reproduce the soundfield, thereby improving or at least maintaining the legacy audio playback systems, while also enabling the evolution of soundfield reproduction through use of the enhanced audio playback systems. As such, the techniques improve the operation of both the legacy audio playback systems and the enhanced audio playback systems themselves.

In one example, the techniques are directed to a device configured to process a backward compatible bitstream, the device comprising: one or more memories configured to store at least a portion of the backward compatible bitstream, the backward compatible bitstream conforming to a legacy transport format; and one or more processors configured to: obtain, from the backward compatible bitstream, legacy audio data that conforms to a legacy audio format; obtain, from the backward compatible bitstream, extended audio data that enhances the legacy audio data; obtain, based on the legacy audio data and the extended audio data, enhanced audio data that conforms to an enhanced audio format; and output the enhanced audio data to one or more speakers.

In another example, the techniques are directed to a method of processing a backward compatible bitstream conforming to a legacy transport format, the method comprising: obtaining, from the backward compatible bitstream, legacy audio data that conforms to a legacy audio format; obtaining, from the backward compatible bitstream, extended audio data that enhances the legacy audio data; obtaining, based on the legacy audio data and the extended audio data, enhanced audio data that conforms to an enhanced audio format; and outputting the enhanced audio data to one or more speakers.

In another example, the techniques are directed to a device configured to process a backward compatible bitstream conforming to a legacy transport format, the device comprising: means for obtaining, from the backward compatible bitstream, legacy audio data that conforms to a legacy audio format; means for obtaining, from the backward compatible bitstream, extended audio data that enhances the legacy audio data; means for obtaining, based on the legacy audio data and the extended audio data, enhanced audio data that conforms to an enhanced audio format; and means for outputting the enhanced audio data to one or more speakers.

In another example, the techniques are directed to a non-transitory computer-readable storage medium having stored thereon instructions that, when executed, cause one or more processors to: obtain, from a backward compatible bitstream that conforms to a legacy transport format, legacy audio data that conforms to a legacy audio format; obtain, from the backward compatible bitstream, extended audio data that enhances the legacy audio data; obtain, based on the legacy audio data and the extended audio data, enhanced audio data that conforms to an enhanced audio format; and output the enhanced audio data to one or more speakers.

In another example, the techniques are directed to a device configured to obtain a backward compatible bitstream, the device comprising: one or more memories configured to store at least a portion of the backward compatible bitstream, the backward compatible bitstream conforming to a legacy transport format; and one or more processors configured to: specify, in the backward compatible bitstream, legacy audio data that conforms to a legacy audio format; specify, in the backward compatible bitstream, extended audio data that enhances the legacy audio data; and output the bitstream.

In another example, the techniques are directed to a method of processing a backward compatible bitstream conforming to a legacy transport format, the method comprising: specifying, in the backward compatible bitstream, legacy audio data that conforms to a legacy audio format; specifying, in the backward compatible bitstream, extended audio data that enhances the legacy audio data; and outputting the backward compatible bitstream.

In another example, the techniques are directed to a device configured to process a backward compatible bitstream conforming to a legacy transport format, the device comprising: means for specifying, in the backward compatible bitstream, legacy audio data that conforms to a legacy audio format; means for specifying, in the backward compatible bitstream, extended audio data that enhances the legacy audio data; and means for outputting the backward compatible bitstream.

In another example, the techniques are directed to a non-transitory computer-readable storage medium having stored thereon instructions that, when executed, cause one or more processors to: specify, in a backward compatible bitstream that conforms to a legacy transport format, legacy audio data that conforms to a legacy audio format; specify, in the backward compatible bitstream, extended audio data that enhances the legacy audio data; and output the backward compatible bitstream.

In another example, the techniques are directed to a device configured to process a backward compatible bitstream, the device comprising: one or more memories configured to store at least a portion of the backward compatible bitstream, the backward compatible bitstream conforming to a legacy transport format; and one or more processors configured to: obtain, from the backward compatible bitstream, a first audio transport stream representative of first audio data; obtain, from the backward compatible bitstream, a second audio transport stream representative of second audio data; obtain, from the backward compatible bitstream, one or more indications representative of synchronization information for one or more of the first audio transport stream and the second audio transport stream; synchronize, based on the one or more indications representative of the synchronization information, the first audio transport stream and the second audio transport to obtain synchronized audio data stream; obtain, based the synchronized audio data, enhanced audio data; and output the enhanced audio data to one or more speakers.

In another example, the techniques are directed to a method of processing a backward compatible bitstream conforming to a legacy transport format, the method comprising: obtaining, from the backward compatible bitstream, a first audio transport stream representative of first audio data; obtaining, from the backward compatible bitstream, a second audio transport stream representative of second audio data; obtaining, from the backward compatible bitstream, one or more indications identifying synchronization information for one or more of the first audio transport stream and the second audio transport stream; synchronizing, based on the one or more indications representative of the synchronization information, the first audio transport stream and the second audio transport to obtain synchronized audio data stream; obtaining, based the synchronized audio data, enhanced audio data; and outputting the enhanced audio data to one or more speakers.

In another example, the techniques are directed to a device configured to process a backward compatible bitstream conforming to a legacy transport format, the device comprising: means for obtaining, from the backward compatible bitstream, a first audio transport stream representative of first audio data; means for obtaining, from the backward compatible bitstream, a second audio transport stream representative of second audio data; means for obtaining, from the backward compatible bitstream, one or more indications identifying synchronization information for one or more of the first audio transport stream and the second audio transport stream; means for synchronizing, based on the one or more indications of the synchronization information, the first audio transport stream and the second audio transport to obtain synchronized audio data stream; means for obtaining, based the synchronized audio data, enhanced audio data; and means for outputting the enhanced audio data to one or more speakers.

In another example, the techniques are directed to a non-transitory computer-readable storage medium having stored thereon instructions that, when executed, cause one or more processors to: obtain, from a backward compatible bitstream conforming to a legacy transport format, a first audio transport stream representative of first audio data; obtain, from the backward compatible bitstream, a second audio transport stream representative of second audio data; obtain, from the backward compatible bitstream, one or more indications identifying synchronization information for one or more of the first audio transport stream and the second audio transport stream; synchronize, based on the one or more indications of the synchronization information, the first audio transport stream and the second audio transport to obtain synchronized audio data stream; obtain, based the synchronized audio data, enhanced audio data; and output the enhanced audio data to one or more speakers.

In another example, the techniques are directed to a device configured to obtain a backward compatible bitstream, the device comprising: one or more memories configured to store at least a portion of the backward compatible bitstream, the backward compatible bitstream conforming to a legacy transport format; and one or more processors configured to: specify, in the backward compatible bitstream, a first audio transport stream representative of first audio data; specify, in the backward compatible bitstream, a second audio transport stream representative of second audio data; specify, in the backward compatible bitstream, one or more indications identifying synchronization information relative to the first audio transport stream and the second audio transport stream; and output the backward compatible bitstream.

In another example, the techniques are directed to a method of obtaining a backward compatible bitstream conforming to a legacy transport format, the method comprising: specifying, in the backward compatible bitstream, a first audio transport stream representative of first audio data; specifying, in the backward compatible bitstream, a second audio transport stream representative of second audio data; specifying, in the backward compatible bitstream, one or more indications identifying synchronization information relative to the first audio transport stream and the second audio transport stream; and outputting the backward compatible bitstream.

In another example, the techniques are directed to a device configured to obtain a backward compatible bitstream conforming to a legacy transport format, the device comprising: means for specifying, in the backward compatible bitstream, a first audio transport stream representative of first audio data; means for specifying, in the backward compatible bitstream, a second audio transport stream representative of second audio data; means for specifying, in the backward compatible bitstream, one or more indications identifying synchronization information relative to the first audio transport stream and the second audio transport stream; and means for outputting the backward compatible bitstream.

In another example, the techniques are directed to a non-transitory computer-readable storage medium having stored thereon instructions that, when executed, cause one or more processors to: specify, in a backward compatible bitstream conforming to a legacy transport format, a first audio transport stream representative of first audio data; specify, in the backward compatible bitstream, a second audio transport stream representative of second audio data; specify, in the backward compatible bitstream, one or more indications identifying synchronization information relative to the first audio transport stream and the second audio transport stream; and output the backward compatible bitstream.

In another example, the techniques are directed to a device configured to process a backward compatible bitstream, the device comprising: one or more memories configured to store at least a portion of the backward compatible bitstream, the backward compatible bitstream conforming to a legacy transport format; and one or more processors configured to: obtain, from the backward compatible bitstream, legacy audio data that conforms to a legacy audio format; obtain, from the backward compatible bitstream, a spatially formatted extended audio stream; process the spatially formatted extended audio stream to obtain extended audio data that enhances the legacy audio data; obtain, based on the legacy audio data and the extended audio data, enhanced audio data that conforms to an enhanced audio format; and output the enhanced audio data to one or more speakers.

In another example, the techniques are directed to a method of processing a backward compatible bitstream conforming to a legacy transport format, the method comprising: obtaining, from the backward compatible bitstream, legacy audio data that conforms to a legacy audio format; obtaining, from the backward compatible bitstream, a spatially formatted extended audio stream; processing the spatially formatted extended audio stream to obtain extended audio data that enhances the legacy audio data; obtaining, based on the legacy audio data and the extended audio data, enhanced audio data that conforms to an enhanced audio format; and outputting the enhanced audio data to one or more speakers.

In another example, the techniques are directed to a device configured to process a backward compatible bitstream conforming to a legacy transport format, the device comprising: means for obtaining, from the backward compatible bitstream, legacy audio data that conforms to a legacy audio format; means for obtaining, from the backward compatible bitstream, a spatially formatted extended audio stream; means for processing the spatially formatted extended audio stream to obtain extended audio data that enhances the legacy audio data; means for obtaining, based on the legacy audio data and the extended audio data, enhanced audio data that conforms to an enhanced audio format; and means for outputting the enhanced audio data to one or more speakers.

In another example, the techniques are directed to a non-transitory computer-readable storage medium having stored thereon instructions that, when executed, cause one or more processors to: obtain, from a backward compatible bitstream that conforms to a legacy transport format, legacy audio data that conforms to a legacy audio format; obtain, from the backward compatible bitstream, a spatially formatted extended audio stream; process the spatially formatted extended audio stream to obtain extended audio data that enhances the legacy audio data; obtain, based on the legacy audio data and the extended audio data, enhanced audio data that conforms to an enhanced audio format; and output the enhanced audio data to one or more speakers.

In another example, the techniques are directed to a device configured to obtain a backward compatible bitstream, the device comprising: one or more memories configured to store at least a portion of the backward compatible bitstream, the backward compatible bitstream conforming to a legacy transport format; and one or more processors configured to: specify, in the backward compatible bitstream, legacy audio data that conforms to a legacy audio format; process extended audio data that enhances the legacy audio data to obtain a spatially formatted extended audio stream; specify, in the backward compatible bitstream, the spatially formatted extended audio stream; and output the bitstream.

In another example, the techniques are directed to a method of processing a backward compatible bitstream conforming to a legacy transport format, the method comprising: specifying, in the backward compatible bitstream, legacy audio data that conforms to a legacy audio format; processing extended audio data that enhances the legacy audio data to obtain a spatially formatted extended audio stream; specifying, in the backward compatible bitstream, the spatially formatted extended audio stream; and outputting the bitstream.

In another example, the techniques are directed to a device configured to process a backward compatible bitstream conforming to a legacy transport format, the device comprising: means for specifying, in the backward compatible bitstream, legacy audio data that conforms to a legacy audio format; means for processing extended audio data that enhances the legacy audio data to obtain a spatially formatted extended audio stream; means for specifying, in the backward compatible bitstream, the spatially formatted extended audio stream; and means for outputting the bitstream.

In another example, the techniques are directed to a non-transitory computer-readable storage medium having stored thereon instructions that, when executed, cause one or more processors to: specify, in a backward compatible bitstream that conforms to a legacy transport format, legacy audio data that conforms to a legacy audio format; process extended audio data that enhances the legacy audio data to obtain a spatially formatted extended audio stream; specify, in the backward compatible bitstream, the spatially formatted extended audio stream; and output the bitstream.

The details of one or more examples of this disclosure are set forth in the accompanying drawings and the description below. Other features, objects, and advantages of various aspects of the techniques will be apparent from the description and drawings, and from the claims.

BRIEF DESCRIPTION OF DRAWINGS

FIGS. 7A and 7B are diagrams illustrating how the bitstream of FIG. 2 may be arranged to enable backwards compatibility and extensibility in accordance with various aspects of the techniques described in this disclosure.

DETAILED DESCRIPTION

Figure 1:
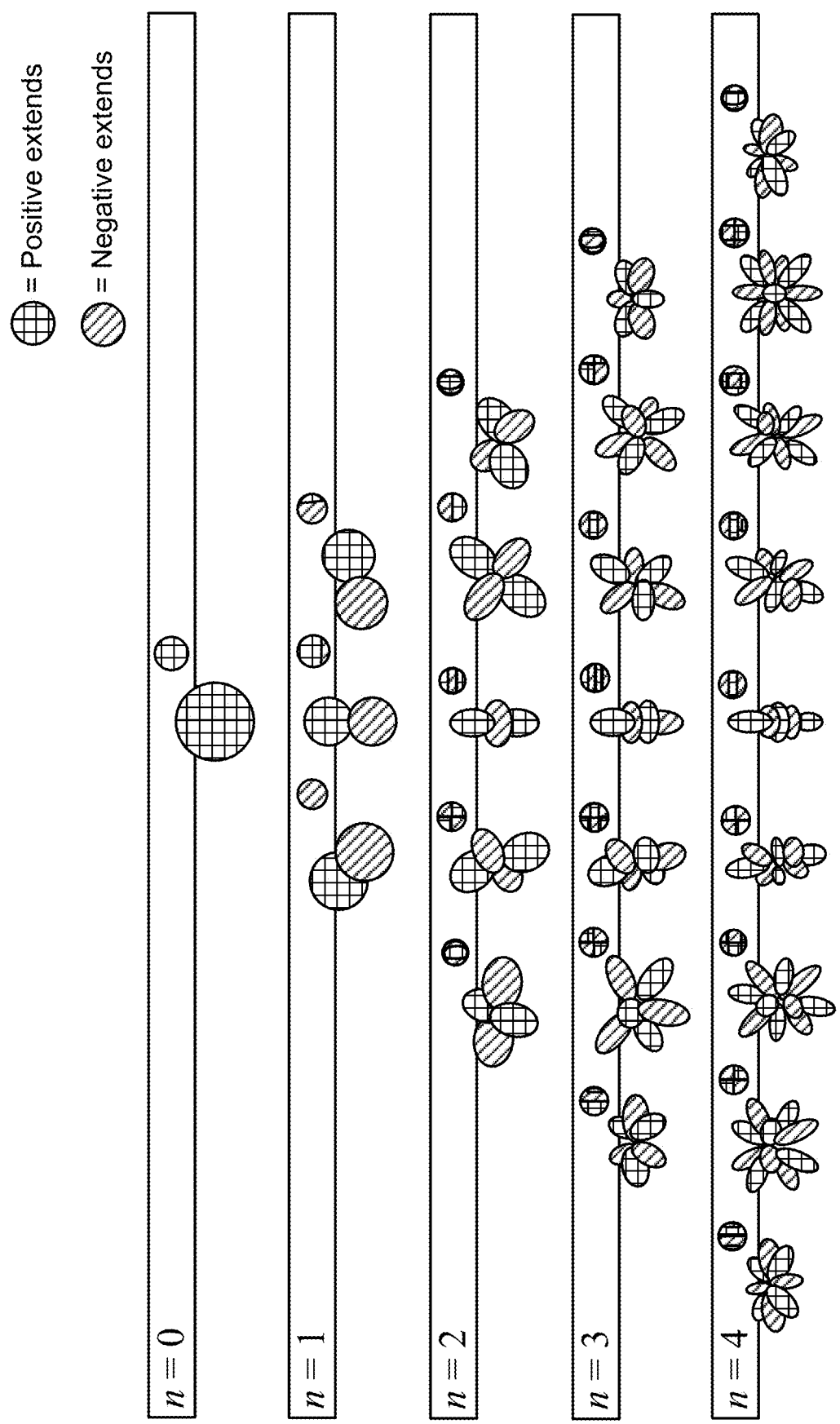
FIG. 1 is a diagram illustrating spherical harmonic basis functions of various orders and sub-orders.

There are various 'surround-sound' channel-based formats in the market. They range, for example, from the 5.1 home theatre system (which has been the most successful in terms of making inroads into living rooms beyond stereo) to the 22.2 system developed by NHK (Nippon Hoso Kyokai or Japan Broadcasting Corporation). Content creators (e.g., Hollywood studios, which may also be referred to as content providers) would like to produce the soundtrack for a movie once, and not spend effort to remix it for each speaker configuration. The Moving Pictures Expert Group (MPEG) has released a standard allowing for soundfields to be represented using a hierarchical set of elements (e.g., Higher-Order Ambisonic—HOA—coefficients) that can be rendered to speaker feeds for most speaker configurations, including 5.1 and 22.2 configurations, whether in locations defined by various standards or in non-uniform locations.

MPEG released the standard as MPEG-H 3D Audio standard, formally entitled "Information technology—High efficiency coding and media delivery in heterogeneous environments—Part 3: 3D audio," set forth by ISO/IEC JTC 1/SC 29, with document identifier ISO/IEC DIS 23008-3, and dated Jul. 25, 2014. MPEG also released a second edition of the 3D Audio standard, entitled "Information technology—High efficiency coding and media delivery in heterogeneous environments—Part 3: 3D audio, set forth by ISO/IEC JTC 1/SC 29, with document identifier ISO/IEC 23008-3:201x(E), and dated Oct. 12, 2016. Reference to the "3D Audio standard" in this disclosure may refer to one or both of the above standards.

As noted above, one example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions (which may also be referred to as a spherical basis function) of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

FIG. 1 is a diagram illustrating spherical harmonic basis functions from the zero order (n=0) to the fourth order (n=4). As can be seen, for each order, there is an expansion of suborders m which are shown but not explicitly noted in the example of FIG. 1 for ease of illustration purposes.

The SHC $A_n^m(k)$ can either be physically acquired (e.g., recorded) by various microphone array configurations or, alternatively, they can be derived from channel-based or object-based descriptions of the soundfield. The SHC (which also may be referred to as higher order ambisonic—HOA—coefficients) represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $A_n^m(k)$ for the soundfield corresponding to an individual audio object may be expressed as:

$$A_n^m(k) = g(\omega)(-4\pi i k) h_n^{(2)}(kr_s) Y_n^{m*}(\theta_s, \varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy g(ω) as a function of frequency (e.g., using time-frequency analysis techniques, such as performing a fast Fourier transform on the PCM stream) allows us to convert each PCM object and the corresponding location into the SHC $A_n^m$ (k). Further, it can be shown (since the above is a linear and orthogonal decomposition) that the $A_n^m$ (k) coefficients for each object are additive. In this manner, a number of PCM objects can be represented by the $A_n^m$(k) coefficients (e.g., as a sum of the coefficient vectors for the individual objects). Essentially, the coefficients contain information about the soundfield (the pressure as a function of 3D coordinates), and the above represents the transformation from individual objects to a representation of the overall soundfield, in the vicinity of the observation point $\{r_r, \theta_r, \varphi_r\}$. The remaining figures are described below in the context of SHC-based audio coding.

Figure 2:
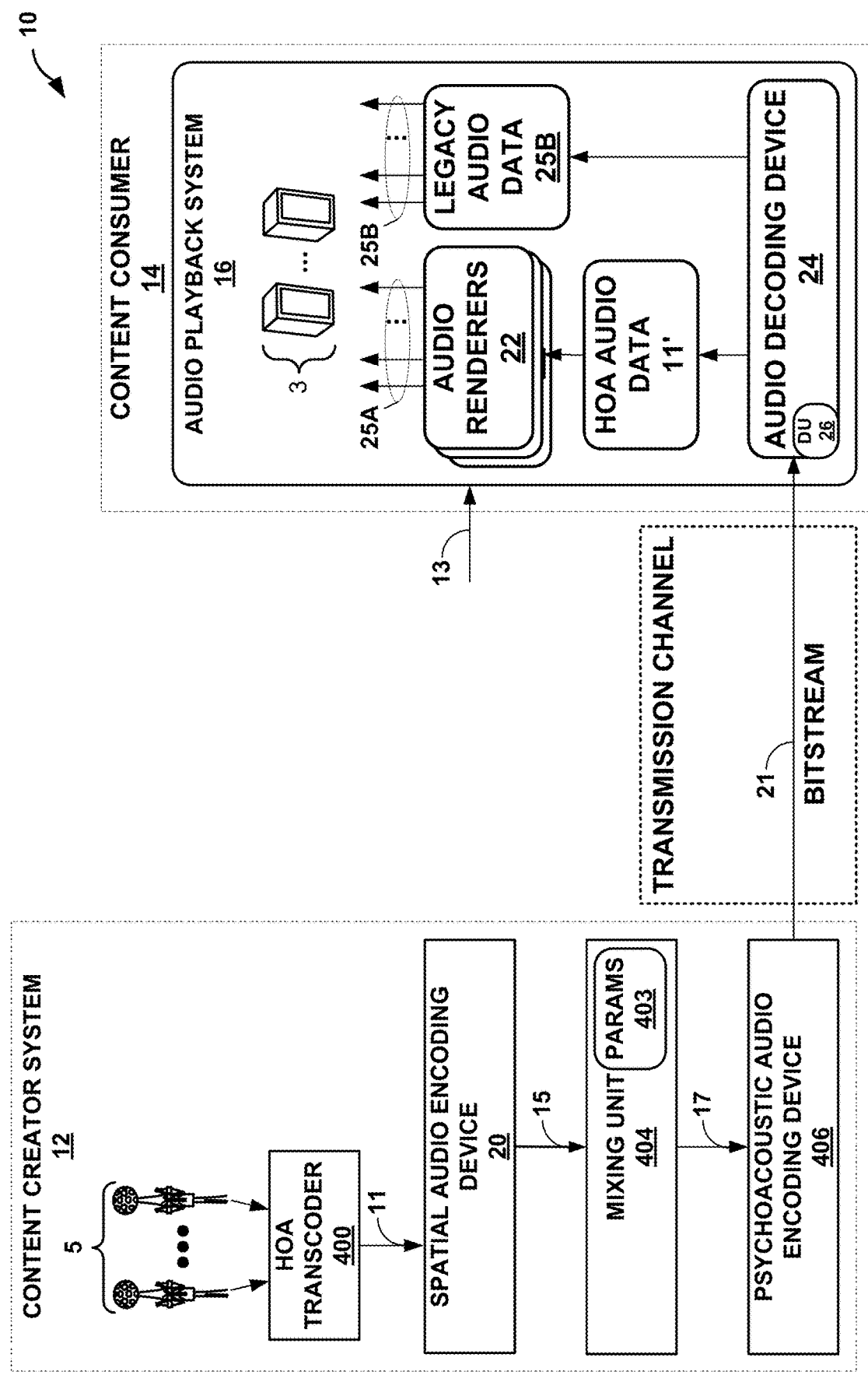
FIG. 2 is a diagram illustrating a system, including a psychoacoustic audio encoding device, that may perform various aspects of the techniques described in this disclosure.

FIG. 2 is a diagram illustrating a system 10 that may perform various aspects of the techniques described in this disclosure. As shown in the example of FIG. 2, the system 10 includes a content creator system 12 and a content consumer 14. While described in the context of the content creator system 12 and the content consumer 14, the techniques may be implemented in any context in which SHCs (which may also be referred to as HOA coefficients) or any other hierarchical representation of a soundfield are encoded to form a bitstream representative of the audio data. Moreover, the content creator system 12 may represent a system comprising one or more of any form of computing devices capable of implementing the techniques described in this disclosure, including a handset (or cellular phone, including a so-called "smart phone"), a tablet computer, a laptop computer, a desktop computer, or dedicated hardware to provide a few examples or. Likewise, the content consumer 14 may represent any form of computing device capable of implementing the techniques described in this disclosure, including a handset (or cellular phone, including a so-called "smart phone"), a tablet computer, a television, a set-top box, a laptop computer, a gaming system or console, or a desktop computer to provide a few examples.

The content creator network 12 may represent any entity that may generate multi-channel audio content and possibly video content for consumption by content consumers, such as the content consumer 14. The content creator system 12 may capture live audio data at events, such as sporting events, while also inserting various other types of additional audio data, such as commentary audio data, commercial audio data, intro or exit audio data and the like, into the live audio content.

The content consumer 14 represents an individual that owns or has access to an audio playback system, which may refer to any form of audio playback system capable of rendering higher order ambisonic audio data (which includes higher order audio coefficients that, again, may also be referred to as spherical harmonic coefficients) to speaker feeds for playback as so-called "multi-channel audio content." The higher-order ambisonic audio data may be defined in the spherical harmonic domain and rendered or otherwise transformed from the spherical harmonic domain to a spatial domain, resulting in the multi-channel audio content in the form of one or more speaker feeds. In the example of FIG. 2, the content consumer 14 includes an audio playback system 16.

The content creator system 12 includes microphones 5 that record or otherwise obtain live recordings in various formats (including directly as HOA coefficients and audio objects). When the microphone array 5 (which may also be referred to as "microphones 5") obtains live audio directly as HOA coefficients, the microphones 5 may include an HOA transcoder, such as an HOA transcoder 400 shown in the example of FIG. 2.

In other words, although shown as separate from the microphones 5, a separate instance of the HOA transcoder 400 may be included within each of the microphones 5 so as to naturally transcode the captured feeds into the HOA coefficients 11. However, when not included within the microphones 5, the HOA transcoder 400 may transcode the live feeds output from the microphones 5 into the HOA coefficients 11. In this respect, the HOA transcoder 400 may represent a unit configured to transcode microphone feeds and/or audio objects into the HOA coefficients 11. The content creator system 12 therefore includes the HOA transcoder 400 as integrated with the microphones 5, as an HOA transcoder separate from the microphones 5 or some combination thereof.

The content creator system 12 may also include a spatial audio encoding device 20, a bitrate allocation unit 402, and a psychoacoustic audio encoding device 406. The spatial audio encoding device 20 may represent a device capable of performing the compression techniques described in this disclosure with respect to the HOA coefficients 11 to obtain intermediately formatted audio data 15 (which may also be referred to as "mezzanine formatted audio data 15" when the content creator system 12 represents a broadcast network as described in more detail below). Intermediately formatted audio data 15 may represent audio data that is compressed using the spatial audio compression techniques but that has not yet undergone psychoacoustic audio encoding (e.g., such as advanced audio coding—AAC, or other similar types of psychoacoustic audio encoding, including various enhanced AAC—eAAC—such as high efficiency AAC—HE-AAC—HE-AAC v2, which is also known as eAAC+, etc.). Although described in more detail below, the spatial audio encoding device 20 may be configured to perform this intermediate compression with respect to the HOA coefficients 11 by performing, at least in part, a decomposition (such as a linear decomposition described in more detail below) with respect to the HOA coefficients 11.

The spatial audio encoding device 20 may be configured to compress the HOA coefficients 11 using a decomposition involving application of a linear invertible transform (LIT). One example of the linear invertible transform is referred to as a "singular value decomposition" (or "SVD"), which may represent one form of a linear decomposition. In this example, the spatial audio encoding device 20 may apply SVD to the HOA coefficients 11 to determine a decomposed version of the HOA coefficients 11. The decomposed version of the HOA coefficients 11 may include one or more of predominant audio signals and one or more corresponding spatial components describing a direction, shape, and width of the associated predominant audio signals. The spatial audio encoding device 20 may analyze the decomposed version of the HOA coefficients 11 to identify various parameters, which may facilitate reordering of the decomposed version of the HOA coefficients 11.

The spatial audio encoding device 20 may reorder the decomposed version of the HOA coefficients 11 based on the identified parameters, where such reordering, as described in further detail below, may improve coding efficiency given that the transformation may reorder the HOA coefficients across frames of the HOA coefficients (where a frame commonly includes M samples of the decomposed version of the HOA coefficients 11 and M is, in some examples, set to 1024). After reordering the decomposed version of the HOA coefficients 11, the spatial audio encoding device 20 may select those of the decomposed version of the HOA coefficients 11 representative of foreground (or, in other words, distinct, predominant or salient) components of the soundfield. The spatial audio encoding device 20 may specify the decomposed version of the HOA coefficients 11 representative of the foreground components as an audio object (which may also be referred to as a "predominant sound signal," or a "predominant sound component") and associated directional information (which may also be referred to as a "spatial component" or, in some instances, as a so-called "V-vector").

The spatial audio encoding device 20 may next perform a soundfield analysis with respect to the HOA coefficients 11 in order to, at least in part, identify the HOA coefficients 11 representative of one or more background (or, in other words, ambient) components of the soundfield. The spatial audio encoding device 20 may perform energy compensation with respect to the background components given that, in some examples, the background components may only include a subset of any given sample of the HOA coefficients 11 (e.g., such as those corresponding to zero and first order spherical basis functions and not those corresponding to second or higher order spherical basis functions). When order-reduction is performed, in other words, the spatial audio encoding device 20 may augment (e.g., add/subtract energy to/from) the remaining background HOA coefficients of the HOA coefficients 11 to compensate for the change in overall energy that results from performing the order reduction.

The spatial audio encoding device 20 may perform a form of interpolation with respect to the foreground directional information and then perform an order reduction with respect to the interpolated foreground directional information to generate order reduced foreground directional information. The spatial audio encoding device 20 may further perform, in some examples, a quantization with respect to the order reduced foreground directional information, outputting coded foreground directional information. In some instances, this quantization may comprise a scalar/entropy quantization. The spatial audio encoding device 20 may then output the intermediately formatted audio data 15 as the background components, the foreground audio objects, and the quantized directional information.

The background components and the foreground audio objects may comprise pulse code modulated (PCM) transport channels in some examples. That is, the spatial audio encoding device 20 may output a transport channel for each frame of the HOA coefficients 11 that includes a respective one of the background components (e.g., M samples of one of the HOA coefficients 11 corresponding to the zero or first order spherical basis function) and for each frame of the foreground audio objects (e.g., M samples of the audio objects decomposed from the HOA coefficients 11). The spatial audio encoding device 20 may further output side information (which may also be referred to as "sideband information") that includes the spatial components corresponding to each of the foreground audio objects. Collectively, the transport channels and the side information may be represented in the example of FIG. 1 as the intermediately formatted audio data 15. In other words, the intermediately formatted audio data 15 may include the transport channels and the side information.

The spatial audio encoding device 20 may then transmit or otherwise output the intermediately formatted audio data 15 to psychoacoustic audio encoding device 406. The psychoacoustic audio encoding device 406 may perform psychoacoustic audio encoding with respect to the intermediately formatted audio data 15 to generate a bitstream 21. The content creator system 12 may then transmit the bitstream 21 via a transmission channel to the content consumer 14.

In some examples, the psychoacoustic audio encoding device 406 may represent multiple instances of a psychoacoustic audio coder, each of which is used to encode a transport channel of the intermediately formatted audio data 15. In some instances, this psychoacoustic audio encoding device 406 may represent one or more instances of an advanced audio coding (AAC) encoding unit. The psychoacoustic audio coder unit 406 may, in some instances, invoke an instance of an AAC encoding unit for each transport channel of the intermediately formatted audio data 15.

More information regarding how the background spherical harmonic coefficients may be encoded using an AAC encoding unit can be found in a convention paper by Eric Hellerud, et al., entitled "Encoding Higher Order Ambisonics with AAC," presented at the $124^{th}$ Convention, 2008 May 17-20 and available at: http://ro.uow.edu.au/cgi/viewcontent.cgi?article=8025&context=engpapers. In some instances, the psychoacoustic audio encoding device 406 may audio encode various transport channels (e.g., transport channels for the background HOA coefficients) of the intermediately formatted audio data 15 using a lower target bitrate than that used to encode other transport channels (e.g., transport channels for the foreground audio objects) of the intermediately formatted audio data 15.

While shown in FIG. 2 as being directly transmitted to the content consumer 14, the content creator system 12 may output the bitstream 21 to an intermediate device positioned between the content creator system 12 and the content consumer 14. The intermediate device may store the bitstream 21 for later delivery to the content consumer 14, which may request this bitstream. The intermediate device may comprise a file server, a web server, a desktop computer, a laptop computer, a tablet computer, a mobile phone, a smart phone, or any other device capable of storing the bitstream 21 for later retrieval by an audio decoder. The intermediate device may reside in a content delivery network capable of streaming the bitstream 21 (and possibly in conjunction with transmitting a corresponding video data bitstream) to subscribers, such as the content consumer 14, requesting the bitstream 21.

Alternatively, the content creator system 12 may store the bitstream 21 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to those channels by which content stored to these mediums are transmitted (and may include retail stores and other store-based delivery mechanism). In any event, the techniques of this disclosure should not therefore be limited in this respect to the example of FIG. 2.

As further shown in the example of FIG. 2, the content consumer 14 includes the audio playback system 16. The audio playback system 16 may represent any audio playback system capable of playing back multi-channel audio data. The audio playback system 16 may include a number of different audio renderers 22. The audio renderers 22 may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or both "A and B".

In some instances, the audio playback system 16 may include a legacy audio playback system that is capable of reproducing soundfields from audio data (including audio signals) that conforms to a legacy audio format. Examples of legacy audio formats include a stereo audio format (having a left channel and a right channel), a stereo audio format plus (having, in addition to the left and right channels, a low frequency effects channel), a 5.1 surround sound format (having front left and front right channels, a center channel, back left and right channels, and a low frequency effects channel), etc.

The audio playback system 16 may further include an audio decoding device 24. The audio decoding device 24 may represent a device configured to decode HOA coefficients 11' (which may also be referred to as HOA audio data 11') from the bitstream 21, where the HOA audio data 11' may be similar to the HOA coefficients 11 (which may also be referred to as HOA audio data 11) but differ due to lossy operations (e.g., quantization) and/or noise injected during transmission via the transmission channel.

That is, the audio decoding device 24 may dequantize the foreground directional information specified in the bitstream 21, while also performing psychoacoustic decoding with respect to the foreground audio objects specified in the bitstream 21 and the encoded HOA coefficients representative of background components. The audio decoding device 24 may further perform interpolation with respect to the decoded foreground directional information and then determine the HOA coefficients representative of the foreground components based on the decoded foreground audio objects and the interpolated foreground directional information. The audio decoding device 24 may then determine the HOA audio data 11' based on the determined HOA coefficients representative of the foreground components and the decoded HOA coefficients representative of the background components.

The audio playback system 16 may, after decoding the bitstream 21 to obtain the HOA audio data 11', render the HOA audio data 11' to output speaker feeds 25A. The audio playback system 15 may output speaker feeds 25A to one or more of speakers 3. The speaker feeds 25A may drive one or more loudspeakers 3.

To select the appropriate renderer or, in some instances, generate an appropriate renderer, the audio playback system 16 may obtain speaker information 13 indicative of a number of loudspeakers and/or a spatial geometry of the loudspeakers. In some instances, the audio playback system 16 may obtain the loudspeaker information 13 using a reference microphone and driving the speakers (which may include loudspeakers) in such a manner as to dynamically determine the speaker information 13. In other instances, or in conjunction with the dynamic determination of the speaker information 13, the audio playback system 16 may prompt a user to interface with the audio playback system 16 and input the speaker information 13.

The audio playback system 16 may select one of the audio renderers 22 based on the speaker information 13. In some instances, the audio playback system 16 may, when none of the audio renderers 22 are within some threshold similarity measure (in terms of the speaker geometry) to the speaker geometry specified in the speaker information 13, generate the one of audio renderers 22 based on the speaker information 13. The audio playback system 16 may, in some instances, generate one of the audio renderers 22 based on the speaker information 13 without first attempting to select an existing one of the audio renderers 22.

When outputting the speaker feeds 25A to headphones, the audio playback system 16 may utilize one of the audio renderers 22 that provides for binaural rendering using head-related transfer functions (HRTF) or other functions capable of rendering to left and right speaker feeds 25A for headphone speaker playback. The terms "speakers" or "transducer" may generally refer to any speaker, including loudspeakers, headphone speakers, etc. One or more speakers may then playback the rendered speaker feeds 25A.

Although described as rendering the speaker feeds 25A from the HOA audio data 11', reference to rendering of the speaker feeds 25A may refer to other types of rendering, such as rendering incorporated directly into the decoding of the HOA audio data 11' from the bitstream 21. An example of the alternative rendering can be found in Annex G of the MPEG-H 3D audio coding standard, where rendering occurs during the predominant signal formulation and the background signal formation prior to composition of the soundfield. As such, reference to rendering of the HOA audio data 11' should be understood to refer to both rendering of the actual HOA audio data 11' or decompositions or representations thereof of the HOA audio data 11' (such as the above noted predominant audio signal, the ambient HOA coefficients, and/or the vector-based signal—which may also be referred to as a V-vector).

As noted above, the audio playback system 16 may represent a legacy audio playback system that reproduces soundfields only from the above noted legacy audio formats. To allow for backwards compatibility, various ones of audio renderers 22 may render HOA audio data 15 to speaker feeds 25A that conform to the legacy audio formats. For example, one of renderers 22 may represent a B-format-to-A-format (B2A) converter configured to convert the HOA audio data 15 or a portion thereof to a speaker feeds 25A conforming to the stereo audio format. The B-format refers to a portion of the HOA audio data that includes HOA coefficients corresponding to the first-order and zero-order spherical basis functions, which may also be referred to as a first-order ambisonic (FOA) signal. The A-format denotes the stereo audio format. Although described herein primarily with respect to the stereo audio format, the techniques may be applied with respect to any legacy audio format (being "legacy" in comparison to the recently introduced ambisonics audio format, which may also be referred to as a scene-based audio format).

A number of different B2A converters exist. One example of a B2A converter is the mode matrix set forth in the above referenced MPEG-H 3D Audio Coding Standard. Another example of a B2A converter is a CODVRA converter, which is described in more detail in a document produced by Dolby Laboratories Inc., entitled, "Encoding First-Order Ambisonics with HE-AAC," and dated Oct. 13, 2017. Yet another converter is UHJ matrix conversion.

As another example, rather than render the A-format from the B-format, the soundfield representation generator 302 may obtain the A-format (either from the content capture device 300 or by rendering the B-format) and specify the A-format in the bitstream 21 in addition to the B-format. This process of specifying both the A-format and the B-format is referred to as simulcasting.

In the above instances, there are a number of deficiencies. B2A converters and simulcasting are both "fixed" in the sense that the B2A conversion is fixed by the selected renderer or by what is provided by the content capture device 300. In other words, the B2A converters and simulcast are fixed in the sense that both are time-invariant and cannot be personalized by the content provider. The fixed nature of the B2A converters and simulcasting may potentially limit the ability of content creators to personalize the stereo mix and deliver a good experience for legacy audio playback systems. Furthermore, simulcasting may reduce bandwidth available for representing the HOA audio data 15 in the bitstream 21, thereby sacrificing a quality of the HOA audio data 15 at the expense of improving the experience for legacy audio playback systems.

The audio playback system 16 may render the HOA audio data 11' to speaker feeds 25A in a manner that also allows for configurable generation of backward compatible audio signals 25B (which may also be referred to as speaker feeds 25B) that conform to legacy audio formats. That is, the HOA audio encoder 20 may allocate bits for specifying one or more parameters that can be adapted to produce backward compatible audio signals 25B capable of being reproduced by legacy playback systems (e.g., audio playback systems that are configured to present stereo audio signals).

The content creator network 12 may provide these parameters and produce a bitstream 21 with improved backward compatibility (in terms of user perception) without potentially reducing bandwidth allocated to the underlying soundfield (e.g., the bits allocated for representing the compressed version of the HOA audio data). In this respect, the content creator network 12 may enable better (in terms of user perception) audio playback for legacy audio playback systems, thereby improving the operation of the audio playback systems themselves.

In operation, the spatial audio encoding device 20 may output the intermediately formatted audio data 15, which may include one or more transport channels specifying the ambient HOA audio data (such as the background HOA coefficients) and any predominant audio signals, and side information that specifies the spatial characteristics of the predominant audio signals (e.g., the above noted V-vectors). The mixing unit 404 may obtain the intermediately formatted audio data 15 and extract the ambient HOA audio data (such as the HOA coefficients corresponding to any combination of the zero order spherical basis function—generally denoted by the variable W—and any of the three first order spherical basis functions, which are denoted by the variables X, Y, and Z).

In some instances, the first portion of the higher order ambisonic audio data may include data indicative of a first coefficient corresponding to a zero-order spherical basis function (W). In this and other instances, the first portion of the higher order ambisonic audio data comprises data indicative of a first coefficient corresponding to a zero-order spherical basis function, and a second coefficient corresponding to a first-order spherical basis function.

The mixing unit 404 may represent a unit configured to process the ambient HOA audio data to obtain legacy audio data 25B conforming to a legacy audio format, such as any of the examples listed above and others not listed. The mixing unit 404 may obtain parameters 403 that identify how the legacy audio data 25B is to be obtained from a portion of the higher order ambisonic audio data (e.g., the ambient HOA audio data noted above). A sound engineer or other operator may specify the parameters 403, or the mixing unit 404 may apply one or more algorithms that assess the ambient HOA audio data and automatically generate the parameters 403. In any event, the mixing unit 404 may obtain, from the ambient HOA audio data and based on the parameters 403, the legacy audio data 25B.

In some instances, the mixing unit 404 may obtain, based on the parameters 403, mixing data. The mixing data may, as one example, include a mixing matrix, which the mixing unit 404 may apply to the ambient HOA audio data to obtain the legacy audio data 25B. In this way, the mixing unit 404 may process, based on the mixing data, the ambient HOA audio data to obtain the legacy audio data 25B.

The mixing unit 404 may specify, in the intermediately formatted audio data 15 (which may also be referred to as the bitstream 15) that includes a second portion of the higher order ambisonic audio data, the legacy audio data 25B and the one or more parameters 403. The second portion of the higher order ambisonic audio data may include a compressed version of one or more additional ambient HOA coefficients, and a compressed version of predominant sound signals along with side information representative of a compressed version of the spatial characteristics. The second portion of the higher order ambisonic audio data may include data representative of one or more coefficients corresponding to spherical basis functions to which one or more coefficients of the first portion of the higher order ambisonic audio data do not correspond (potentially in the form of a predominant audio signal and a corresponding spatial characteristic).

The mixing unit 404 may specify the parameters 403 according to the following example syntax table:

| Syntax | No. of bits | Mnemonic |
| --- | --- | --- |
| { | | |
|   StereoSpread; | 2 | uimsbf |
|   BeamCharacter; | 2 | uimsbf |
|   if    (beamCharacter==3) | x | uimsbf |
| {alpha;} | 1 | uimsbf |
|   hasAngleOffset; | | uimsbf |
|   if (hasAngleOffset==1) { | 9 | uimsbf |
|     azimuthAngleOffset; | 9 | uimsbf |
|     elevationAngleOffset; | | |
|   } | | |
| } | | |

As shown in the foregoing syntax table, the parameters 403 may include a "StereoSpread" syntax element, a "BeamCharacter" syntax element, a "hasAngleOffset" syntax element, an "azimuthAngleOffset" syntax element, and an "elevationAngleOffset" syntax element.

The StereoSpread syntax element may represent a stereo spread parameter that may identify a width between sound sources used when obtaining the legacy audio data 25B. The BeamCharacter syntax element may represent a beam character parameter that identifies a type of virtual microphone beams used for obtaining the legacy audio data 25B. The beam character parameter may identify different levels of attenuation for sounds coming from the rear (or, in other words, back) in reference to the sweet spot. The beam character parameter may define a type of the "virtual microphone beams" used for the stereo mixing.

The hasAngleOffset syntax element represents syntax element that indicates whether the azimuthAngleOffset syntax element and the elevationAngleOffset syntax element are present in the bitstream. Each of the azimuthAngleOffset syntax element and the elevationAngleOffset syntax element may represent an angle offset parameter that identifies an angle (azimuth angle and elevation angle respectively) between sound sources used when obtaining the parameter that identifies a type of virtual microphone beams used for obtaining the legacy audio data 25B. These angle offset parameters may indicates how the beams are "centered" around the azimuth and elevation angles.

The mixing unit 404 may also obtain de-mixing data that indicates how to process the legacy audio data 25B to obtain the ambient HOA audio data. The mixing unit 404 may determine, based on the mixing data, the de-mixing data. In instances where the mixing data is a mixing matrix, the mixing unit 404 may obtain the de-mixing data as an inverse (or pseudo-inverse) of the mixing matrix. The mixing data includes mixing data representative of a mixing matrix that converts M input signals into N output signals, where M does not equal N. The mixing unit 404 may specify, in the bitstream 15 that includes the second portion of the audio data, the legacy audio data 25B (as noted above) and the de-mixing data.

The mixing unit 404 may specify the de-mixing data as set forth in the following example syntax table:

| Syntax | No. of bits | Mnemonic |
|---|---|---|
| { | | |
|    bitDepth = bitDepthIdx + 1; | 4 | uimsbf |
|    numRow = rowIdx + 1; | 4 | uimsbf |
|    numCol = colIdx + 1; | 4 | uimsbf |
|    for i=1:numRow | bitDepth | bslbf |
|      for j=1:numCol | | |
|         D(i,j); // i-th row and j-th column | | |
| of de- mixing matrix D | | |
| } | | |

As shown in the above syntax table, the de-mixing data (denoted by the matrix "D") may be specified in terms of a bitDepthIdx syntax element, a rowIdx syntax element, and a colIdx syntax element. The bitDepthIdx may define a bit depth for each matrix coefficient of a de-mixing matrix represented by D. The rowIdx syntax element may identify a number of rows in the de-mixing matrix, while the colIdx syntax element may identify a number of columns in the de-mixing matrix.

Although shown as fully specifying each matrix coefficient for every row and column of the de-mixing matrix referenced in the above syntax table, the mixing unit 404 may attempt to reduce the number of matrix coefficients explicitly specified in the bitstream 15 through application of compression that leverages sparseness and/or symmetry properties that may occur in the de-mixing matrix. That is, the de-mix data may include sparseness information indicative of a sparseness of the de-mix matrix, which the mixing unit 404 may specify in order to signal that various matrix coefficients are not specified in the bitstream 15. More information regarding how the mixing unit 404 may obtain the sparseness information and thereby reduce the number of matrix coefficients specified in the bitstream 15 can be found in U.S. Pat. No. 9,609,452, entitled "OBTAINING SPARSENESS INFORMATION FOR HIGHER ORDER AMBISONIC AUDIO RENDERERS," which issued on Mar. 28, 2017.

The de-mix data may also, in some examples and either in conjunction with or as an alternative to sparseness information, include symmetry information that indicates a symmetry of the de-mix matrix, which the mixing unit 404 may specify in order to signal that various matrix coefficients are not specified in the bitstream 15. The symmetry information may includes value symmetry information that indicates value symmetry of the de-mix matrix and/or sign symmetry information that indicates sign symmetry of the de-mix matrix. More information regarding how the mixing unit 404 may obtain the sparseness information and thereby reduce the number of matrix coefficients specified in the bitstream 15 can be found in U.S. Pat. No. 9,883,310, entitled "OBTAINING SYMMETRY INFORMATION FOR HIGHER ORDER AMBISONIC AUDIO RENDERERS," which issued on Jan. 30, 2018.

In any event, the mixing unit 404 may generate, in the manner described above, the bitstream 17 as a result of updating or otherwise modifying the bitstream 15. The mixing unit 404 may output the mixing unit 404 to the psychoacoustic audio encoding device 406.

As described above, the psychoacoustic audio encoding device 406 may perform psychoacoustic audio encoding, such as AAC, enhanced AAC (eAAC), high efficiency-AAC (HE-AAC), HE-AACv2.0 (also referred to as eAAC+), and the like, to generate the bitstream 21 conforming to a transport format. To maintain backward compatibility with the legacy audio playback systems, the psychoacoustic audio encoding device 406 may generate the bitstream 21 to conform with a legacy transport format (such as those resulting from application of any of the above psychoacoustic audio encoding processes). As such, the psychoacoustic audio encoding type performed with respect to the bitstream 17 may be referred to as a legacy transport format.

However, separately encoding each transport channel of the bitstream 17 may result in various inefficiencies. For example, in AAC (which may refer to AAC or any of the variations of AAC noted above), the psychoacoustic audio encoding device 406 may specify a frame of each transport channel along with a number of fill elements to address differences between frame sizes (and thereby potentially maintain an instantaneous bitrate or nearly instantaneous bitrate). These fill elements do not express any aspect of the audio data and are simply filler, which may result in waste of bandwidth (both for the content creator system 12 itself in terms of memory bandwidth and possible network bandwidth) and/or storage space.

In accordance with various aspects of the techniques described in this disclosure, the psychoacoustic audio encoding device 406 may specify, in bitstream 21 (which may represent one example of a backward compatible bitstream that conforms to a legacy audio transport) the legacy audio data 25B. The psychoacoustic audio encoding device 406 may next specify, in the backward compatible bitstream 21, extended audio data that enhances the legacy audio data. The extended audio data may include audio data representative of higher order ambisonic audio data 11, such as one or more higher order ambisonic coefficients corresponding to spherical basis functions having an order greater than zero or one. The extended audio data may enhance the legacy audio data 25B by, as one example, increasing a resolution of the soundfield represented by the legacy audio data 25B and thereby permit additional speaker feeds 25A (including those that provide height in the soundfield reproduction) to be rendered for enhanced playback systems 16.

The extended audio data may include transport channels previously specified in the bitstream 17. As such, the psychoacoustic audio encoding device 406 may specify, in the backward compatible bitstream 21, the extended audio data by, at least in part, encoding the existing transport channels and specifying the encoded channels in the backward compatible bitstream 21 in the manner consistent with various aspects of the techniques described in this disclosure. Further information concerning how the psychoacoustic audio encoding device 406 may specify the extended audio data 11 is provided with respect to the examples of FIGS. 6A and 6B.

Figure 6A:
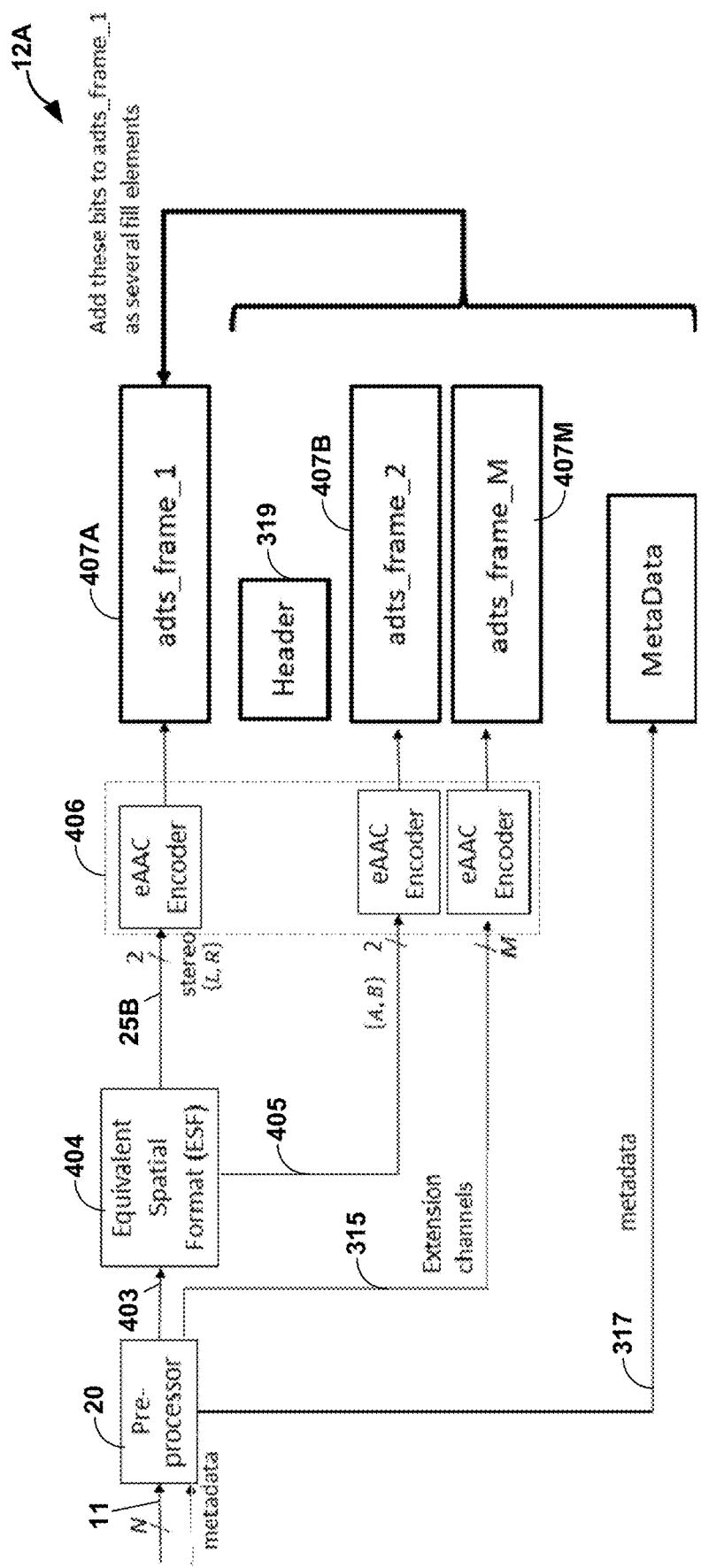
FIGS. 6A and 6B are block diagrams illustrating the content creator system of FIG. 2 in performing various aspects of the techniques described in this disclosure.
Figure 6B:
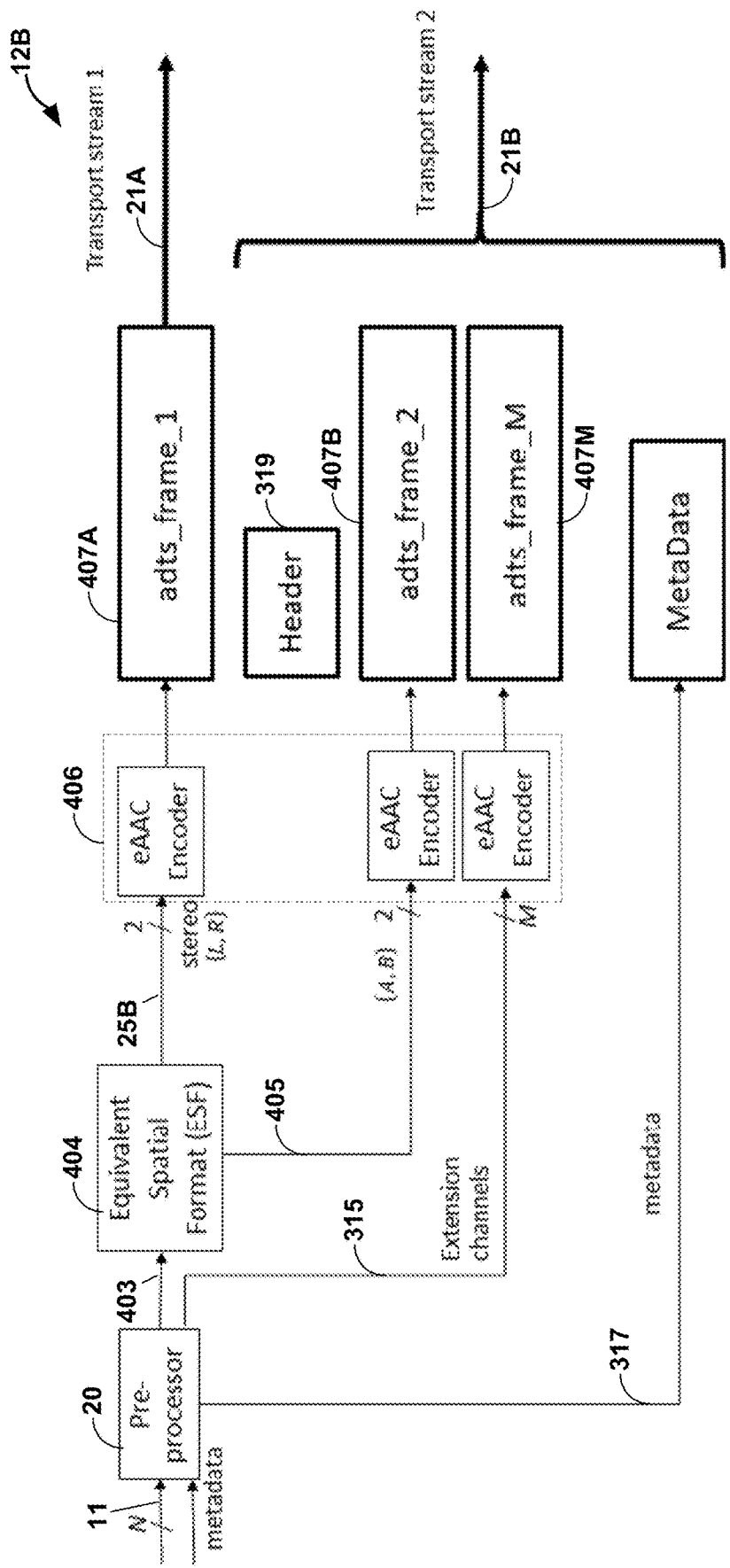

FIGS. 6A and 6B are block diagrams illustrating the content creator system of FIG. 2 in performing various aspects of the techniques described in this disclosure. Referring first to the example of FIG. 6A, the content creator system 12A is one example of the content creator system 12 shown in the example of FIG. 1.

As shown in FIG. 6A, the content creator system 12A includes a pre-processor 20 (which represents the spatial audio encoding device 20 shown in FIG. 2 as well as any other pre-processing that may occur), an equivalent spatial format (ESF) unit 404 (which represents the mixing unit 404), and the psychoacoustic audio encoding device 406 (which is shown in FIG. 6A as a number of different instantiations of eAAC encoders).

The pre-processor 20 may output compressed versions of HOA audio data 11 as the bitstream 15 (shown as including extension transport channels 315 and accompanying metadata 317, which may include spatial characteristics associated with predominant audio signals represented by the extension transport channels 315). In this respect, the bitstream 15 may represent the extended audio data, and as such may be referred to as "extended audio data 15"). The pre-processor 20 may output the extension transport channels 315 and the metadata 317 to the psychoacoustic audio encoding device 406.

The pre-processor 20 may also output the HOA coefficients associated with spherical basis functions of the first and zeroth order (which are generally denoted by the variables W, X, Y, and Z, and also referred to as the "B-format" in the context of HOA audio data or "first order HOA audio data"). The pre-processor 20 may output first order HOA audio data 403 to the ESF unit 404.

The ESF unit 404 may perform mixing with respect to the first order HOA audio data 403 to obtain the legacy audio data 25B. The legacy audio data 25B may conform to one or more of the legacy audio formats discussed above. In the example of FIG. 6A, the legacy audio data 25B is assumed to conform to the stereo audio format (which includes a left—L—channel and a right—R—channel). The ESF unit 404 may output the legacy audio data 25B to the psychoacoustic audio encoding device 406.

The ESF unit 404 may, when obtaining the legacy audio data 25B, obtain residual audio data 405. That is, when mixing the first order HOA audio data 403 to obtain the legacy audio data 25B, the ESF unit 404 may effectively determine a difference between the first-order HOA audio data 403 and the legacy audio data 25B as the residual audio data 405 (and shown in the example of FIG. 6A as A and B transport channels). The ESF unit 404 may output the residual audio data 405 to the psychoacoustic audio encoding device 406.

The psychoacoustic audio encoding device 406 may perform psychoacoustic audio encoding with respect to each portion (e.g., a frame) of the legacy audio data 25B to obtain an audio data transport stream (ADTS) frame 407A. The psychoacoustic audio encoding device 406 may also perform psychoacoustic audio encoding with respect to each of the A and B transport channels of the residual audio data 405 to obtain one or more ADTS frames 407 (shown as ADTS frame 407B in the example of FIG. 6A). The psychoacoustic audio encoding device 406 may also perform psychoacoustic audio encoding with respect to the extension transport channels 315 to obtain one or more ADTS frames (shown as ADTS frames 407C-407M).

The psychoacoustic audio encoding device 406 may also obtain the metadata 317 and a header 319. The psychoacoustic audio encoding device 406 may arrange the header 319, ADTS frames 407B-407M, and the metadata 317 as one or more fill elements of the ADTS frame 407A. The fill elements may represent uniformly sized blocks (where each fill element is, as one example, 256 Bytes).

More information regarding fill elements can be found in a whitepaper entitled "White Paper on AAC Transport Formats," by the audio Subgroup of the International Organisation for Standardisation (Organisation Internationale de Normalisation), ISO/IEC JTC1/SC29/WG11 Coding of Moving Pictures and Audio, document ISO/IEC JTC1/SC29/WG11 N14751, released July 2014 during the meeting in Sapporo, Japan. More information regarding how the psychoacoustic audio encoding device 406 may specify arrange the header 319, ADTS frames 407B-407M, and the metadata 317 as one or more fill elements of the ADTS frame 407A is provided with respect to the examples of FIGS. 7A and 7B.

FIGS. 7A and 7B are diagrams illustrating how the bitstream of FIG. 2 may be arranged to enable backwards compatibility and extensibility in accordance with various aspects of the techniques described in this disclosure. Referring first to FIG. 7A, the bitstream 21 represents a single portion of the bitstream 21, such as a single ADTS transport frame in which ADTS frame 407A is specified along with fill elements 350A-350E ("fill elements 350" or fill_elements_1-fill_elements_5 (shown as "5")), as shown in FIG. 7B.

The psychoacoustic audio encoding device 406 may specify the fill elements 350 directly after ADTS transport frame 407A. The psychoacoustic audio encoding device 406 may specify the header 319 in the fill element 350A directly following ADTS frame 407A (which represents the legacy audio data 25B), followed by each of the ADTS transport frames 407B-407M in the fill elements 350A-350D, and then followed by the metadata 317 in fill elements 350D and 350E.

The psychoacoustic audio encoding device 350 may specify the header 319 according to the following syntax:

| Header | |
|---|---|
| SyncWord | 8 bits |
| SizeOfHeaderBytes | 4 bits |
| NumFillElements | 8 bits |
| NumSplits | 8 bits |
| For i=1: NumSplits | |
|    SizeofSplitBytes | 10 bits (upto 1024 bytes-200 kbps) |
|    TypeofSplit | 3 bits (ADTS, OBJ metadata, HOA sideinfo, CH metadata, SpAACe config) |
| End | |
| AlignBits | 0-8 bits |

Generally, the header 319 represents one or more indications indicative of how the extended audio data (represented by the ADTS transport frames 407B-407M) was specified in the backward compatible bitstream 21. The header 319 may include an indication (e.g., the SyncWord syntax element) identifying that the fill elements 350 include the extended audio data (represented by the extension transport channels 315, the metadata 317, and the residual audio data 405).

The header 319 may also include an indication (e.g., the above SizeOfHeaderBytes syntax element) identifying a size of the header 319. The header 319 may also include an indication (e.g., the NumFillElements syntax element) identifying a number of fill elements 350. In the example of FIG. 7B, the psychoacoustic audio encoding device 406 may specify a value of five (5) for the NumFillElements syntax element.

The header 319 may also include an indication identifying a number of portions of the extended audio data. In the example of FIG. 7B, the psychoacoustic audio encoding device 406 may specify a value of M+1 for the NumSplits syntax element, as there are M−1 (considering that there are M−1 ADTS transport frames 407B-407M) portions plus the header 319 as another portion, and the metadata 317 as yet another portion for a total of M+1 portions (which may also be referred to as "splits"). In some examples, the header 319 may be excluded as one of the portions, considering that it does not provide any data related to the underlying soundfield.

For each of the number of different portions, the psychoacoustic audio encoding device 406 may specify, in the header 319, an indication (e.g., the SizeofSplitBytes syntax element) identifying a size of a respective one of the portions of the extended audio data, and an indication (e.g., the TypeofSplit syntax element) identifying a type of the respective one of the portions. The type may indicate whether the corresponding portion is an ADTS transport frame (ADTS), object metadata, HOA side information (which may specify the spatial characteristics in the form of a V-vector), channel metadata, or SpAACe config—which is discussed in more detail below.

The psychoacoustic audio encoding device 406 may alternatively specify the ADTS frames 407B-407M and the metadata 317 according to a so-called spatial Audio Advanced Coding enhanced/extended (spAACe) audio stream (spAACe AS). When using the spAACe AS format, the psychoacoustic audio encoding device 406 may specify the header 319 as including the following, as the remaining aspects of the header 319 discussed above are redundant in view of signaling specified in accordance with the spAACe AS format:

| | |
|---|---|
| SyncWord | 8 bits |
| SizeOfHeaderBytes | 4 bits |
| NumFillElements | 8 bits |
| AlignBits | 0-8 bits |

The psychoacoustic audio encoding device 406 may partition SpAACe Audio Stream bits into a sequence of byte aligned data chunks with a maximum size of, as one example, 256 bytes. The psychoacoustic audio encoding device 406 may then embed each partition as a separate fill_element within the raw_data_block of the AAC bitstream (or other psychoacoustic codec bitstream) to potentially maintain backwards compatibility with the legacy AAC format.

The overview and syntax of ADTS frame is provided in Annex 1.A (e.g., refer to tables 1.A.4 to 1.A.11) of ISO_IEC_14496-3, entitled "Information technology—Coding of audio-visual objects—Part 3: Audio," and dated Sep. 1, 2009 (hereinafter referred to as "ISO_IEC_14496-3; 2009"). The syntax of raw_data_block( ) is explained in Table 4.3 of ISO_IEC_14496-3; 2009. The psychoacoustic audio encoding device 406 may use the single_channel_element( ) and the channel_pair_element( ) to carry the mono and stereo channels in the legacy path. Syntax is described in Table 4.4 and Table 4.5 of ISO_IEC_14496-3; 2009. Any number of these elements from the legacy path might be used in the SpAACe decoding process as described in Table A.8.

A sequence of Fill_elements are used to carry the SpAACe Audio Stream. Fill_element syntax is described in Table 4.11 of ISO_IEC_14496-3; 2009. A new extension type is defined to carry the SpAACe data bytes.

Syntax of extension_payload( ) is updated by adding one more extension type as follows.

TABLE B.1

Syntax of extension_payload( )

| Syntax | No. of bits | Mnemonic |
|---|---|---|
| extension_payload(cnt){ | | |
|   extension_type; | 4 | Uimsbf |
|   align = 4; | | |
|   switch( extension_type ) { | | |
|     case EXT_DYNAMIC_RANGE: | | |
|       return dynamic_range_info( ); | | |
|     case EXT_DYNAMIC_RANGE: | | |
|       return dynamic_range_info( ); | | |
|     case EXT_SAC_DATA: | | |
|       return sac_extension_data(cnt); | | |
|     case EXT_SBR_DATA: | | |
|       return sbr_extension_data(id_aac, 0); | | |
|     case EXT_SBR_DATA_CRC: | | |
|       return sbr_extension_data(id_aac, 1); | | |
|     case EXT_FILL_DATA: | | |
|       fill_nibble; /* must be '0000' */ | 4 | Uimsbf |
|       for (i=0; i<cnt−1; i++) { | | |
|         fill_byte[i]; /* must be '10100101' */ | 8 | Uimsbf |
|       } | | |
|     return cnt; | | |
|     case EXT_DATA_ELEMENT: | 4 | Uimsbf |
|       data_element_version; | | |
|       switch( data_element_version ) | | |
|       { | | |
|         case ANC_DATA: | | |
|         loopCounter = 0; | | |
|         dataElementLength = 0; | | |
|         do { | | |
|           dataElementLengthPart; | | |
|           dataElementLength += | 8 | Uimsbf |
|           dataElementLengthPart; | | |
|           loopCounter++; | | |
|         } while (dataElementLengthPart == 255); | | |
|         for (i=0; i<dataElementLength; i++) { | | |
|           data_element_byte[i]; | 8 | Uimsbf |
|         } | | |
|         return (dataElementLength+loopCounter+1); | | |
|       default: | | |
|         align = 0; | | |
|       } | | |
|     case EXT_SPAACE_DATA: | | |
|     return SpAACe_data(cnt); | | |
|     case EXT_FIL: | | |
|     default: | | |
|       for (i=0; i<8*(cnt−1)+align; i++) | | |
|       { | | |
|         other_bits[i]; | | |
|     } | | |
|   return cnt; | | |
| } | | |
| | 1 | Uimsbf |

TABLE B.2

Syntax of SpAACe__data( )

| Syntax | No. of bits | Mnemonic |
| --- | --- | --- |
| SpAACe__data(cnt)<br>{<br>  if (SizeOfDataBytes>0){<br>    NumSpAACeFillElements = NumSpAACeFillElements+1;<br>  }<br>  for (i=0; i< cnt−1; i++) {<br>    SpAACeDataByte[i];<br>  }<br>  return (cnt);<br>} | 8 | bslbf |

TABLE B.3

Additional extension__type definition in Table 4.121 of ISO__IEC__14496-3; 2009

| EXT__SPAACE__DATA | '0101' | SpAACe Payload |
| --- | --- | --- |

The psychoacoustic audio encoding device 406 may buffer one raw_data_block in SpAACeDataByte[ ] to form the spAACeAudioStream( ).

Given the foregoing regarding the formation of the spAACeAudioStream( ) the following may describe a self-contained format to transport spAACe audio data. Below is a summary of what is described and considered of relevance to various aspects of the techniques:

Core decoding such as single channel element (SCE), channel pair element (CPE), and LFE decoding is described in ISO/IEC 14496-3; 2009;

HOA decoding is described in ETSI TS 103 589, Higher Order Ambisonics (HOA) Transport Format;

Dynamic Range Control (DRC) is described in ISO/IEC 23003-4, Information technology—MPEG audio technologies—Part 4: Dynamic Range Control; and Other decoding functions such as object decoding is described in ISO/IEC 23003-4, Information technology—MPEG audio technologies—Part 4: Dynamic Range Control., according to the low complexity profile constraints, and ISO/IEC 23008-3:2018, Information technology—High efficiency coding and media delivery in heterogeneous environments—Part 3: 3D audio.

The following syntax tables may represent how the psychoacoustic audio encoding device 406 may specify the spAACeAudioStream( ) in the bitstream 21.

TABLE 11

Syntax of spAACeAudioStream( )

| Syntax | No. of bits | Mnemonic |
| --- | --- | --- |
| spAACeAudioStream( )<br>{<br>  while (bitsAvailable( ) != 0) {<br>    spAACeAudioStreamPacket( );<br>  }<br>} | | |

Given that the spAACeAudioStreamPacket( ) is of a fixed or uniform size, the psychoacoustic audio encoding device 406 may not specify a number of spAACe audio stream packets are present in the bitstream 21, but instead continue to parse spAACe audio stream packets so long as bits are available (as determined via the bitsAvailable( ) function call).

The psychoacoustic audio encoding device 406 may specify each of the space audio stream packets as follows.

TABLE A.2

Syntax of spAACeAudioStreamPacket( )

| Syntax | | No. of bits | Mnemonic |
| --- | --- | --- | --- |
| spAACeAudioStreamPacket( )<br>{ | | | |
|   SPAACEASPacketType | = escapedValue(3,8,8); | 3, 11, 19 | uimsbf |
|   SPAACEASPacketLabel | = escapedValue(2,8,32); | 2, 10, 42 | uimsbf |
|   SPAACEASPacketLength | = escapedValue(11,24,24); | 11, 35, 59 | uimsbf |
|   SPAACEASPacketPayload(SPAACEASPacketType);<br>} | | | |

NOTE:
With the given bit allocation, SPAACEASPacketPayload( ) is always byte-aligned Each of the spAACe audio stream packets may include an indication of a type of spAACe audio stream packet type (e.g., the SPAACEASPacketType syntax element), an indication of a spAACe audio stream packet label (e.g., the SPAACEASPacketLabel syntax element), an indication of a length of the spAACe audio stream packet (e.g., the SPAACEASPacketLength syntax element), and a payload of the spAACe audio stream packet (e.g., the spAACEASPacketPayload syntax element). The following table provides the semantics for the syntax elements of the table directly above:

TABLE A.2.1

| | Semantics of spAACeAudioStreamPacket( ) | |
|---|---|---|
| SPAACEASPacketType | This element specifies the payload type which is defined below. | |
| | SPAACEASPacketType | value |
| | PACTYP_SYNC | 0 |
| | PACTYP_SPAACECFG | 1 |
| | PACTYP_SPAACEFRAME | 2 |
| | PACTYP_AUDIOSCENEINFO | 3 |
| | /* reserved */ | 4-5 |
| | PACTYP_FILLDATA | 6 |
| | PACTYP_SYNCGAP | 7 |
| | PACTYP_MARKER | 8 |
| | PACTYP_CRC16 | 9 |
| | PACTYP_CRC32 | 10 |
| | PACTYP_GLOBAL_CRC16 | 11 |
| | PACTYP_GLOBAL_CRC32 | 12 |
| | PACTYP_USERINTERACTION | 13 |
| | PACTYP_LOUDNESS_DRC | 14 |
| | PACTYP_BUFFERINFO | 15 |
| | PACTYP_AUDIOTRUNCATION | 16 |
| | /* reserved */ | 17- |
| SPAACEASPacketLabel | This element provides an indication of which packets belong together. | |
| SPAACEASPacketLength | This element indicates the length of the spAACeAudioStreamPacket( ). | |

The following syntax table specifies the syntax of the SPAACEASPacketPayload:

TABLE A.3

| Syntax of SPAACEASPacketPayload( ) | | |
|---|---|---|
| Syntaax | No. of bits | Mnemonic |
| SPAACEASPacketPayload(SPAACEASPacketType) { switch (SPAACEASPacketType) { case PACTYP_SYNC: 0xB4; /* syncword*/ break; | 12 | uimsbf |
| case PACTYP_SPAACECFG: spAACeConfig( ); break; | | |
| case PACTYP_SPAACEFRAME: spAACeFrame( ); break; | | |
| case PACTYP_AUDIOSCENEINFO: mae_AudioSceneInfo( ); break; | | |
| case PACTYP_FILLDATA: for (i=0; i< SPAACEASPacketLength; i++) { spAACeAS_fill_data_byte(i); } break; | 8 | bslbf |
| case PACTYP_SYNCGAP: syncSpacingLength = escapedValue(16,24,24); break; | 16, 40, 64 | uimsbf |
| case PACTYP_MARKER: for (i=0; i< SPAACEASPacketLength; i++) { marker_byte(i); } break; | 8 | bslbf |
| case PACTYP_CRC16: spAACeASParity16Data; break; | 16 | bslbf |
| case PACTYP_CRC32: spAACeASParity32Data; | 32 | bslbf |

TABLE A.3-continued

Syntax of SPAACEASPacketPayload( )

| Syntaax | No. of bits | Mnemonic |
|---|---|---|
|         break; | | |
|       case PACTYP_GLOBAL_CRC16: | | |
|         numProtectedPackets; | 6 | bslbf |
|         spAACeASParity16Data; | 16 | bslbf |
|         break; | | |
|       case PACTYP_GLOBAL_CRC32: | | |
|         numProtectedPackets; | 6 | bslbf |
|         spAACeASParity32Data; | 32 | bslbf |
|         break; | | |
|     case PACTYP_USERINTERACTION: | | |
|       spAACeElementInteraction( ); | | |
|       break; | | |
|     case PACTYP_LOUDNESS_DRC: | | |
|       uniDrcInterface ( ); | | |
|       break; | | |
|     case PACTYP_BUFFERINFO: | | |
|       spAACeAS_buffer_fullness_present | 1 | uimsbf |
|       if (spAACeAS_buffer_fullness_present) | | |
|         spAACeAS_buffer_fullness = escapedValue(15,24,32); | 15, 39, 71 | uimsbf |
|       } | | |
|       break; | | |
|     case PACTYP_AUDIOTRUNCATION: | | |
|       spAACeASaudioTruncationInfo( ); | | |
|       break; | | |
|   } | | |
|   ByteAlign( ); | | |
| } | | |

The following provides the semantics of the SPAACEAS-PacketPayload function:

TABLE A.3.1

Semantics of SPAACEASPacketPayload( )

| | |
|---|---|
| spAACeConfig( ) | A spAACe audio config which is defined in Table A.4. |
| spAACeFrame( ) | A spAACe audio payload which is defined in Table A.9. |
| mae_AudioSceneInfo( ) | The set of metadata consists of descriptive metadata, restrictive metadata, positional metadata, and structural metadata. |
| spAACeAS_fill_data_byte(i) | 8-bit data elements |
| syncSpacingLength | the length in Bytes between the last two SPAACEASPacketType PACTYP_SYNC |
| marker_byte (i) | This element indicates a marker event. |

| marker_byte (i) | Meaning |
|---|---|
| 0x01 | Configuration Change Marker |
| 0x02 | Random Access/ Immediate Playout Marker |
| 0x03 | Program Boundary Marker |
| the other values | /*reserved */ |

| | |
|---|---|
| spAACeElementInteraction ( ) | Substantially similar or similar to MPEG-H 3D audio element interaction structure as defined in 17.7.4. |
| uniDrcInterface ( ) | defined in ISO/IEC 23003-4. |
| spAACeAS_buffer_fullness_present | a bit signaling the presence of spAACeAS_buffer_fullness |
| spAACeAS_buffer_fullness | This element indicates the state of the bit reservoir |

TABLE A.3.1-continued

| Semantics of SPAACEASPacketPayload( ) | |
|---|---|
| spAACeASaudioTruncationInfo( ) | Audio samples are removed either before or after a truncation point. |
| ByteAlign( ) | fill bits to achieve byte alignment |

The following provides the syntax of the spAACeConfig function along with the semantics of the spAACeConfig function:

TABLE A.4

| Syntax of spAACeConfig( ) | | |
|---|---|---|
| Syntax | No. of bits | Mnemonic |
| spAACeConfig( ) {     SpeakerConfig3d( );     SpAACeSignals3d( );     spAACeDecoderConfig( ); } | | |

TABLE A.4.1

| Semantics of spAACeConfig ( ) | |
|---|---|
| SpeakerConfig3d( ) | Speaker configuration which is defined in Table 15 of ISO/IEC 23008-3. |
| SpAACeSignals3d( ) | Signal configuration defined in Table A.5 |
| spAACeDecoderConfig( ) | Decoder configuration defined in Table A.6 |

The syntax of the SpAACeSignals3d function is as follows, with the semantics following directly below.

TABLE A.5

| Syntax of SpAACeSignals3d( ) | | |
|---|---|---|
| Syntax | No. of bits | Mnemonic |
| SpAACeSignals3d( ) { | | |
|     numAudioChannels = 0; | | |
|     numAudioObjects = 0; | | |
|     numHOATransportChannels = 0; | | |
|     bsNumSignalGroups; | 5 | uimsbf |
|     for ( grp = 0; grp < bsNumSignalGroups + 1 ; grp++ ) { | | |
|         signal_groupID[grp] = grp; | | |
|         signalGroupType[grp]; | 3 | bslbf |
|         bsNumberOfSignals[grp] = escapedValue(5, 8, 16); | | |
|         if ( SignalGroupType[grp] == SignalGroupTypeChannels ) { | | |
|             numAudioChannels += bsNumberOfSignals[grp] + 1; | | |
|         } | | |
|         if ( SignalGroupType[grp] == SignalGroupTypeObject ) { | | |
|             numAudioObjects += bsNumberOfSignals[grp] + 1; | | |
|         } | | |
|         if ( SignalGroupType[grp] == SignalGroupTypeHOA ) { | | |
|             if (DefaultHoaRenderingMatrix[grp]) { | 1 | uimsbf |
|                 HoaRenderingMatrixId[grp]; | 7 | msbf uimsbf |
|             } | | |
|             numHOATransportChannels += bsNumberOfSignals[grp] + 1; | | |
|         } | | |
|     } | | |
| } | | |

TABLE A.5.1

| Semantics of SpAACeSignals3d( ) | |
|---|---|
| bsNumSignalGroups | It defines the number of signal groups that are present in the bitstream. |
| signal_groupID | It indicates an ID to the signal groups. |
| signalGroupType | It indicates a signal group type. |
| | SignalGroupTypeChannels     0 |
| | SignalGroupTypeObject     1 |
| |     2 |
| | SignalGroupTypeHOA     3 |
| | 4- |
| AnyHoaRenderingMatrix [grp] | It defines whether any rendering matrix can be used (DefaultHoaRenderingMatrix[grp] = 0) or a transmitted rendering matrix shall be used (DefaultHoaRenderingMatrix[grp] = 1) for this audio group. |
| HoaRenderingMatrixId[grp] | It indicates which HOA rendering matrix shall be used for this audio group. All transmitted HoaRenderingMatrixId's are available in Table 32 of ISO/IEC 23008-3. |

The syntax of the spAACeDecoderConfig function is provided below.

TABLE A.6

Syntax of spAACeDecoderConfig( )

| Syntax | No. of bits | Mnemonic |
|---|---|---|
| spAACeDecoderConfig( ) { | | |
|   numElements = escapedValue(4,8,16) + 1; | | |
|   for (elemIdx=0; elemIdx<numElements; ++elemIdx) { | | |
|     spAACeElementType[elemIdx]; | 4 | Uimsbf |
|       inLegacyPath[elemIdx]; | 1 | Uimsbf |
|         if (inLegacyPath){ | 5 | Uimsbf |
|           legacyPathChannelIdx[elemIdx]; | | |
|     } | | |
|     switch (spAACeElementType[elemIdx]) { | | |
|       case ID_SPAACE_SCE: | | |
|       case ID_SPAACE_CPE: | | |
|       case ID_SPAACE_LFE: | | |
|         program_config_element( ); | | |
|         break; | | |
|       case ID_SPAACE_EXT: | | |
|         spAACeExtElementConfig( ); | | |
|         break; | | |
|     } | | |
|   } | | |
| } | | |

NOTE:
spAACeSingleChannelElementConfig( ), spAACeChannelPairElementConfig( ), spAACeLfeElementConfig( ) and spAACeExtElementConfig( ) signaled at position elemIdx refer to the corresponding elements in spAACeFrame( ) at the respective position elemIdx.

The foregoing table provides syntax regarding how the spAACeAudioStreamPacket may indicate when a spAACeElement is specified in the legacy audio data 25B or in the extended audio data. When the inLegacyPath syntax element is set to one, the corresponding element for that channel is specified in the legacy audio data 25B. When the inLegacyPathSyntax element is set to zero, the corresponding element for that channel is specified in the extended audio data. The following provides the semantics of the spAACeDecoderConfig function:

TABLE A.6.1

| Semantics of spAACeDecoderConfig( ) | |
|---|---|
| spAACeElementType | It defines bit stream extensions types. (compatible with Table 4.85 of ISO-IEC-14496-3; 2009 |
| | ID_SPAACE_SCE     0 |
| | ID_SPAACE_CPE     1 |
| | ID_SPAACE_CCE     2 |
| | ID_SPAACE_LFE     3 |
| |     4 |
| |     5 |
| | ID_SPAACE_FIL     6 |
| |     7 |
| | ID_SPAACE_EXT     8 |
| | 9-15 |
| inLegacyPath | Set to 1 if the payloasd for the element is carried in the legacy AAC path as described in Annex B. |
| legacyPathChannelIdx | Index of the legacy path channel that is used for carrying the payload for this element. |
| program_config_element( ) | Configuration for SCE, CPE and LFE. This function is defined in Table 4.2 of ISO/IEC 14496-3; 2009 |

TABLE A.6.1-continued

| Semantics of spAACeDecoderConfig( ) | |
|---|---|
| spAACeExtElementConfig( ) | Configuration for extension elements defined in Table A.7 |

The following table provides the syntax for the spAACeExtElementConfig function referenced in tables above, following by the semantics of the spAACeExtElementConfig function.

TABLE A.7

Syntax of spAACeExtElementConfig( )

| Syntax | No. of bits | Mnemonic |
|---|---|---|
| spAACeExtElementConfig( )<br>{<br>    SpAACeExtElementType       = escapedValue(4, 8, 16);<br>    SpAACeExtElementConfigLength = escapedValue(4, 8, 16);<br>    switch (SpAACeExtElementType) {<br>    case ID_EXT_ELE_FILL:<br>        /* No configuration element */<br>        break;<br>    case ID_EXT_ELE_AUDIOPREROLL:<br>        /* No configuration element */<br>        break;<br>    case ID_EXT_ELE_UNI_DRC:<br>        spAACeUniDrcConfig( );<br>        break;<br>    case ID_EXT_ELE_OBJ_METADATA:<br>        ObjectMetadataConfig( );<br>        break;<br>    case ID_EXT_ELE_HOA:<br>        HOAConfig_SN3D( );<br>        break;<br>    case ID_EXT_ELE_ENHANCED_OBJ_METADATA:<br>        EnhancedObjectMetadataConfig( );<br>        break;<br>    default:<br>        while (SpAACeExtElementConfigLength--) {<br>            tmp;<br>        }<br>        break;<br>    }<br>} | <br><br><br><br><br><br><br><br><br><br><br><br><br><br><br><br><br><br><br><br><br><br><br><br>NOTE<br><br>8 | <br><br><br><br><br><br><br><br><br><br><br><br><br><br><br><br><br><br><br><br><br><br><br><br><br><br>uimsbf |

NOTE:
The default entry for the SpAACeExtElementType is used for unknown extElementTypes so that legacy decoders can cope with future extensions.

TABLE A.7.1

Semantics of SpAACeExtElementConfig( )

| | | |
|---|---|---|
| SpAACeExtElementType | This element specifies the extension element type which is defined below. | |
| | SPAACEASPacketType | value |
| | ID_EXT_ELE_FILL | 0 |
| | ID_EXT_ELE_AUDIOPREROLL | 1 |
| | ID_EXT_ELE_UNI_DRC | 2 |
| | ID_EXT_ELE_OBJ_METADATA | 3 |
| | ID_EXT_ELE_HOA | 4 |
| | ID_EXT_ELE_ENHANCED_OBJ_METADATA | 5 |
| | /* reserved */ | 6- |
| SpAACeExtElementConfigLength | This element defines the length of spAACeExtElementConfig in bytes. | |
| spAACeUniDrcConfig( ) | DRC configuration defined in Table 126 of ISO/IEC 23008-3. | |
| ObjectMetadataConfig( ) | Object metadata configuration defined in Table 133 of ISO/IEC 23008-3 (lowDelayMetadataCoding shall be set to 1). | |
| HOAConfig_SN3D( ) | HOA configuration defined Table A.7.2. It is a modified version of Table 8 of ETSI TS 103 589. | |
| EnhancedObjectMetadataConfig( ) | Enhanced object metadata configuration defined in Table 144 of ISO/IEC 23008-3. | |

The following table provides the syntax of the HOAConfig_SN3D function referenced above, followed by the semantics of the HOAConfig_SN3D function:

TABLE A.7.2

Syntax of HOAConfig_SN3D( )

| Syntax | No. of bits | Mnemonic |
|---|---|---|
| HOAConfig_SN3D( ) | | |
| { | | |
|   NumOfHoaCoeffs_E = (HoaOrder_E + 1 )^2; | 5 | uimsbf |
|   IsScreenRelative_E; | 1 | uimsbf |
|   HOADecoderConfig_SN3D(NumOfTransportChannels); | | |
|   if (RecorrIdx == 2) { | 3 | uimsbf |
|     bitDepth; | 4 | uimsbf |
|     if (RecorrMtxSizeFlag) { | 1 | uimsbf |
|       RecorrMtx_numRow = rowIdx + 1; | 4 | uimsbf |
|       RecorrMtx_numCol = colIdx + 1; | 4 | uimsbf |
|     } else { | | |
|       RecorrMtx_numRow = MinAmbHoaOrder_E; | | |
|       RecorrMtx_numCol = MinAmbHoaOrder_E; | | |
|     } | | |
|     MaxValueRecorrMtx; | bitDepth+1 | uimsbf |
|     for (i=0; i< RecorrMtx_numRow; i++){ | | |
|       for (j=0; j< RecorrMtx_numCol; j++){ | | |
|         RecorrMtx(i,j) | | |
|           = tmpValueRecorrMtx/MaxValueRecorrMtx; | bitDepth+1 | bslbf |
|       } | | |
|     } | | |
|   } elseif (RecorrIdx == 3) { | | |
|     BeamAzimuth = 0; | | |
|     BeamElevation = 0; | | |
|     StereoSpread; | 4 | uimsbf |
|     BeamCharacter = BeamCharacterIdx/15; | 4 | uimsbf |
|     InPhasePostprocessingFlag; | 1 | uimsbf |
|     if (hasAngleOffset) { | 1 | uimsbf |
|       BeamAzimuth += azimuthAngleOffset; | 8 | uimsbf |
|       BeamElevation += elevationAngleOffset; | 5 | uimsbf |
|     } | | |
|     RecorrMtx_numRow = 4; | | |
|     RecorrMtx_numCol = 4; | | |
|     RecorrMtx = RecorrMtxGeneration( ); | | |
|   } | | |
| } | | |

TABLE A.7.3

Semantics of HOAConfig_SN3D( )

| | |
|---|---|
| HoaOrder_E | This element determines the HOA order of the coded signal. |
| NumOfHoaCoeffs_E | This element determines the number of HOA coefficients of the coded HOA representation, which is equal to the number of HOA coefficients to be reconstructed. |
| IsScreenRelative_E | This element indicates if the HOA representation shall be rendered with respect to the reproduction screen size as described in ISO/IEC 23008-3, clause 18.4.<br>0: not screen related<br>1: screen related |
| RecorrIdx | This element indicates which decorrelation matrix is applied to recorrelate the ambience signals.<br>0: identity matrix<br>1: the matrix define in ISO/IEC 23008-3<br>2: transmitted recorrelation matrix (method #1)<br>3: transmitted recorrelation matrix (method #2)<br>4-7: reserved |
| HOADecoderConfig_SN3D( ) | This function is defined in Table 9 of ETSI TS 103 589. |
| bitDepth | This element contains information about the coded bit depth. |
| RecorrMtxSizeFlag | If this value is 1, RecorrMtx_numRow and RecorrMtx_numCol are transmitted. Otherwise, the default value of MinNumOfCoeffsForAmbHOA_E is used. |
| MinNumOfCoeffsForAmbHOA_E | This element determines the minimum number of HOA coefficients used for the coding of the ambient HOA. It is defined in Table 9 of ETSI TS 103 589. |
| RecorrMtx_numRow | This element contains information about the number of rows of a recorrection matrix. |
| RecorrMtx_numCol | This element contains information about the number of columns of a recorrection matrix. |
| MaxValueRecorrMtx | It defines the maximum value of RecorrMtx. |
| RecorrMtx(i, j) | This element indicates an i-th row and j-th column of recorrelation matrix. This matrix is applied to ambient channels for (1) recorrelation and/or (2) backward compatible decoding with eAAC of [1]. |

TABLE A.7.3-continued

Semantics of HOAConfig_SN3D( )

| | |
|---|---|
| BeamAzimuth | It defines the azimuth angle for the center of the stereo beams. |
| BeamElevation | It defines the elevation angle for the center of the stereo beams. |
| StereoSpread | It defines the spread angle between the stereo beams (30~120 degree). |
| BeamCharacter | Its value range is between 0.0 and 1.0. |
| InPhasePostprocessingFlag | If this flag is set, in-phase post-processing is performed on the stereo beams. |
| hasAngleOffset | If this flag is set, BeamAzimuth and BeamElevation will be modified by azimuthAngleOffset (−180~180 degree) and elevationAngleOffset (−90~90 degree). |
| RecorrMtxGeneration( ) | This function generates RecorrMtx based on BeamAzimuth, BeamElevation, StereoSpread, BeamCharacter, InPhasePostprocessingFlag. |

The following presents the syntax for the spaceframe function, followed by the semantics.

TABLE A.8

Syntax of spAACeframe( )

| Syntax | No. of bits | Mnemoni |
|---|---|---|
| spAACeFrame( ) <br> { <br> for (elemIdx= 0; elemIdx<numElements; ++elemIdx) { <br> if (spAACeElementType[elemIdx] !=ID_SPAACE_EXT){ <br> elementLength; <br> } | 16 | Uimsbf |
| switch(spAACeElementType[elemIdx]) { <br> case ID_SPAACE_SCE: <br> if (inLegacyPath[elemIdx]) { | | |
| | Note 2 | |
| SpAACe_legacy_single_channel_element( ); <br> } <br> else { <br> SpAACe_single_channel_element( ); <br> } <br> break; <br> case ID_SPAACE_CPE: <br> if inLegacyPath[elemIdx] { <br> SpAACe_legacy_channel_pair_element( ); <br> } | elementLength, Note 1 <br><br><br><br><br><br> Note 2 | |
| else { <br> SpAACe_channel_pair_element( ); <br> } <br> break; <br> case ID_SPAACE_LFE: <br> if inLegacyPath[elemIdx] { <br> SpAACe_legacy_lfe_channel_element( ); <br> } | elementLength, Note 1 <br><br><br><br> Note 2 | |
| else{ <br> SpAACe_lfe_channel_element( ); <br> } <br> break; <br> case ID_SPAACE_CCE: <br> if inLegacyPath[elemIdx]{ | elementLength, Note 1 <br><br><br><br> | |
| SpAACe_legacy_channel_coupling_element( ); <br> } <br> else{ | Note 2 | |
| SpAACe_channel_coupling_element( ); <br> } <br> break; <br> case ID_FIL: <br> if inLegacyPath[elemIdx]{ <br> SpAACe_legacy_fill_element( ); <br> } | elementLength, Note 1 <br><br><br><br><br> Note 2 | |
| else{ <br> SpAACe_fill_element( ); <br> } | elementLength, Note 1 | |

TABLE A.8-continued

Syntax of spAACeframe( )

| Syntax | No. of bits | Mnemoni |
|---|---|---|
|     break;<br>  }<br>} | | |

NOTE 1:
If present, elementLength represents the length of the corresponding element it refers to in number of bits.
Note 2:
These elements are located outside the SpAACeFrame and present in the legacy path of the decoding process as described in Annex B. legacyPathChannelIdx[elemIdx] should be selected from legacy path.

The foregoing table provides syntax regarding how the spAACeAudioStreamPacket may indicate when a spAACeElement is specified in the legacy audio data 25B or in the extended audio data. When the inLegacyPath syntax element is set to one, the corresponding element for that channel is specified in the legacy audio data 25B. When the inLegacyPathSyntax element is set to zero, the corresponding element for that channel is specified in the extended audio data. The following provides the semantics of the spAACeDecoderConfig function:

The following table presents the semantics of the spAACeframe function.

TABLE A.8.1

Semantics of spAACeframe( )

| spAACeElementType | As defined in Table A.6.1 |
|---|---|
| SpAACe_legacy_single_channel_element( ) | single_channel_element( ) from legacy path as described in Table 4.4 in ISO-IEC-14496-3; 2009. |
| SpAACe_single_channel_element( ) | single_channel_element( ) as described in Table 4.4 in ISO-IEC-14496-3; 2009 |
| SpAACe_legacy_channel_pair_element( ) | channel_pair_element( ) from legacy path as described in Table 4.5 in ISO-IEC-14496-3; 2009 . . . |
| SpAACe_channel_pair_element( ) | channel_pair_element( ) as described in Table 4.5 in ISO-IEC-14496-3; 2009 |
| SpAACe_legacy_lfe_channel_element( ) | lfe_channel_element( )from legacy path as described in Table 4.9 in ISO-IEC-14496-3; 2009 . . . |
| SpAACe_lfe_channel_element( ) | lfe_channel_element( ) as described in Table 4.9 in ISO-IEC-14496-3; 2009 |
| SpAACe_legacy_channel_coupling_element( ) | channel_coupling_element( )from legacy path as described in Table 4.8 in ISO-IEC-14496-3; 2009 . . . |
| SpAACe_channel_coupling_element( ) | channel_coupling_element( ) as described in Table 4.8 in ISO-IEC-14496-3; 2009 |
| SpAACe_legacy_fill_element( ) | fill_element( )from legacy path as described in Table 4.11 in ISO-IEC-14496-3; 2009. |
| SpAACe_fill_element( ) | fill_element( ) as described in Table 4.11 in ISO-IEC-14496-3; 2009 |

In this way, the psychoacoustic audio encoding device 406 may process the extended audio data to obtain a spatially formatted extended audio data that conforms to the spAACe audio stream format, prior to embedding the spatially formatted extended audio data in the fill elements associated with the ADTS frame 407A. The spatially formatted extended audio data may conform to the above noted spAACeAudioStream, utilizing any combination of the various indications (which is another way to refer to the above noted example syntax elements). The psychoacoustic audio encoding device 406 may then specify (or, in other words, embed) the spatially formatted extended audio data as fill elements associated with the ADTS frame 407A in the bitstream 21.

Referring next to FIG. 6B, system 12B represents another example of the system 12 shown in FIG. 2. The system 12B may be similar to the system 12A, except that the psychoacoustic audio encoding device 406 specifies the legacy audio data 25B in an audio transport stream 21A, and specifies the extended audio data in a separate audio transport stream 21B. The combination of the first audio transport stream 21A and the second audio transport stream 21B may represent the bitstream 21 shown in the example of FIG. 2.

The psychoacoustic audio encoding device 406 may, in some examples, perform the processing described above with respect to the first audio transport stream 21A, the second audio transport stream 21B or both of the first and second audio transport streams 21A and 21B to obtain spatially formatted audio transport streams. The spatially formatted audio transport streams may conform to the above noted spAACeAudioStream, utilizing any combination of the various indications (which is another way to refer to the above noted example syntax elements).

That is, the psychoacoustic audio encoding device 406 may specify, in the backwards compatible bitstream 21, the first audio transport stream 21A representative of first audio data (e.g., the legacy audio data 25B represented by ADTS frame 407A). The psychoacoustic audio encoding device 406 may also specify, in the backward compatible bitstream 21, the second audio transport stream 21B representative of second audio data (e.g., the extended audio data).

When specifying two or more audio transport streams, there is the potential for the separate streams to arrive independently from one another, such that one or more audio transport streams may arrive before or later than another one of the audio transport streams. When the various audio transport streams arrive earlier or later than other audio transport streams, the audio decoding device 24 may, when reconstructing the HOA coefficients 11' using the extended audio data to enhance the legacy audio data 25B, enhance the legacy audio data 25B using unsynchronized extended audio data, thereby injecting audio artifacts into the HOA coefficients 11'.

In order to avoid the foregoing audio artifacts, the psychoacoustic audio encoding device 406 may specify, in accordance with various aspects of the techniques described in this disclosure, one or more indications identifying synchronization information relative to the first audio transport stream and the second audio transport stream. An example of the one or more indications identifying the synchronization information is described with respect to FIG. 8.

Figure 8:
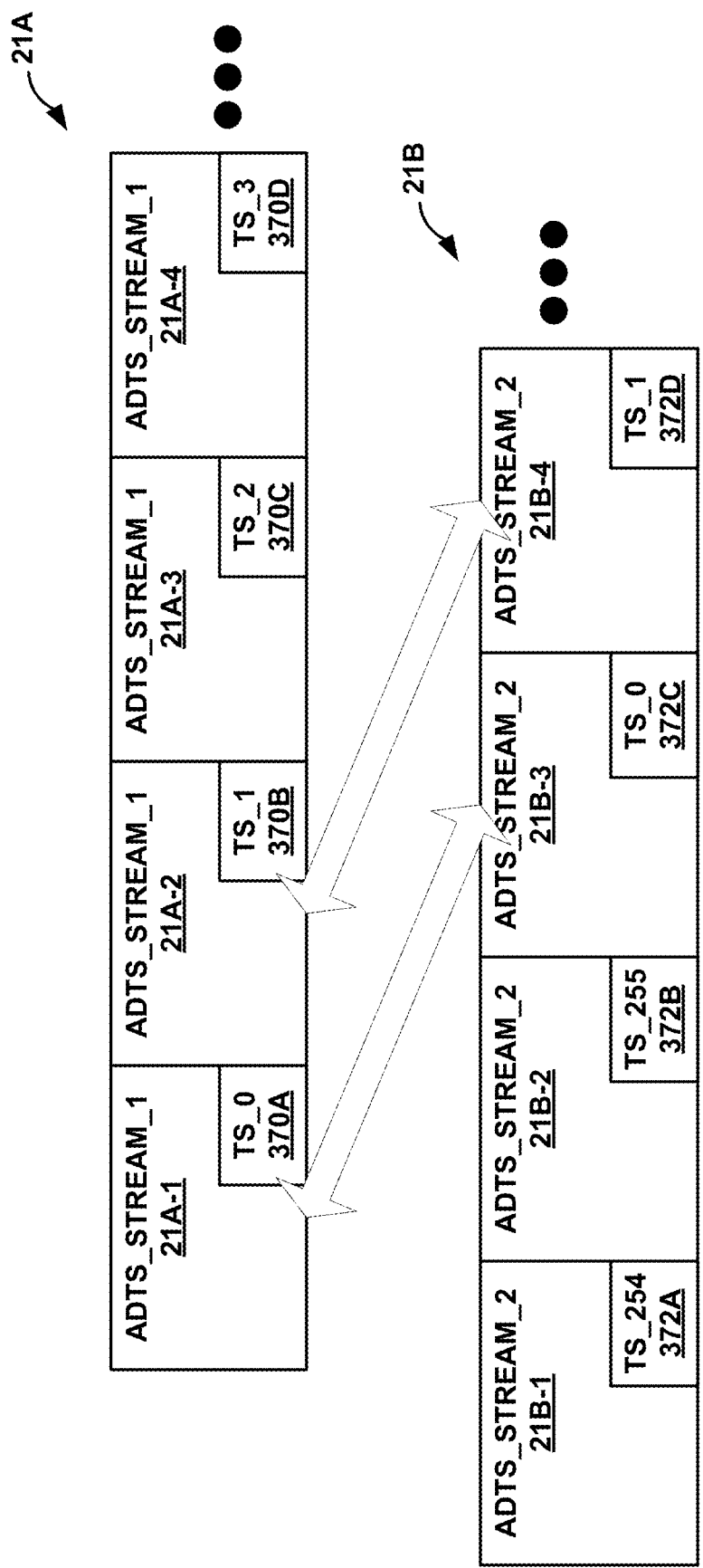
FIG. 8 is a diagram illustrating the audio transport streams of FIG. 6B in more detail.

FIG. 8 is a diagram illustrating the audio transport streams of FIG. 6B in more detail. In the example of FIG. 8, the audio transport stream 21A includes ADTS streaming portions (which may be referred to as frames) 21A-1 through 21A-4. The audio transport stream 21B includes ADTS streaming portions (which may be referred to as frames) 21B-1 through 21B-4.

Each of the ADTS frames 21A-1 through 21A-4 includes a respective one of timestamps (TS) 370A-370D. Each of the ADTS frames 21B-1 through 21B-4 likewise includes a respective one of timestamps (TS) 372A-372D. Each of the timestamps 370A-370D may represent an example indication identifying synchronization information relative to the first audio transport stream 21A. Each of the timestamps 372A-372D may represent an example indication identifying synchronization information relative to the second audio transport stream 21B.

In some examples, each of the timestamps 370A-370D and 372A-372D may include an eight-bit (or some other number of bits) integer that repeats cyclically. That is, assuming an eight-bit integer value, the timestamps 370A-370D may iteratively increase starting at a value of zero for the timestamp 370A, followed by a value of one for the timestamp 370B 1, followed for a value of two for the timestamp 370C, followed by a value of three for the timestamp 370D, etc. until reaching $2^8$-1 (which equals 255) before cyclically repeating with a value of zero up to 255, and so on. The psychoacoustic audio encoding device 406 may specify the same values for the timestamps 372A-372D for those frames 21B-1 through 21B-4 that specify audio data describing the soundfield at the same time.

In the example of FIG. 8, it is assumed that the audio transport stream 21B includes timestamps 372A-372D that have an increasing value from 254 for the timestamp 327A, followed by a value of 255 for the timestamp 372B, and then a value of zero for the timestamp 372C, followed by a value of one for the timestamps 372D. In this respect, the frame 21B-3 is synchronized with the frame 21A-1 as both of the frames 21A-1 and 21B-3 have the timestamps 370A and 372C specifying the same value. The extended audio data from the frame 21B-3 may then be used to enhance, without injecting audio artifacts, the legacy audio data 25B specified by the frame 21A-1.

Likewise, the frame 21B-4 is synchronized with the frame 21A-2 as both of the frames 21A-2 and 21B-4 have the timestamps 370B and 372D specifying the same value. The extended audio data from the frame 21B-4 may then be used to enhance, without injecting audio artifacts, the legacy audio data 25B specified by the frame 21A-2.

Returning to the example of FIG. 6B, the psychoacoustic audio encoding device 406 may output, via a transport layer protocol (such as a transport control protocol—TCP) that provides coarse alignment between the first audio transport stream 21A and the second audio transport stream 21B, the backward compatible bitstream 21. In other words, the psychoacoustic audio encoding device 406 may utilize the transport layer protocol to maintain a course level of alignment (though packet numbers) between the two (or more in some examples) audio transport streams 21A and 21B.

The psychoacoustic audio encoding device 406 may utilize the coarse level of control provided by the transport layer protocol in order to reduce the size of the timestamps 370 and 372. That is, the timestamps 370 and 372 may repeat every 256 frames that allows a max tolerable course alignment offset of 128 frames. The 128 frames at 2048 bytes per frame, and assuming a 48 kilo-Hertz (kHz) sampling rate, provides approximately 5.4 seconds of time synchronization. As such, the psychoacoustic audio encoding device 406 may only maintain synchronization between the audio transport streams 21A and 21B using the timestamps 370 and 372 when there is a course level of alignment that ensures synchronization (or, in other words, time alignment) up to about 5.4 seconds.

In order to specify the timestamps 370 and 372, the psychoacoustic audio encoding device 406 may signal the following syntax elements in a header for each of the ADTS transport stream frames 21A-1 through 21A-4 and 21B-1 through 21B-4:

| | | |
|---|---|---|
| Extension_type | 0011 | fill_element(payload) |
| Extension_type | 1111 | fill_element(timestamp, url) |
| Timestamp | 8 bits | |
| url | ? bits | |

The foregoing syntax elements are specified in accordance with International Standard ISO/IEC 14496-3, entitled "Information technology—Coding of audio-visual objects—Part 3: Audio," and dated Sep. 1, 2009. Although described with respect to the foregoing International Standard, similar syntax elements may be specified in accordance with other standards, both proprietary or not. While similar syntax elements may be utilized, the various values may differ to avoid conflicts, redundancies, or other issues.

The foregoing syntax includes an Extension type syntax element represents an indication identifying that the payload corresponds to the extended audio data. The Extension_type syntax element represents an indication identifying that the frame includes a timestamp. The Extension_type value of 0011 and the Extension_type value of 1111 may be reserved as noted at Table 4.121 of the above International Standard, thereby avoiding the conflicts and other issues surrounding the introduction of new syntax elements.

The timestamp syntax element is the same as the timestamps 370 and 372. The uniform resource location (url) syntax element represents an indication identifying a location within a network from which the audio data is stored or otherwise made available for download via the network. The psychoacoustic audio encoding device 406 may output the bitstream 21 to the audio encoding device 24, as discussed in more detail above with respect to the example of FIG. 2.

Referring back to the example of FIG. 2, the audio decoding device 24 may obtain the bitstream 21 and perform psychoacoustic audio decoding with respect to the bitstream 21 to obtain the bitstream 17 (which may again be referred to as the bitstream 17). The audio decoding device 24 may obtain, from the bitstream 17, the legacy audio data 25B that conforms to the legacy audio format. The audio decoding device 24 may next obtain, from the bitstream 17, the parameters 403.

As shown in the example of FIG. 2, the audio decoding device 24 may include a de-mixing unit (DU) 26, which the audio decoding device 24 may invoke to process, based on the parameters 403, the legacy audio data 25B to obtain the ambient HOA audio data. In some instances, the de-mixing unit 26 may obtain, from the bitstream 21, above described de-mixing data that indicates how to process the legacy audio data 25B to obtain the ambient HOA audio data. In some examples, the de-mixing unit 26 may process, based on the parameters 403, the de-mixing data to obtain the de-mixing matrix described above. In this respect, the de-mixing data includes de-mixing data representative of a de-mixing matrix that converts N input signals into M output signals, where N does not equal M. The de-mixing unit 26 may apply the de-mixing matrix to the legacy audio data 25B to obtain the ambient HOA audio data.

In order to obtain the extended audio data, the audio decoding device 24 may invoke one or more psychoacoustic audio decoding devices, which may perform psychoacoustic decoding with respect to the backward compatible bitstream 21 in a manner reciprocal to either of the two ways (e.g., embedded in fill elements or as a separate audio transport stream) by which the extended audio data may be specified in the bitstream 21 by the psychoacoustic audio encoding device 406.

That is, the psychoacoustic audio decoding device may obtain the enhanced audio data from one or more fill element specified in accordance with the AAC transport format or an AptX transport format. The psychoacoustic audio decoding device may, in the context of fill elements, obtain the ADTS transport frame 407A and decompress the ADTS transport frame 407A to obtain the legacy audio data 25B.

The psychoacoustic audio decoding device may next parse the header 319 from the fill elements. To identify the fill elements, the psychoacoustic audio decoding device may parse the SyncWord syntax element form the header 319 and determine, based on the SyncWord syntax element, that the fill elements 350 specify the extended audio data.

After determining that the fill elements 350 specify the extended audio data, the psychoacoustic audio data may parse the NumFillElements syntax element, the NumSplits syntax element, and, for each of the number of splits, the respective one of the SizeofSplitBytes and TypeofSplit syntax elements. Based on the foregoing syntax elements, the psychoacoustic audio decoding device may obtain the ADTS frames 407B-407M and the metadata 317, and perform psychoacoustic audio decoding with respect to the ADTS frames 407B-407M and the metadata 317 to decompress the ADTS frames 407B-407M and the metadata 317.

When the extended audio data is specified via a separate transport stream 21B, the psychoacoustic audio decoding device may identify that the extended audio data is specified via the separate transport stream 21B by parsing an indication indicating that the extended audio data is specified via an identified separate transport stream. The psychoacoustic audio decoding device may then obtain the second audio transport stream 21B. In this context of separate streams, the audio decoding device 24 may receive the audio transport streams 21A and 21B via a transport layer protocol that provides the above noted course alignment between the first audio transport stream 21A and the second audio transport stream 21B.

The psychoacoustic audio decoding device may next obtain, from the backward compatible bitstream 21, the one or more indications representative of the synchronization information (e.g., the timestamps 370 and 372) for the first audio transport stream 21A and the second audio transport stream 21B. The psychoacoustic audio decoding device may next synchronize, based on the one or more timestamps 370 and 372, the first audio transport stream 21A and the second audio transport stream 21B.

To illustrate, consider again the example of FIG. 8, where the psychoacoustic audio decoding device may compare the timestamp 370A to each of the timestamps 372A-372D, stopping when the timestamp 370A specifies the same value as the timestamp 370C. The psychoacoustic audio decoding device may then synchronize the ADTS stream frame 21A-1 to the ADTS stream frame 21B-3. The psychoacoustic audio decoding device may continue in this manner to synchronize, based on the timestamps 370 and 372, the frames 21A-1 through 21A-4 of the audio transport stream 21A to the frames 21B-1 through 21B-4 of the audio transport stream 21B.

In this respect, the audio decoding device 24 may also obtain, from the bitstream 17, the second portion of the higher order ambisonic audio data. The audio decoding device 24 may obtain, based on the ambient HOA audio data and the second portion of the higher order ambisonic audio data, the HOA audio data 11'.

The audio playback system 16 may then apply one or more of the audio renders 22 to the HOA audio data 11' to obtain the one or more speaker feeds 25A. The audio playback system 16 may next output the one or more speaker feeds 25A to the one or more speakers 3. More information regarding how the legacy and enhanced processing may proceed is described with respect to FIGS. 5A-5D.

In this way, the techniques may enable generation of a backward compatible bitstream 21 having embedded enhanced audio transports that may allow for higher resolution reproduction of a soundfield represented by the enhanced audio transports (relative to legacy audio transports that conform to legacy audio formats, such as mono audio formats, stereo audio formats, and potentially even some surround sound formats, including a 5.1 surround sound format as one example). Legacy audio playback systems that are configured to reproduce the soundfield using one or more of the legacy audio formats may process the backward compatible bitstream, thereby maintaining backwards compatibility.

Enhanced audio playback systems that are configured to reproduce the soundfield using enhanced audio formats (such as some surround sound formats, including, as one example, a 7.1 surround sound format, or a 7.1 surround sound format plus one or more height-based audio sources—7.1+4H) may utilize the enhanced audio transports to enhance, or in other words, extend the legacy audio transport to support enhanced reproduction of the soundfield. As such, the techniques may enable backward compatible audio bitstreams that supports both legacy audio formats and enhanced audio formats.

Further aspects of the techniques may enable synchronization between the enhanced audio transports and legacy audio transports to ensure proper reproduction of the soundfield. Various aspects of the time synchronization techniques may enable the enhanced audio playback systems to identify audio portions of the legacy audio transports that correspond to portions of the enhanced audio transports. The enhanced audio playback systems may then enhance or otherwise extend, based on the corresponding portions of the enhanced audio transports, the portions of the legacy audio transports in a manner that does not inject or otherwise result in audio artifacts.

In this respect, the techniques may facilitate backward compatibility that enables the legacy audio playback systems to remain in use while also promoting adoption of enhanced audio formats that may improve the resolution of soundfield reproduction relative to soundfield reproduction achieved via the legacy audio formats. Promoting adoption of the enhanced audio formats may result in more immersive audio experiences without rendering obsolete the legacy audio systems. The techniques may therefore maintain the legacy audio playback systems ability to reproduce the soundfield, thereby improving or at least maintaining the legacy audio playback systems, while also enabling the evolution of soundfield reproduction through use of the enhanced audio playback systems. As such, the techniques improve the operation of both the legacy audio playback systems and the enhanced audio playback systems themselves.

Figure 3A:
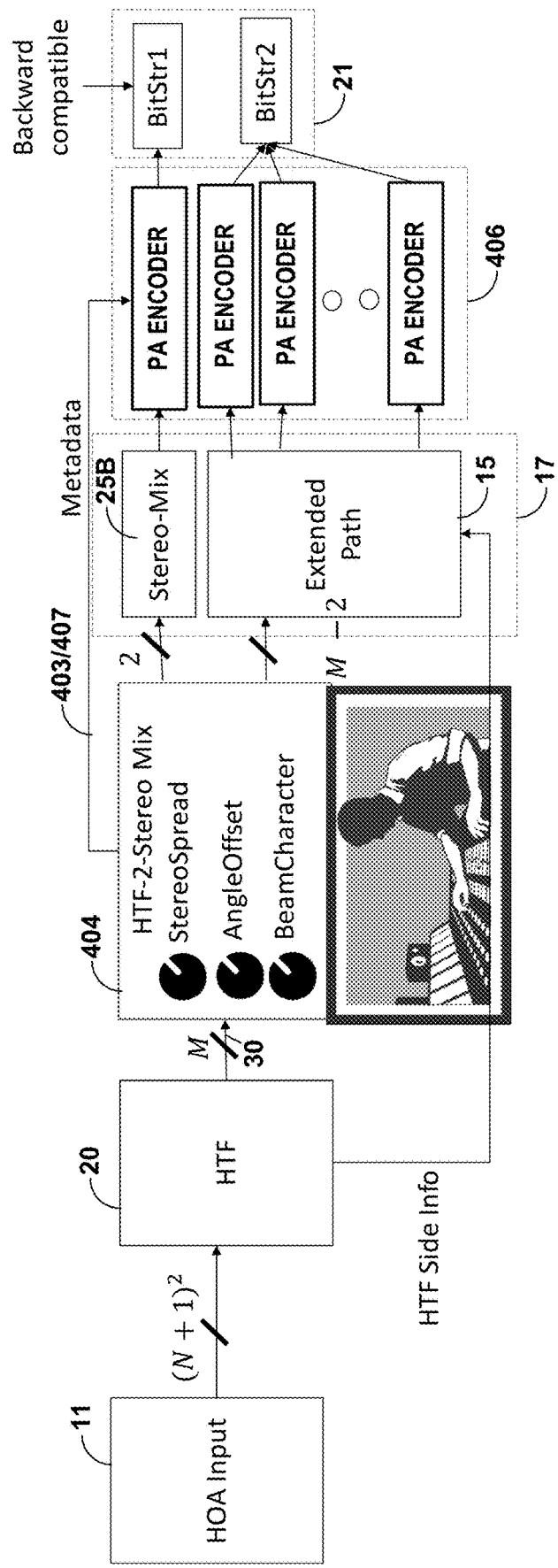
FIGS. 3A-3D are block diagrams illustrating various aspects of the system of FIG. 2 in more detail.

FIGS. 3A-3D are block diagrams illustrating various aspects of the system 10 of FIG. 2 in more detail. As shown in the example of FIG. 3A, the spatial audio encoding device 20 (which may also be referred to as HOA transport format—HTF—device 20 as shown in FIG. 3A) may first obtain HOA audio data 11 (which may also be referred to as HOA input 11 as shown in FIG. 3A). The HTF device 20 may compress the $(N+1)^2$ HOA coefficients per sample (where N is italicized to differentiate from N listed above, and refers to the highest order of a spherical basis function to which an HOA coefficient of the HOA input 11 is associated) into M (where M is italicized to differentiate from M listed above) transport channels 30.

Each transport channel of the M transport channels 30 may specify a single HOA coefficient of the ambient HOA audio data or a predominant audio signal (e.g., an audio object formed by multiplying a U-vector by an S-vector as set forth in the MPEG-H 3D Audio Coding Standard). The HTF device 20 may formulate the bitstream 15 according to various aspects of a Technical Specification (TS), entitled "Higher Order Ambisonics (HOA) Transport Format," dated June 2018, and published by the European Telecommunication Standards Institute (ETSI) as ETSI TS 103 589 v1.1.1. More information regarding the HOA transport format can be found below with respect to FIGS. 9-10C.

In any event, the HTF device 20 may output the Mtransport channels 30 to mixing unit 404, which may apply the parameters 403 discussed above to obtain the legacy audio data 25B (which is shown by way of example in FIG. 3A as a "stereo mix"). The mixing unit 404 may output the legacy audio data 25B as two channels (in the example of legacy stereo audio data) to the psychoacoustic audio encoding device 406 as part of the bitstream 17. The mixing unit 404 may further output the second portion of the HOA audio data remaining in the bitstream 15 as M−2 transport channels, thereby forming the bitstream 17. The mixing unit 404 may also specify the parameters 403 and/or de-mixing matrix 407 as metadata 403/407 in the bitstream 21 formulated by the psychoacoustic audio encoding device 406 in the manner described above in more detail.

The psychoacoustic audio (PA) encoding device 406 may, as one example, apply enhanced advanced audio coding (eAAC) with respect to each of the transport channels of the bitstream 17 to obtain the bitstream 21. eAAC may refer to any number of different types of AAC, such as high efficiency AAC (HE-AAC), HE-AACv2 (which is also referred to as aacPlus v2 or eAAC+), and the like.

While described with respect to eAAC and/or AAC, the techniques may be performed using any type of psychoacoustic audio coding that, as described in more detail below, allows for extension packets (such as the below discussed fill elements) or otherwise allows for backward compatibility. Examples of other psychoacoustic audio codecs include Audio Codec 3 (AC-3), Apple Lossless Audio Codec (ALAC), MPEG-4 Audio Lossless Streaming (ALS), aptX®, enhanced AC-3, Free Lossless Audio Codec (FLAC), Monkey's Audio, MPEG-1 Audio Layer II (MP2), MPEG-1 Audio Layer III (MP3), Opus, and Windows Media Audio (WMA).

Figure 3B:
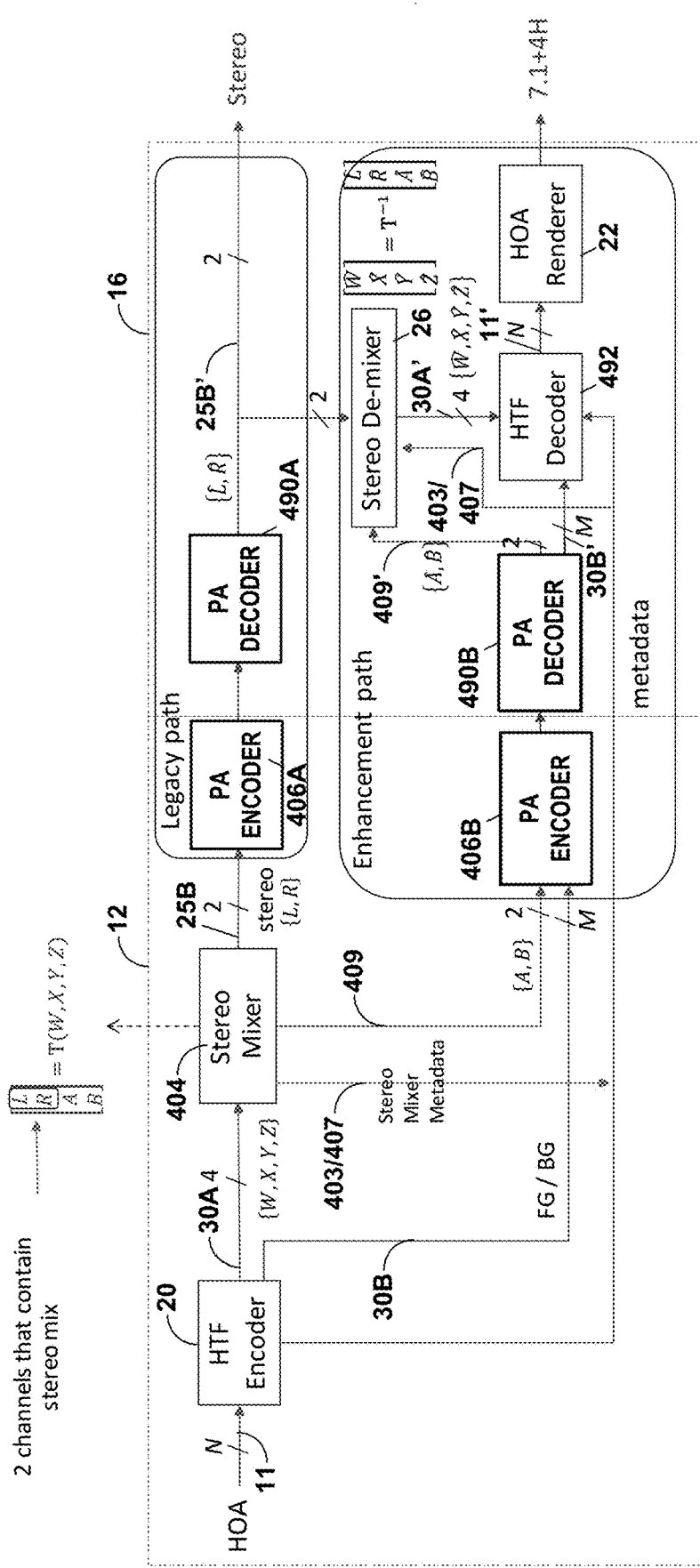

As shown in the example of FIG. 3B, the HTF encoder 20 (which is another name for the HTF device 20) may process HOA input 11 to obtain four ambient HOA coefficients (shown as W, X, Y, and Z) specified in transport channels 30A, and foreground (FG—such as the predominant audio signals) and background (BG—such as the additional ambient HOA coefficients) components specified in transport channels 30B. The mixing unit 404 (which in this example is a stereo mixing unit) may mix the four ambient HOA coefficients to obtain left and right stereo channels 25B. The mixing unit 404 may also output residual audio data 409 resulting from mixing the four ambient HOA coefficients to form the two stereo legacy audio channels 25B.

The psychoacoustic audio (PA) encoding devices 406A and 406B may perform psychoacoustic audio encoding with respect to the legacy audio data 25B, and the residual audio data 409 and the transport channels 30B to obtain the bitstream 21 in the manner described above in more detail. The psychoacoustic audio encoding devices 406A and 406B may output the bitstream 21 to the audio playback system 16.

The audio playback system 16 may invoke psychoacoustic audio decoding devices 490A and 490B to process the bitstream 21 to obtain the legacy audio data 25B' (where the prime notation throughout this disclosure denotes the slight changes discussed above), residual audio data 409', and the transport channels 30B' in the manner described in more detail above. When the audio playback system 16 has been configured to reproduce the soundfield using legacy audio data 25B', the audio playback system 16 may output the legacy audio data 25B' to two stereo speakers 3 (shown as the "Legacy path").

When the audio playback system 16 has been configured to reproduce the soundfield using enhanced audio data set forth in the transport channels 30B, the audio playback system 16 may invoke HTF decoder 492 (which may represent a unit configure to operate in a manner reciprocal to the HTF encoder 20) to decompress the transport channels 30B' to obtain the second portion of the HOA audio data 11'. The audio playback device 16 may also invoke the de-mixing unit 26 to process, based on one or more of the parameters 403 and the de-mixing data 407 (which is denoted by the variable $T^{-1}$, while the mixing matrix is denoted by the variable T), the legacy audio data 25B' to obtain the four ambient HOA coefficients 30A'. The de-mixing unit 26 may output the four ambient HOA coefficients 30A' to the HTF decoder 492.

The HTF decoder 492 may obtain, based on the four ambient HOA coefficients 30A' and the transport channels 30B', the HOA audio data 11'. The HTF decoder 492 may output the HOA audio data 11' to one or more of the audio renderers 22 to obtain enhanced audio data that includes a number of different speaker feeds 25A that are then output to the speakers 3 (which are assumed to be arranged in a 7.1 format with four additional speakers that add height to the reproduction of the soundfield—4H).

Figure 3C:
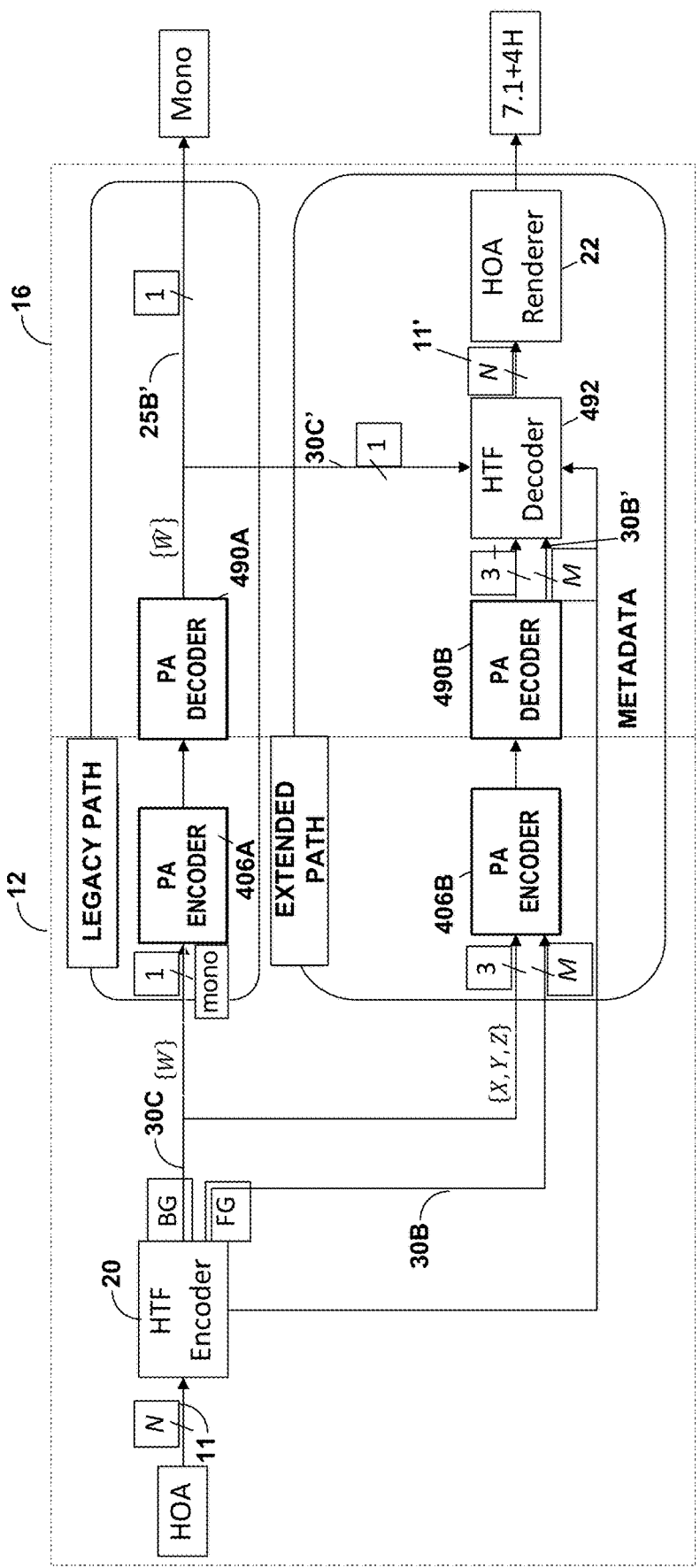

FIG. 3C illustrates an example in which the transport channel 30C includes only one channel (the 'W' channel). As such, the audio data of the transport channel 30C' is not inverse-mixed or de-mixed in the extended path. For instance, the transport channels 30C and 30C' carry audio data conforming to a monaural legacy audio format. In the example of FIG. 3C, the transport channels 30C and 30C' are described as carrying legacy mono audio data. In various use case scenarios, the legacy path of FIG. 3C may also render and output the mono audio data.

Figure 3D:
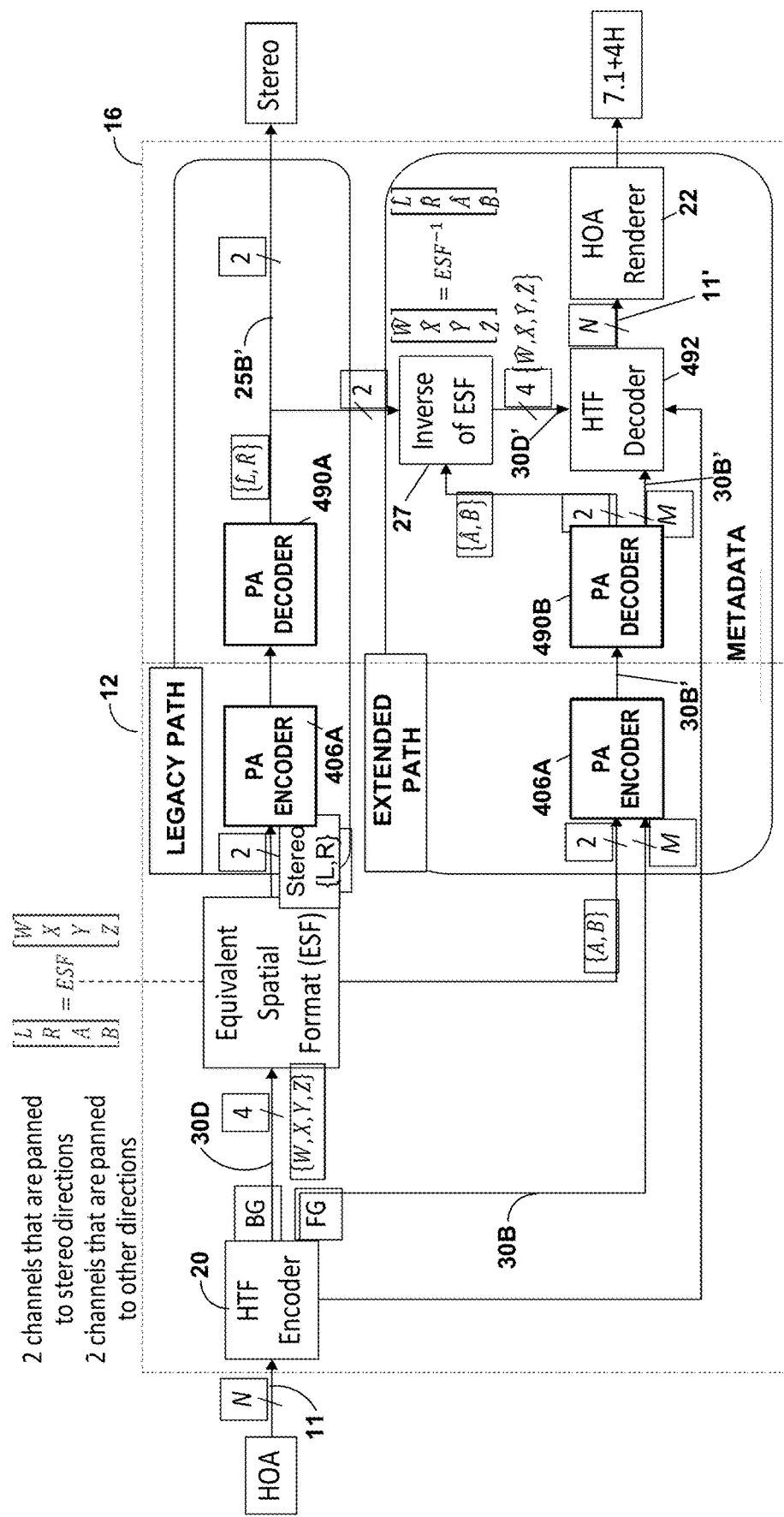

FIG. 3D illustrates an example in which the transport channel 30C includes four channels, namely, the channels defined in the set the {W, X, Y, Z}. The example of FIG. 3D provides backward-compatible encoding, decoding, and playback of audio data that includes objects in the HOA domain as well as 'W', 'X', 'Y', and 'Z' channels, or an extended spatial format ("ESF"). The legacy path in the example of FIG. 3D mixes two channels that are panned to stereo directions and/or two channels that are panned to other directions at an encoding or pre-encoding stage of any legacy ESF audio data, to produce a mixed left-right signal (shown as a mix of L and R signals). The PA decoder 490A of the legacy path provides the decoded ESV signals (shown as L^ and R^) to an inverse mixing unit 27 positioned in the extended path. The inverse mixing unit 27 may use matrix-multiplication to obtain the ESF channels (a total of four channels in this particular example) 30D' of the legacy ESF audio data.

Additionally, the HTF decoder 492 of the extended path may supplement the 3D audio data obtained by decoding the HOA-domain audio data of the transport channels 30B' with the legacy ESF {W^, X^, Y^, Z^} channels 30D' obtained from the inverse mixing unit 27. The HOA renderer 22 may output a combination of the 3D audio data obtained from the decoded HOA-domain audio data of HOA coefficients 11' and the audio data of the legacy stereo-format ESF {W^, X^, Y^, Z^} channels 30D'. In cases of a legacy audio system being incorporated in the illustrated system, the PA decoder 490A may also render and output the legacy ESF audio data, as shown in FIG. 3D.

Figure 4:
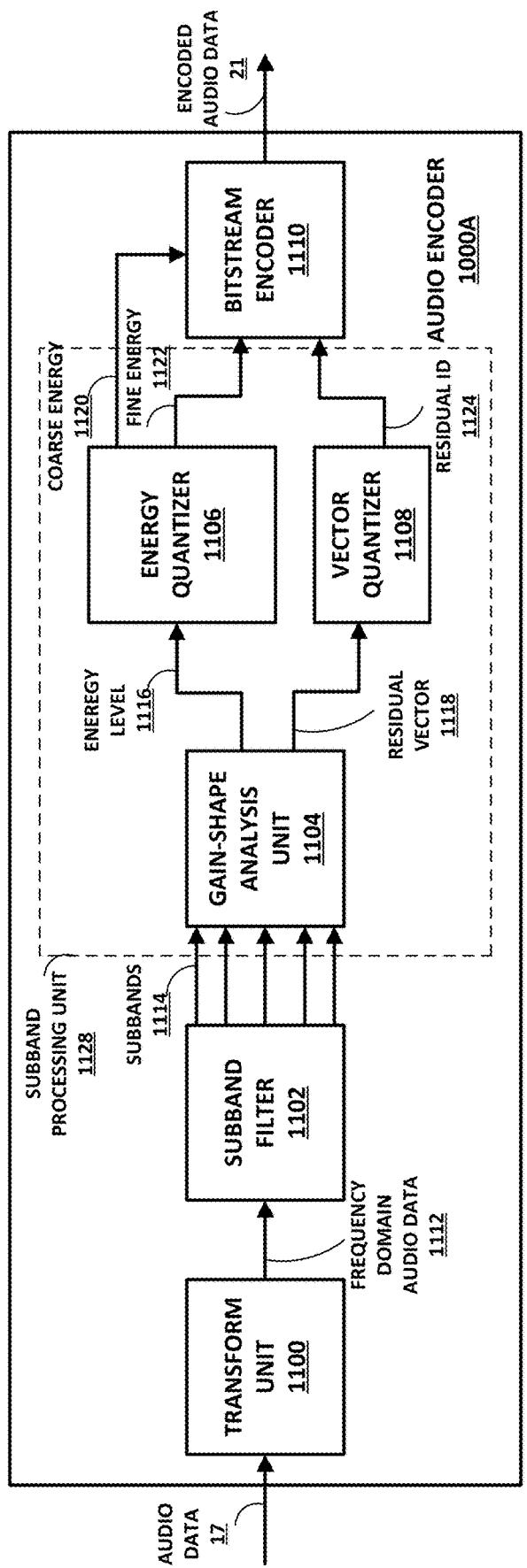
FIG. 4 is a block diagram illustrating an example of the psychoacoustic audio encoders shown in the examples of FIGS. 3A-3D configured to perform various aspects of the techniques described in this disclosure.

FIG. 4 is a block diagram illustrating an example of the psychoacoustic audio encoders shown in the examples of FIGS. 3A-3D configured to perform various aspects of the techniques described in this disclosure. The audio encoder 1000A may represent one example of AptX encoder, which may be configured to encode audio data for transmission over a personal area network or "PAN" (e.g., Bluetooth®). However, the techniques of this disclosure performed by the audio encoder 1000A may be used in any context where the compression of audio data is desired. In some examples, the audio encoder 1000A may be configured to encode the audio data 17 in accordance with as aptX™ audio codec, including, e.g., enhanced aptX-E-aptX, aptX live, and aptX high definition.

In the example of FIG. 4, the audio encoder 1000A may be configured to encode the audio data 17 using a gain-shape vector quantization encoding process that includes coding residual vector using compact maps. In a gain-shape vector quantization encoding process, the audio encoder 1000A is configured to encode both a gain (e.g., an energy level) and a shape (e.g., a residual vector defined by transform coefficients) of a subband of frequency domain audio data. Each subband of frequency domain audio data represents a certain frequency range of a particular frame of the audio data 17.

The audio data 17 may be sampled at a particular sampling frequency. Example sampling frequencies may include 48 kHz or 44.1 kHZ, though any desired sampling frequency may be used. Each digital sample of the audio data 17 may be defined by a particular input bit depth, e.g., 16 bits or 24 bits. In one example, the audio encoder 1000A may be configured operate on a single channel of the audio data 21 (e.g., mono audio). In another example, the audio encoder 1000A may be configured to independently encode two or more channels of the audio data 17. For example, the audio data 17 may include left and right channels for stereo audio. In this example, the audio encoder 1000A may be configured to encode the left and right audio channels independently in a dual mono mode. In other examples, the audio encoder 1000A may be configured to encode two or more channels of the audio data 17 together (e.g., in a joint stereo mode). For example, the audio encoder 1000A may perform certain compression operations by predicting one channel of the audio data 17 with another channel of the audio data 17.

Regardless of how the channels of the audio data 17 are arranged, the audio encoder 1000A obtains the audio data 17 and sends that audio data 17 to a transform unit 1100. The transform unit 1100 is configured to transform a frame of the audio data 17 from the time domain to the frequency domain to produce frequency domain audio data 1112. A frame of the audio data 17 may be represented by a predetermined number of samples of the audio data. In one example, a frame of the audio data 17 may be 1024 samples wide. Different frame widths may be chosen based on the frequency transform being used and the amount of compression desired. The frequency domain audio data 1112 may be represented as transform coefficients, where the value of each the transform coefficients represents an energy of the frequency domain audio data 1112 at a particular frequency.

In one example, the transform unit 1100 may be configured to transform the audio data 17 into the frequency domain audio data 1112 using a modified discrete cosine transform (MDCT). An MDCT is a "lapped" transform that is based on a type-IV discrete cosine transform. The MDCT is considered "lapped" as it works on data from multiple frames. That is, in order to perform the transform using an MDCT, transform unit 1100 may include a fifty percent overlap window into a subsequent frame of audio data. The overlapped nature of an MDCT may be useful for data compression techniques, such as audio encoding, as it may reduce artifacts from coding at frame boundaries. The transform unit 1100 need not be constrained to using an MDCT but may use other frequency domain transformation techniques for transforming the audio data 17 into the frequency domain audio data 1112.

A subband filter 1102 separates the frequency domain audio data 1112 into subbands 1114. Each of the subbands 1114 includes transform coefficients of the frequency domain audio data 1112 in a particular frequency range. For instance, the subband filter 1102 may separate the frequency domain audio data 1112 into twenty different subbands. In some examples, subband filter 1102 may be configured to separate the frequency domain audio data 1112 into subbands 1114 of uniform frequency ranges. In other examples, subband filter 1102 may be configured to separate the frequency domain audio data 1112 into subbands 1114 of non-uniform frequency ranges.

For example, subband filter 1102 may be configured to separate the frequency domain audio data 1112 into subbands 1114 according to the Bark scale. In general, the subbands of a Bark scale have frequency ranges that are perceptually equal distances. That is, the subbands of the Bark scale are not equal in terms of frequency range, but rather, are equal in terms of human aural perception. In general, subbands at the lower frequencies will have fewer transform coefficients, as lower frequencies are easier to perceive by the human aural system. As such, the frequency domain audio data 1112 in lower frequency subbands of the subbands 1114 is less compressed by the audio encoder 1000A, as compared to higher frequency subbands. Likewise, higher frequency subbands of the subbands 1114 may include more transform coefficients, as higher frequencies are harder to perceive by the human aural system. As such, the frequency domain audio 1112 in data in higher frequency subbands of the subbands 1114 may be more compressed by the audio encoder 1000A, as compared to lower frequency subbands.

The audio encoder 1000A may be configured to process each of subbands 1114 using a subband processing unit 1128. That is, the subband processing unit 1128 may be configured to process each of subbands separately. The subband processing unit 1128 may be configured to perform a gain-shape vector quantization process with extended-range coarse-fine quantization in accordance with techniques of this disclosure.

A gain-shape analysis unit 1104 may receive the subbands 1114 as an input. For each of subbands 1114, the gain-shape analysis unit 1104 may determine an energy level 1116 of each of the subbands 1114. That is, each of subbands 1114 has an associated energy level 1116. The energy level 1116 is a scalar value in units of decibels (dBs) that represents the total amount of energy (also called gain) in the transform coefficients of a particular one of subbands 1114. The gain-shape analysis unit 1104 may separate energy level 1116 for one of subbands 1114 from the transform coefficients of the subbands to produce residual vector 1118. The residual vector 1118 represents the so-called "shape" of the subband. The shape of the subband may also be referred to as the spectrum of the subband.

A vector quantizer 1108 may be configured to quantize the residual vector 1118. In one example, the vector quantizer 1108 may quantize the residual vector using a quantization process to produce the residual ID 1124. Instead of quantizing each sample separately (e.g., scalar quantization), the vector quantizer 1108 may be configured to quantize a block of samples included in the residual vector 1118 (e.g., a shape vector. However, any vector quantization techniques method can be used along with the extended-range coarse-fine energy quantization techniques of this disclosure.

In some examples, the audio encoder 1000A may dynamically allocate bits for coding the energy level 1116 and the residual vector 1118. That is, for each of subbands 1114, the audio encoder 1000A may determine the number of bits allocated for energy quantization (e.g., by the energy quantizer 1106) and the number of bits allocated for vector quantization (e.g., by the vector quantizer 1108). The total number of bits allocated for energy quantization may be referred to as energy-assigned bits. These energy-assigned bits may then be allocated between a coarse quantization process and a fine quantization process.

An energy quantizer 1106 may receive the energy level 1116 of the subbands 1114 and quantize the energy level 1116 of the subbands 1114 into a coarse energy 1120 and a fine energy 1122 (which may represent one or more quantized fine residuals). This disclosure will describe the quantization process for one subband, but it should be understood that the energy quantizer 1106 may perform energy quantization on one or more of the subbands 1114, including each of the subbands 1114.

In general, the energy quantizer 1106 may perform a recursive two-step quantization process. Energy quantizer 1106 may first quantize the energy level 1116 with a first number of bits for a coarse quantization process to generate the coarse energy 1120. The energy quantizer 1106 may generate the coarse energy using a predetermined range of energy levels for the quantization (e.g., the range defined by a maximum and a minimum energy level. The coarse energy 1120 approximates the value of the energy level 1116.

The energy quantizer 1106 may then determine a difference between the coarse energy 1120 and the energy level 1116. This difference is sometimes called a quantization error. The energy quantizer 1106 may then quantize the quantization error using a second number of bits in a fine quantization process to produce the fine energy 1122. The number of bits used for the fine quantization bits is determined by the total number of energy-assigned bits minus the number of bits used for the coarse quantization process. When added together, the coarse energy 1120 and the fine energy 1122 represent a total quantized value of the energy level 1116. The energy quantizer 1106 may continue in this manner to produce one or more fine energies 1122.

The audio encoder 1000A may be further configured to encode the coarse energy 1120, the fine energy 1122, and the residual ID 1124 using a bitstream encoder 1110 to create the encoded audio data 21 (which is another way to refer to the bitstream 21). The bitstream encoder 1110 may be configured to further compress the coarse energy 1120, the fine energy 1122, and the residual ID 1124 using one or more entropy encoding processes. Entropy encoding processes may include Huffman coding, arithmetic coding, context-adaptive binary arithmetic coding (CABAC), and other similar encoding techniques.

In one example of the disclosure, the quantization performed by the energy quantizer 1106 is a uniform quantization. That is, the step sizes (also called "resolution") of each quantization are equal. In some examples, the steps sizes may be in units of decibels (dBs). The step size for the coarse quantization and the fine quantization may be determined, respectively, from a predetermined range of energy values for the quantization and the number of bits allocated for the quantization. In one example, the energy quantizer 1106 performs uniform quantization for both coarse quantization (e.g., to produce the coarse energy 1120) and fine quantization (e.g., to produce the fine energy 1122).

Performing a two-step, uniform quantization process is equivalent to performing a single uniform quantization process. However, by splitting the uniform quantization into two parts, the bits allocated to coarse quantization and fine quantization may be independently controlled. This may allow for more flexibility in the allocation of bits across energy and vector quantization and may improve compression efficiency. Consider an M-level uniform quantizer, where M defines the number of levels (e.g., in dB) into which the energy level may be divided. M may be determined by the number of bits allocated for the quantization. For example, the energy quantizer 1106 may use M1 levels for coarse quantization and M2 levels for fine quantization. This equivalent to a single uniform quantizer using M1*M2 levels.

Figure 5:
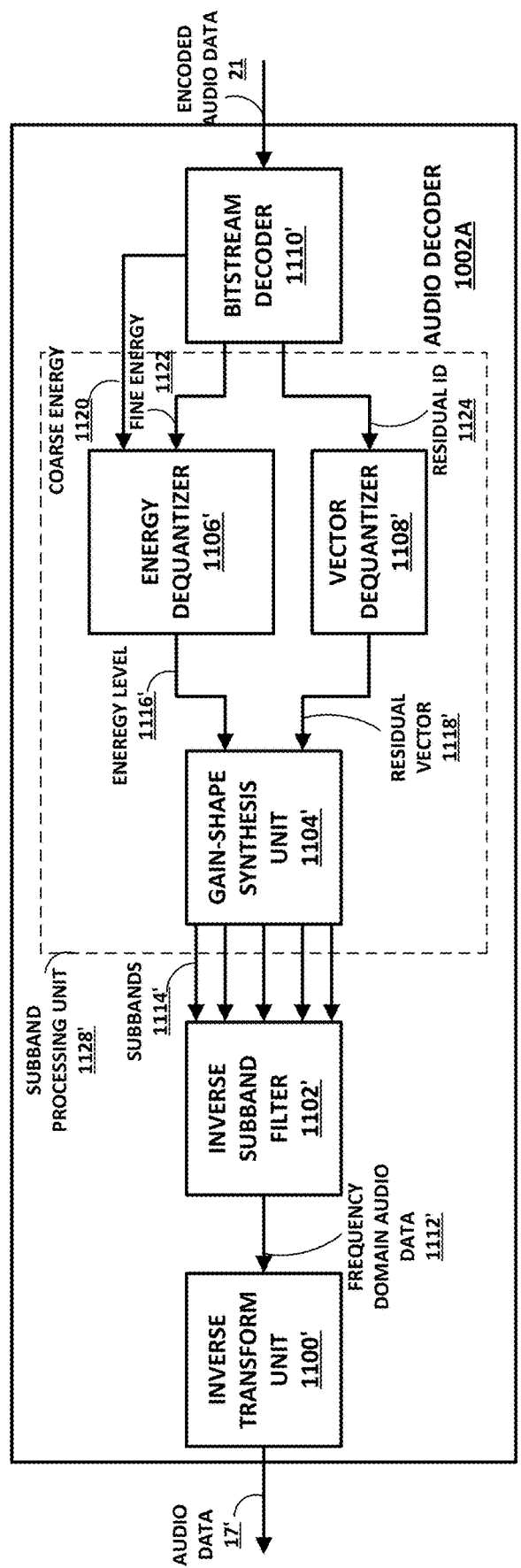
FIG. 5 is a block diagram illustrating an implementation of the psychoacoustic audio decoder of FIGS. 3A-3D in more detail.

FIG. 5 is a block diagram illustrating an implementation of the psychoacoustic audio decoder of FIGS. 3A-3D in more detail. The audio decoder 1002A may represent one example of an AptX decoder, which may be configured to decode audio data received over a PAN (e.g., Bluetooth®). However, the techniques of this disclosure performed by the audio decoder 1002A may be used in any context where the compression of audio data is desired. In some examples, the audio decoder 1002A may be configured to decode the audio data 21 in accordance with as aptX™ audio codec, including, e.g., enhanced aptX—E-aptX, aptX live, and aptX high definition. However, the techniques of this disclosure may be used in any audio codec configured to perform quantization of audio data. The audio decoder 1002A may be configured to perform various aspects of a quantization process using compact maps in accordance with techniques of this disclosure.

In general, the audio decoder 1002A may operate in a reciprocal manner with respect to audio encoder 1000A. As such, the same process used in the encoder for quality/bitrate scalable cooperative PVQ can be used in the audio decoder 1002A. The decoding is based on the same principals, with inverse of the operations conducted in the decoder, so that audio data can be reconstructed from the encoded bitstream received from encoder. Each quantizer has an associated dequantizater counterpart. For example, as shown in FIG. 5, inverse transform unit 1100', inverse subband filter 1102', gain-shape synthesis unit 1104', energy dequantizer 1106', vector dequantizer 1108', and bitstream decoder 1110' may be respectively configured to perform inverse operations with respect to transform unit 1100, subband filter 1102, gain-shape analysis unit 1104, energy quantizer 1106, vector quantizer 1108, and bitstream encoder 1110 of FIG. 4.

In particular, the gain-shape synthesis unit 1104' reconstructs the frequency domain audio data, having the reconstructed residual vectors along with the reconstructed energy levels. The inverse subband filter 1102' and the inverse transform unit 1100' output the reconstructed audio data 17'. In examples where the encoding is lossless, the reconstructed audio data 17' may perfectly match the audio data 17. In examples where the encoding is lossy, the reconstructed audio data 17' may not perfectly match the audio data 17.

In this way, the audio decoder 1002A represents a device configured to receive an encoded audio bitstream (e.g., encoded audio data 21); decode, from the encoded audio bitstream, a unique identifier for each of a plurality of subbands of audio data (e.g., bitstream decoder 1110' outputs residual ID 1124); perform inverse pyramid vector quantization (PVQ) using a compact map to reconstruct a residual vector for each subband of the plurality of subbands of the audio data based on the unique identifier for the respective subband of the plurlaity of subbands of the audio data (e.g., vector dequantizer 1108' performs the inverse quantization); and reconstruct, based on the residual vectors and energy scalars for each subband, the plurality of subbands of the audio data (e.g., gain-shape synthesis unit 1104' reconstructs the subbands 1114').

In this way, FIGS. 3A-3D illustrate various examples of audio playback systems that are configured to present legacy format (e.g., mono, stereo, or ESF audio signals) in conjunction with 3D audio data obtained from HOA-domain audio data, to enable better (in terms of user perception) audio playback for legacy audio playback systems. In this way, the systems of FIGS. 3A-3D may improve the operation of the audio playback systems themselves. It will be appreciated that each of the systems illustrated in FIGS. 3A-3D may represent a distributed system, in which the encoding portions of the legacy and/or extended paths are physically separate from, while being in communication with, the decoding and rendering components of the legacy and/or extended paths.

Figure 9:
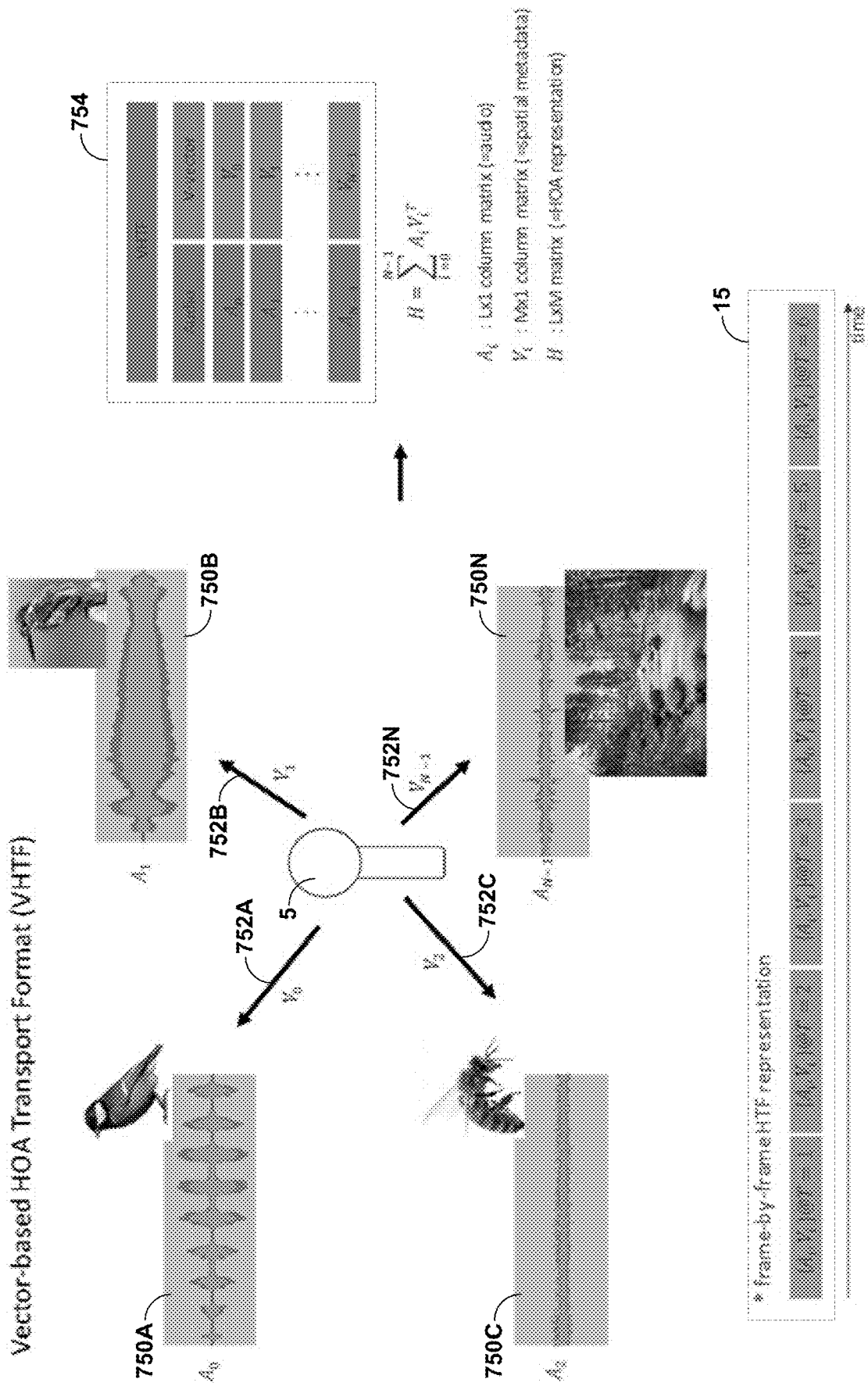
FIG. 9 is a diagram illustrating various aspects of the spatial audio encoding device of FIGS. 2-4 in performing various aspects of the techniques described in this disclosure.

FIG. 9 is a diagram illustrating various aspects of the spatial audio encoding device of FIGS. 2-4 in perform various aspects of the techniques described in this disclosure. In the example of FIG. 9, microphone 5 captures audio signals representative of HOA audio data, which the spatial audio encoder device 20 reduces to a number of different sound components 750A-750N ("sound components 750") and corresponding spatial components 752A-752N ("spatial components 752"), where the spatial components may generally refer to both the spatial components corresponding to predominant sound components and the corresponding repurposed sound components.

As shown in a table 754, the unified data object format, which may be referred to as a "V-vector based HOA transport format" (VHTF) or "vector based HOA transport format" in the case bitstreams, may include an audio object (which again is another way to refer to a sound component), and a corresponding spatial component (which may be referred to as a "vector"). The audio object (shown as "audio" in the example of FIG. 9) may be denoted by the variable $A_i$, where i denotes the i-th audio object. The vector (shown as "V-vector" in the example of FIG. 9) is denoted by the variable $V_i$, where i denotes the i-th vector. $A_i$ is an L×1 column matrix (with L being the number of samples in the frame), and $V_i$ is a M×1 column matrix (with M being the number of elements in the vector).

The reconstructed HOA coefficients 11' may be denoted as $\tilde{H}$. The reconstructed HOA coefficients 11' may be determined according to the following equation:

$$\tilde{H} = \sum_{i=0}^{N-1} A_i V_i^T$$

According to the above equation, N denotes a total number of sound components in the selected non-zero subset of the plurality of spatial components. The reconstructed HOA coefficients 11' ($\tilde{H}$) may be determined as a summation of each iterative (up to N−1 starting at zero) multiplication of the audio object ($A_i$) by the transpose of the vector ($V_i^T$). The spatial audio encoding device 20 may specify the bitstream 15 as shown at the bottom of FIG. 9, where the audio objects 750 are specified along with corresponding spatial components 752 in each frame (denoted by T=1 for the first frame, T=2 for the second frame, etc.).

Figure 10A:
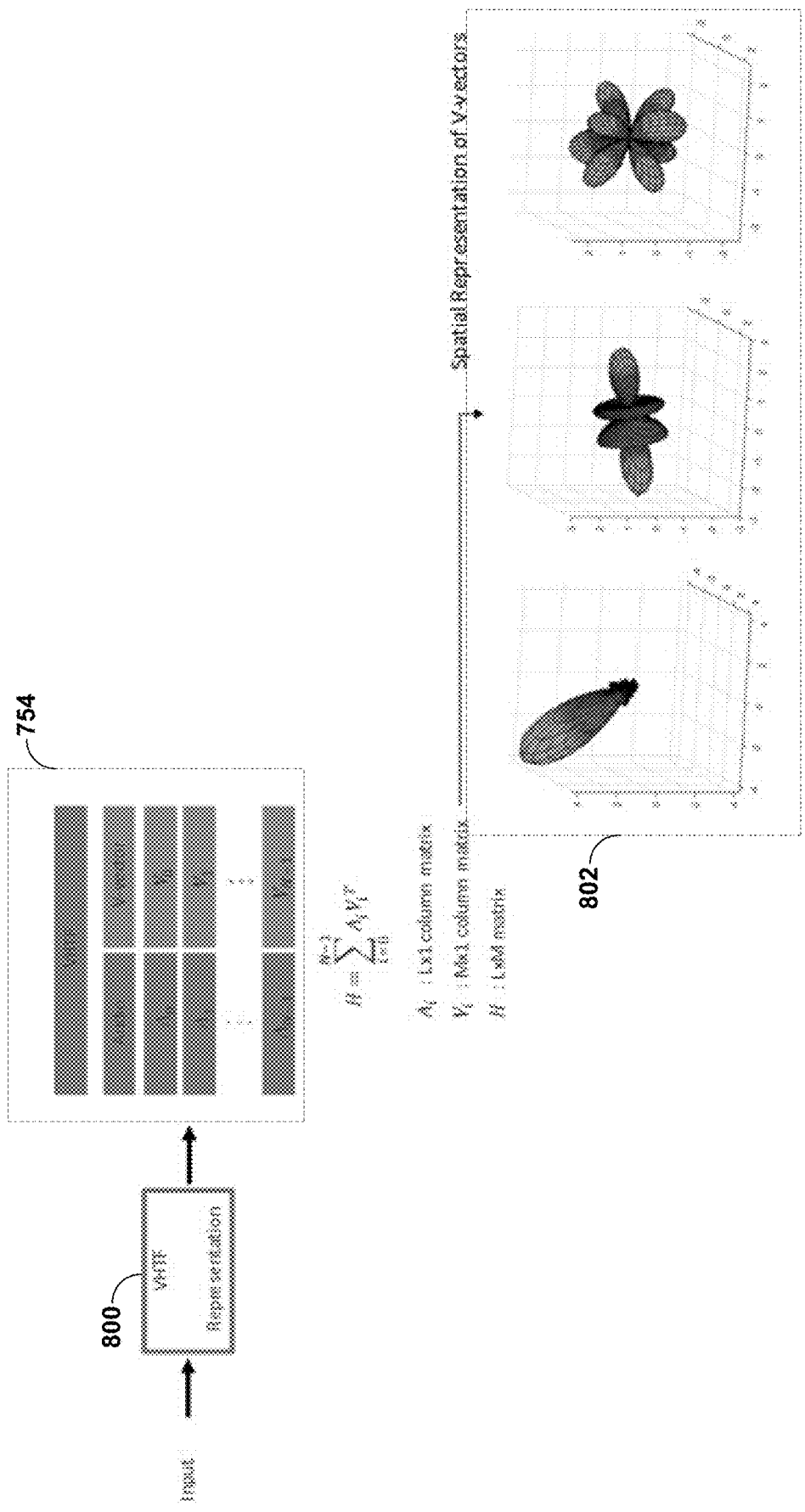
FIGS. 10A-10C are diagrams illustrating different representations within the bitstream according to various aspects of the unified data object format techniques described in this disclosure.
Figure 10B:
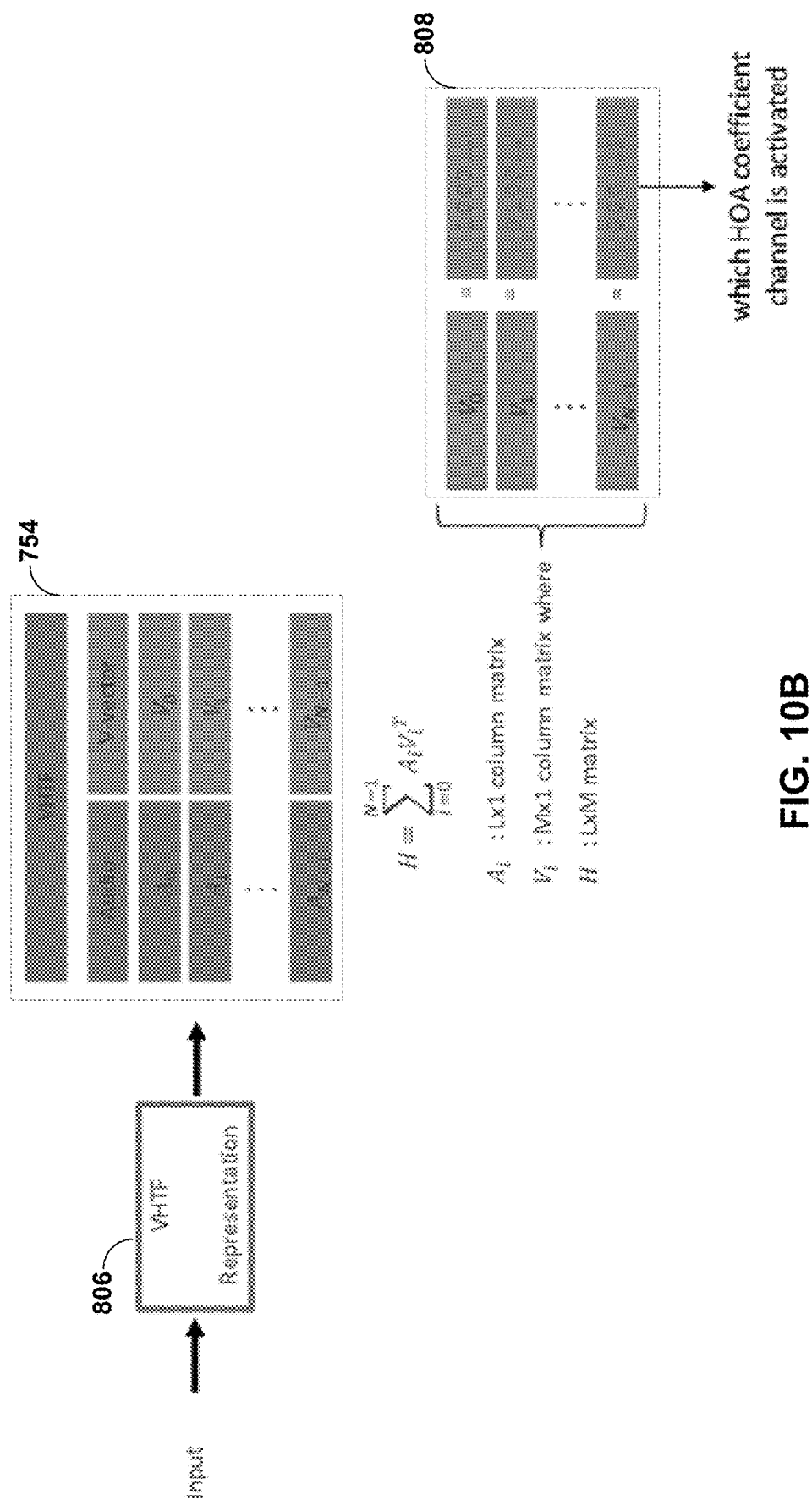
Figure 10C:
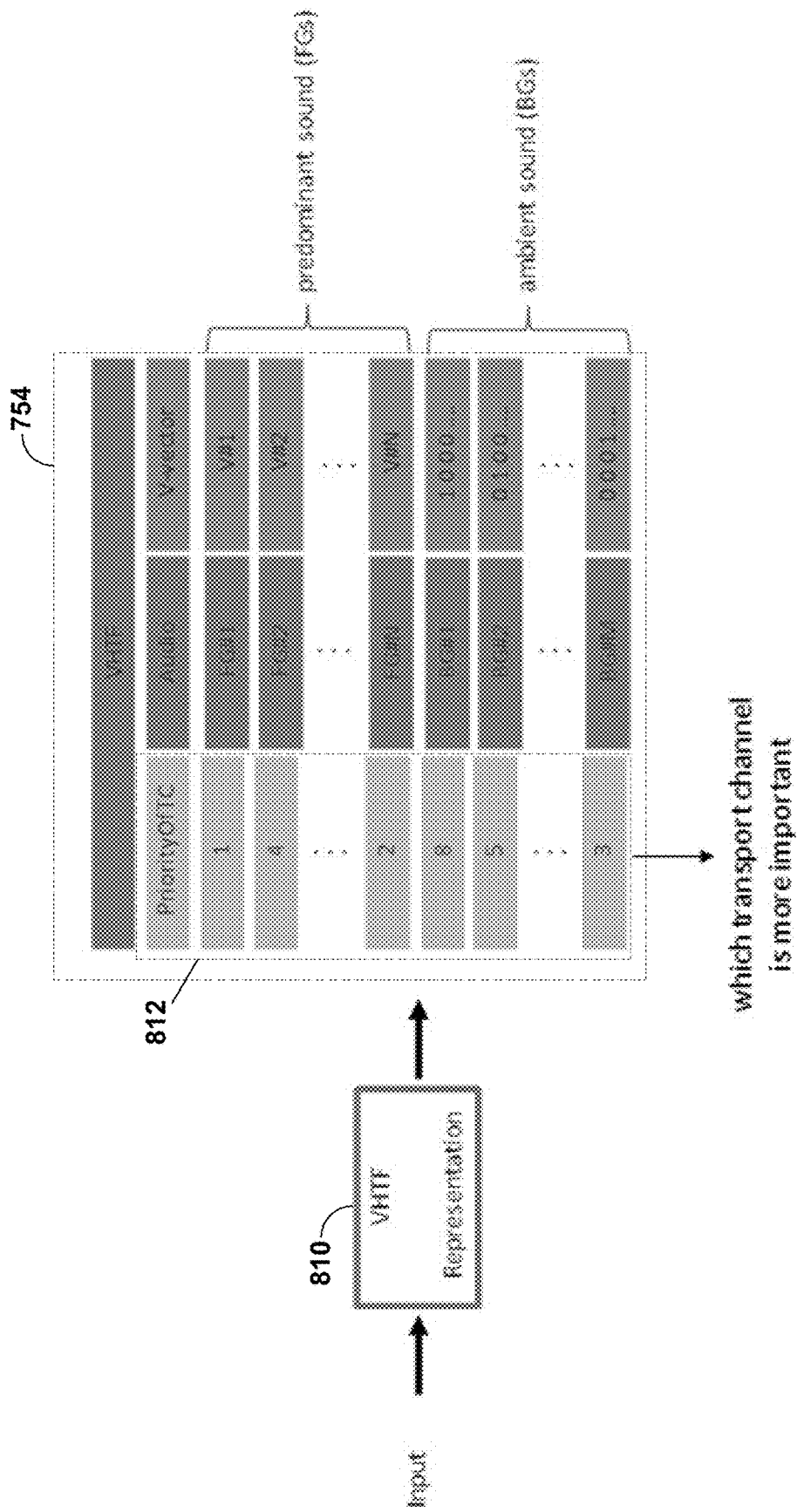

FIGS. 10A-10C are diagrams illustrating different representations within the bitstream according to various aspects of the unified data object format techniques described in this disclosure. In the example of FIG. 10A, the HOA coefficients 11 are shown as "input", which the spatial audio encoding device 20 shown in the example of FIG. 2 may transform into a VHTF representation 800 as described above. The VHTF representation 800 in the example of FIG. 10A represents the predominant sound (or foreground—FG—sound) representation. The table 754 is further shown to illustrate the VHTF representation 800 in more detail. In the example of FIG. 10A, there are also spatial representations 802 of the different V-vectors to illustrate how the spatial component defines shape, widths, and directions of the corresponding spatial component.

In the example of FIG. 10B, the HOA coefficients 11 are shown as "input", which the spatial audio encoding device 20 shown in the example of FIG. 2 may transform into a VHTF representation 806 as described above. The VHTF representation 806 in the example of FIG. 8B represents the ambient sound (or background—BG—sound) representation. The table 754 is further shown to illustrate the VHTF representation 806 in more detail, where both the VHTF representation 800 and the VHTF representation 806 have the same format. In the example of FIG. 10B, there are also examples 808 of the different repurposed V-vectors to illustrate how the repurposed V-vectors may include a single element with a value of one with every other element being set to a value of zero so as to, as described above, identify the order and sub-order of the spherical basis function to which the ambient HOA coefficient corresponds.

In the example of FIG. 10C, the HOA coefficients 11 are shown as "input", which the spatial audio encoding device 20 shown in the example of FIG. 2 may transform into a VHTF representation 810 as described above. The VHTF representation 810 in the example of FIG. 8C represents the sound components, but also includes the priority information 812 (shown as "PriorityOfTC," which refers to a priority of transport channels). The table 754 is updated in FIG. 10C to further illustrate the VHTF representation 810 in more detail, where both the VHTF representation 800 and the VHTF representation 806 have the same format and VHTF representation 810 includes the priority information 812.

In each instance, the spatial audio encoding device 20 may specify the unified transport type (or, in other words, the VHTF) by setting the HoaTransportType syntax element in the following table to 3.

| Syntax | No. of bits | Mnemonic |
|---|---|---|
| HOATransportConfig( ) | | |
| { | | |
|   HoaTransportType; | 3 | uimsbf |
|   if (HoaTransportType == 0) { | | |
|     InputSamplingFrequency; | 3 | uimsbf |
|     HoaOrder; | 3 | uimsbf |
|     NumOfHoaCoeffs = ( HoaOrder + 1 )^2; | 2 | uimsbf |
|     HoaNormalization; | 2 | uimsbf |
|     HoaCoeffOrdering; | 1 | bslbf |
|     IsScreenRelative; | | |
|     if (IsScreenRelative) { | 1 | bslbf |
|       hasNonStandardScreenSize; | | |
|       if (hasNonStandardScreenSize) { | 9 | uimsbf |
|         bsScreenSizeAz; | 9 | uimsbf |
|         bsScreenSizeTopEl; | 9 | uimsbf |
|         bsScreenSizeBottomEl; | | |
|       } | | |
|     } | | |
|   } else if (HoaTransportType == 1) { | | |
|     HoaNormalization = 1; | | |
|     HoaCoeffOrdering = 0; | | |
|     HOAConfig( ); | | |
|   } else if (HoaTransportType == 2) { | | |
|     HoaNormalization = 0; | | |
|     HoaCoeffOrdering = 0; | | |
|     HOAConfig_SN3D( ); | 3 | uimsbf |
|   } else if (HoaTransportType == 3) { | 3 | uimsbf |
|     InputSamplingFrequency; | 3 | uimsbf |
|     HoaFrameLength; | | |
|     HoaOrder; | | |
|     NumOfHoaCoeffs = ( HoaOrder + 1 )^2; | 1 | bslbf |
|     HoaNormalization = 0; | | |
|     HoaCoeffOrdering = 0; | 1 | bslbf |
|     IsScreenRelative; | | |
|     if (IsScreenRelative) { | 9 | uimsbf |
|       hasNonStandardScreenSize; | 9 | uimsbf |
|       if (hasNonStandardScreenSize) { | 9 | uimsbf |
|         bsScreenSizeAz; | | |
|         bsScreenSizeTopEl; | | |
|         bsScreenSizeBottomEl; | 4 | uimsbf |
|       } | | |
|     } | | |
|     NumOfTransportChannels = CodedNumOfTransportChannels + 1; | | |
|   } | | |
| } | | |

As noted in the below table, the HoaTransportType indicates the HOA transport mode, and when set to a value of three (3) signals that the transport type is VHTF.

| | |
|---|---|
| HoaTransportType | This element contains information about HOA transport mode.<br>0: HOA coefficients (as defined in this clause)<br>1: ISO/IEC 23008-3-based HOA Transport Format<br>2: Modified ISO/IEC 23008-3-based HOA Transport Format for SN3D normalization<br>3: V-vector based HOA Transport Format (VHTF) as defined below<br>4-7: reserved |

Regarding the VHTF (HoaTransportType=3), FIGS. 9 and 10A-10C may illustrate how VHTF is composed of audio signals, $\{A_i\}$, and the associated V-vectors, $\{V_i\}$, where an input HOA signal, H, can be approximated by $$\tilde{H} = \sum_{i=0}^{N-1} A_i V_i^T$$

where an i-th V-vector, $V_{ti}$, is the spatial representation of the i-th audio signal, and A. N is the number of transport channels. The dynamic range of each $V_i$ is bound by $[-1, 1]$ Examples of V-vector based spatial representation 802 are shown in FIG. 10A.

VHTF can also represent an original input HOA, which means $\tilde{H}=H$, in the following conditions:
if $V_i$ has all zero elements but one at an i-th element $[0\ 0\ \ldots\ 1\ \ldots\ ]^T$
and if $A_i$ is the i-th HOA coefficients.

Thus, VHTF can represent both pre-dominant and ambient sound fields.

As shown in the table below, the HOAFrame_VvecTransportFormat( ) holds the information that is required to decode the L samples (HoaFrameLength in Table 1) of an HOA frame.

Syntax of HOAFrame_VvecTransportFormat( )

| Syntax | No. of bits | Mnemonic |
|---|---|---|
| HOAFrame_VvecTransportFormat( ) | | |
| { | | uimsbf |
|     VvectorBits = codedVvectorBitDepth*2+1;<br>    PriorityBits = ceil(log2(NumOfTransportChannels)); | 3 | uimsbf |
|     for (i=0;i<NumOfTransportChannels;i++) {<br>        priorityOfTC[i]; | PriorityBits | uimsbf |
|         for (j=0;j<NumOfHoaCoeffs; j++) {<br>            Vvector[i][j];<br>        }<br>    }<br>} | VvectorBits | |

| | |
|---|---|
| NumOfTransportChannels | This element contains information about the number of transport channels defined in Table 1. |
| codedVvectorBitDepth | This element contains information about the coded bit depth of a V-vector. |
| NumOfHoaCoeffs | This element contains information about the number of HOA coefficients defined in Table 1. |
| VvectorBits | This element contains information about the bit depth of a V-vector. |
| PriorityBits | This element contains information about the bit depth of HOA transport channel priority. |
| priorityOfTC[i] | This element contains information about the priority of an i-th transport channel (the channel with a lower priority value is more important, thus the channel with priorityOfTC[i] = 0 is the channel with the highest priority). |
| Vvector[i][j] | This element contains information about a vector element representing spatial information. Its value is bounded by $[-1, 1]$. |

In the foregoing syntax tables, Vvector[i][j] refers to the spatial component, where i identifies which transport channel, and j identifies which coefficient (by way of the order and sub-order of the spherical basis function to which the ambient HOA coefficient corresponds in the case when Vvector represents the repurposed spatial component).

The audio decoding device 24 (shown in the example of FIG. 2) may receive the bitstream 21 and obtain the HoaTransportType syntax element from the bitstream 21. Based on the HoaTransportType syntax element, the audio decoding device 24 may extract the various sound components and corresponding spatial components to render the speaker feeds in the manner described above in more detail.

Figure 11:
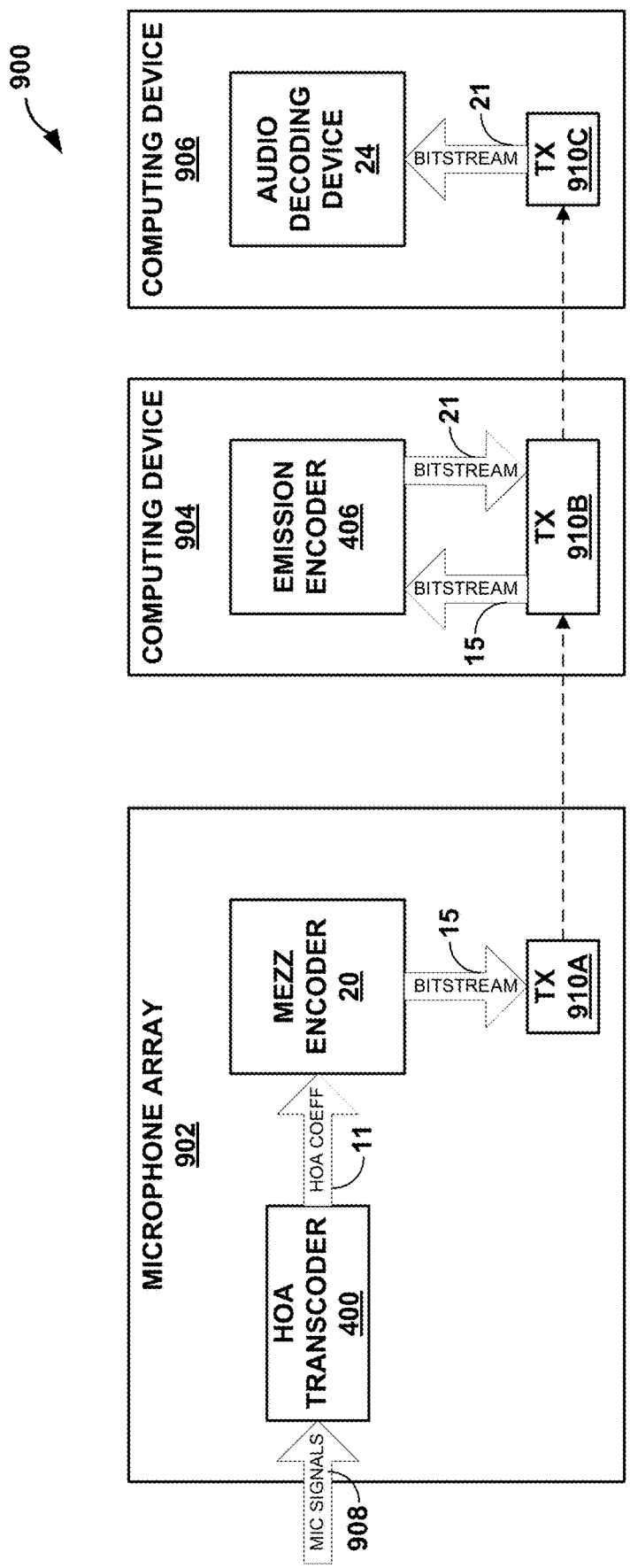
FIG. 11 is a block diagram illustrating a different system configured to perform various aspects of the techniques described in this disclosure.

FIG. 11 is a block diagram illustrating a different system configured to perform various aspects of the techniques described in this disclosure. In the example of FIG. 11, a system 900 includes a microphone array 902 and computing devices 904 and 906. The microphone array 902 may be similar, if not substantially similar, to the microphone array 5 described above with respect to the example of FIG. 2. The microphone array 902 includes the HOA transcoder 400 and the mezzanine encoder 20 discussed in more detail above.

The computing devices 904 and 906 may each represent one or more of a cellular phone (which may be interchangeably be referred to as a "mobile phone," or "mobile cellular handset" and where such cellular phone may including so-called "smart phones"), a tablet, a laptop, a personal digital assistant, a wearable computing headset, a watch (including a so-called "smart watch"), a gaming console, a portable gaming console, a desktop computer, a workstation, a server, or any other type of computing device. For purposes of illustration, each of the computing devices 904 and 906 is referred to a respective mobile phone 904 and 906. In any event, the mobile phone 904 may include the emission encoder 406, while the mobile phone 906 may include the audio decoding device 24.

The microphone array 902 may capture audio data in the form of microphone signals 908. The HOA transcoder 400 of the microphone array 902 may transcode the microphone signals 908 into the HOA coefficients 11, which the mezzanine encoder 20 (shown as "mezz encoder 20") may encode (or, in other words, compress) to form the bitstream 15 in the manner described above. The microphone array 902 may be coupled (either wirelessly or via a wired connection) to the mobile phone 904 such that the microphone array 902 may communicate the bitstream 15 via a transmitter and/or receiver (which may also be referred to as a transceiver, and abbreviated as "TX") 910A to the emission encoder 406 of the mobile phone 904. The microphone array 902 may include the transceiver 910A, which may represent hardware or a combination of hardware and software (such as firmware) configured to transmit data to another transceiver.

The emission encoder 406 may operate in the manner described above to generate the bitstream 21 conforming to the 3D Audio Coding Standard from the bitstream 15. The emission encoder 406 may include or be operatively coupled to a transceiver 910B (which is similar to if not substantially similar to transceiver 910A) configured to receive the bitstream 15. The emission encoder 406 may select the target bitrate, hoaIndependencyFlag syntax element, and the number of transport channels when generating the bitstream 21 from the received bitstream 15 (selecting the number of transport channels as the subset of transport channels according to the priority information). The emission encoder 406 may communicate (although not necessarily directly, meaning that such communication may have intervening devices, such as servers, or by way of dedicated non-transitory storage media, etc.) the bitstream 21 via the transceiver 910B to the mobile phone 906.

The mobile phone 906 may include transceiver 910C (which is similar to if not substantially similar to transceivers 910A and 910B) configured to receive the bitstream 21, whereupon the mobile phone 906 may invoke audio decoding device 24 to decode the bitstream 21 so as to recover the HOA coefficients 11'. Although not shown in FIG. 10 for ease of illustration purposes, the mobile phone 906 may render the HOA coefficients 11' to speaker feeds, and reproduce the soundfield via a speaker (e.g., a loudspeaker integrated into the mobile phone 906, a loudspeaker wirelessly coupled to the mobile phone 906, a loudspeaker coupled by wire to the mobile phone 906, or a headphone speaker coupled either wirelessly or via wired connection to the mobile phone 906) based on the speaker feeds. For reproducing the soundfield by way of headphone speakers (which again may be standalone headphones or headphones integrated into a headset), the mobile phone 906 may render binaural audio speaker feeds from either the loudspeaker feeds or directly from the HOA coefficients 11'.

Figure 12:
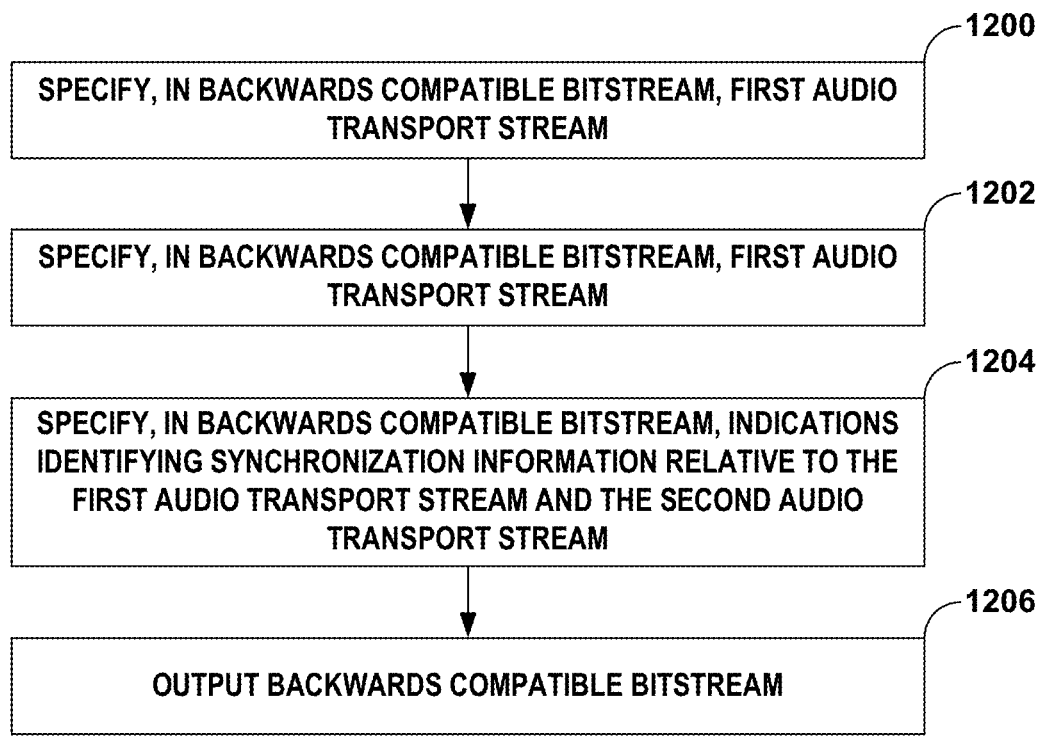
FIG. 12 is a flowchart illustrating example operation of the psychoacoustic audio encoding device of FIG. 2 in performing various aspects of the techniques described in this disclosure.

FIG. 12 is a flowchart illustrating example operation of the psychoacoustic audio encoding device of FIG. 2 in performing various aspects of the techniques described in this disclosure. The psychoacoustic audio encoding device 406 may specify, in the backwards compatible bitstream 21, the first audio transport stream 21A representative of first audio data (e.g., the legacy audio data 25B represented by ADTS frame 407A) (1200). The psychoacoustic audio encoding device 406 may also specify, in the backward compatible bitstream 21, the second audio transport stream 21B representative of second audio data (e.g., the extended audio data) (1202).

The psychoacoustic audio encoding device 406 may also specify, in accordance with various aspects of the techniques described in this disclosure, one or more indications identifying synchronization information relative to the first audio transport stream and the second audio transport stream (1204). The psychoacoustic audio encoding device 406 may output the bitstream 21 to the audio decoding device 24, as discussed in more detail above with respect to the example of FIG. 2 (1206).

Figure 13:
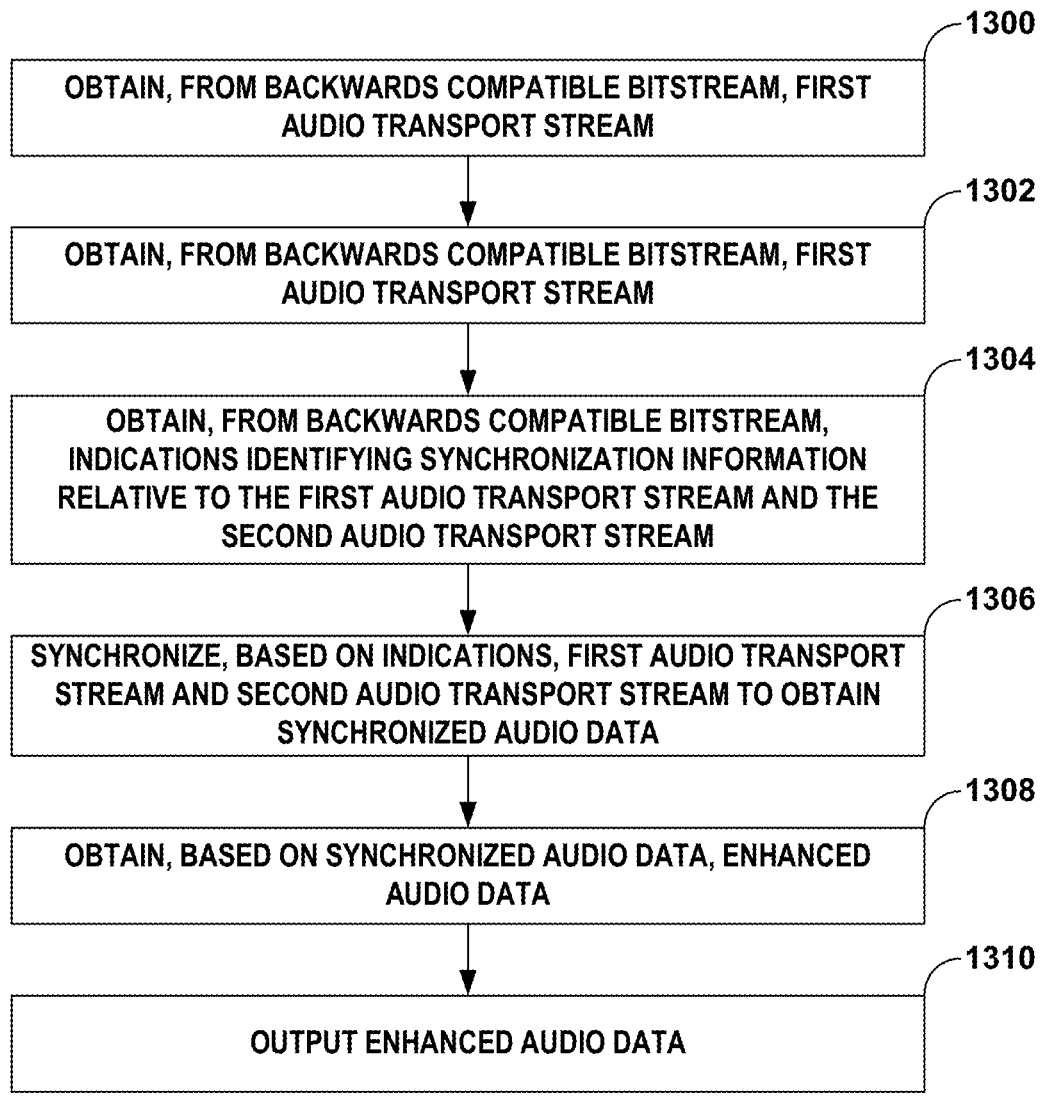
FIG. 13 is a flowchart illustrating example operation of the audio decoding device of FIG. 2 in performing various aspects of the techniques described in this disclosure.

FIG. 13 is a flowchart illustrating example operation of the audio decoding device of FIG. 2 in performing various aspects of the techniques described in this disclosure. The audio decoding device 24 may obtain, from the backwards compatible bitstream 21, the first audio transport stream and the second audio transport stream (1300, 1302). The audio decoding device 24 may next obtain, from the backwards compatible bitstream 21, the one or more indications representative of the synchronization information (e.g., the timestamps 370 and 372) for the first audio transport stream 21A and the second audio transport stream 21B (1304).

The psychoacoustic audio decoding device may next synchronize, based on the one or more timestamps 370 and 372, the first audio transport stream 21A and the second audio transport stream 21B to obtain synchronized audio data (1306). The audio decoding device 24 may then obtain, based on the synchronized audio data (1308), enhanced audio data, which the audio decoding device 24 may output to one or more of the speakers 3 (1310).

In addition, the foregoing techniques may be performed with respect to any number of different contexts and audio ecosystems and should not be limited to any of the contexts or audio ecosystems described above. A number of example contexts are described below, although the techniques should be limited to the example contexts. One example audio ecosystem may include audio content, movie studios, music studios, gaming audio studios, channel based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel based audio content (e.g., in 2.0, 5.1, and 7.1) such as by using a digital audio workstation (DAW). The music studios may output channel based audio content (e.g., in 2.0, and 5.1) such as by using a DAW. In either case, the coding engines may receive and encode the channel based audio content based one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel based audio content for output by the delivery systems. Another example context in which the techniques may be performed comprises an audio ecosystem that may include broadcast recording audio objects, professional audio systems, consumer on-device capture, HOA audio format, on-device rendering, consumer audio, TV, and accessories, and car audio systems.

The broadcast recording audio objects, the professional audio systems, and the consumer on-device capture may all code their output using HOA audio format. In this way, the audio content may be coded using the HOA audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.), such as audio playback system 16.

Other examples of context in which the techniques may be performed include an audio ecosystem that may include acquisition elements, and playback elements. The acquisition elements may include wired and/or wireless acquisition devices (e.g., Eigen microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device (such as a mobile communication handset) may be used to acquire a soundfield. For instance, the mobile device may acquire a soundfield via the wired and/or wireless acquisition devices and/or the on-device surround sound capture (e.g., a plurality of microphones integrated into the mobile device). The mobile device may then code the acquired soundfield into the HOA coefficients for playback by one or more of the playback elements. For instance, a user of the mobile device may record (acquire a soundfield of) a live event (e.g., a meeting, a conference, a play, a concert, etc.), and code the recording into HOA coefficients.

The mobile device may also utilize one or more of the playback elements to playback the HOA coded soundfield. For instance, the mobile device may decode the HOA coded soundfield and output a signal to one or more of the playback elements that causes the one or more of the playback elements to recreate the soundfield. As one example, the mobile device may utilize the wireless and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a set of headphones, e.g., to create realistic binaural sound.

In some examples, a particular mobile device may both acquire a 3D soundfield and playback the same 3D soundfield at a later time. In some examples, the mobile device may acquire a 3D soundfield, encode the 3D soundfield into HOA, and transmit the encoded 3D soundfield to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of HOA signals. For instance, the one or more DAWs may include HOA plugins and/or tools which may be configured to operate with (e.g., work with) one or more game audio systems. In some examples, the game studios may output new stem formats that support HOA. In any case, the game studios may output coded audio content to the rendering engines which may render a soundfield for playback by the delivery systems.

The techniques may also be performed with respect to exemplary audio acquisition devices. For example, the techniques may be performed with respect to an Eigen microphone which may include a plurality of microphones that are collectively configured to record a 3D soundfield. In some examples, the plurality of microphones of an Eigen microphone may be located on the surface of a substantially spherical ball with a radius of approximately 4 cm. In some examples, the audio encoding device 20 may be integrated into the Eigen microphone so as to output a bitstream 21 directly from the microphone.

Another exemplary audio acquisition context may include a production truck which may be configured to receive a signal from one or more microphones, such as one or more Eigen microphones. The production truck may also include an audio encoder.

The mobile device may also, in some instances, include a plurality of microphones that are collectively configured to record a 3D soundfield. In other words, the plurality of microphones may have X, Y, Z diversity. In some examples, the mobile device may include a microphone which may be rotated to provide X, Y, Z diversity with respect to one or more other microphones of the mobile device. The mobile device may also include an audio encoder.

A ruggedized video capture device may further be configured to record a 3D soundfield. In some examples, the ruggedized video capture device may be attached to a helmet of a user engaged in an activity. For instance, the ruggedized video capture device may be attached to a helmet of a user whitewater rafting. In this way, the ruggedized video capture device may capture a 3D soundfield that represents the action all around the user (e.g., water crashing behind the user, another rafter speaking in front of the user, etc.).

The techniques may also be performed with respect to an accessory enhanced mobile device, which may be configured to record a 3D soundfield. In some examples, the mobile device may be similar to the mobile devices discussed above, with the addition of one or more accessories. For instance, an Eigen microphone may be attached to the above noted mobile device to form an accessory enhanced mobile device. In this way, the accessory enhanced mobile device may capture a higher quality version of the 3D soundfield than just using sound capture components integral to the accessory enhanced mobile device.

Example audio playback devices that may perform various aspects of the techniques described in this disclosure are further discussed below. In accordance with one or more techniques of this disclosure, speakers and/or sound bars may be arranged in any arbitrary configuration while still playing back a 3D soundfield. Moreover, in some examples, headphone playback devices may be coupled to a decoder 24 via either a wired or a wireless connection. In accordance with one or more techniques of this disclosure, a single generic representation of a soundfield may be utilized to render the soundfield on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a soundfield may be utilized to render the soundfield on any of the foregoing playback environments. Additionally, the techniques of this disclosure enable a rendered to render a soundfield from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the 3D soundfield of the sports game may be acquired (e.g., one or more Eigen microphones may be placed in and/or around the baseball stadium), HOA coefficients corresponding to the 3D soundfield may be obtained and transmitted to a decoder, the decoder may reconstruct the 3D soundfield based on the HOA coefficients and output the reconstructed 3D soundfield to a renderer, and the renderer may obtain an indication as to the type of playback environment (e.g., headphones), and render the reconstructed 3D soundfield into signals that cause the headphones to output a representation of the 3D soundfield of the sports game.

In each of the various instances described above, it should be understood that the audio encoding device 20 may perform a method or otherwise comprise means to perform each step of the method for which the audio encoding device 20 is configured to perform In some instances, the means may comprise one or more processors, e.g., formed by fixed-function processing circuitry, programmable processing circuitry or a combination thereof. In some instances, the one or more processors (which may be denoted as "processor(s)") may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the audio encoding device 20 has been configured to perform.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

Likewise, in each of the various instances described above, it should be understood that the audio decoding device 24 may perform a method or otherwise comprise means to perform each step of the method for which the audio decoding device 24 is configured to perform. In some instances, the means may comprise one or more processors, e.g., formed by fixed-function processing circuitry, programmable processing circuitry or a combination thereof. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the audio decoding device 24 has been configured to perform.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), processing circuitry (including fixed function circuitry and/or programmable processing circuitry), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

As such, various aspects of the techniques may enable one or more devices to operate in accordance with the following clauses.

Clause 29C. A device configured to process a backward compatible bitstream conforming to a legacy transport format, the device comprising: means for obtaining, from the backward compatible bitstream, a first audio transport stream representative of first audio data; means for obtaining, from the backward compatible bitstream, a second audio transport stream representative of second audio data; means for obtaining, from the backward compatible bitstream, one or more indications identifying synchronization information for one or more of the first audio transport stream and the second audio transport stream; means for synchronizing, based on the one or more indications of the synchronization information, the first audio transport stream and the second audio transport to obtain synchronized audio data stream; means for obtaining, based the synchronized audio data, enhanced audio data; and means for outputting the enhanced audio data to one or more speakers.

Clause 30C. The device of clause 29C, wherein the first audio data comprises legacy audio data that conforms to a legacy audio format.

Clause 31C. The device of clause 30C, wherein legacy audio format comprises one of a monophonic audio format, or a stereo audio format.

Clause 32C. The device of any combination of clauses 29C-31C, wherein the second audio data comprises extended audio data that enhances the legacy audio data to obtain enhanced audio data conforming to an enhanced audio format.

Clause 33C. The device of clause 18C, wherein the enhanced audio format comprises one of a 7.1 surround sound format and a 7.1+4H surround sound format.

Clause 34C. The device of any combination of clauses 29C-33C, wherein the synchronization information comprises: a first timestamp associated with each of one or more first portions of the first audio transport stream; and a second timestamp associated with each of one or more second portions of the second audio transport stream, and wherein the means for synchronizing the first audio transport stream and the second audio transport comprises means for synchronizing, based on the first timestamps and the second timestamps, each of the one or more first portion of the first audio transport stream and the one or more second portion of the second audio transport stream.

Clause 35C. The device of clause 34C, wherein the first portions include first audio frames, and wherein the second portions include second audio frames.

Clause 36C. The device of any combination of clauses 34C and 35C, wherein each of the first timestamp and the second timestamp is an eight-bit integer that repeats cyclically.

Clause 37C. The device of any combination of clauses 29C-36C, further comprising means for receiving, via a transport layer protocol that provides coarse alignment between the first audio transport stream and the second audio transport stream, the backward compatible bitstream.

38C. The device of any combination of clauses 29C-37C, wherein the legacy transport format comprises a psychoacoustic codec transport format.

Clause 39C. The device of clause 38C, wherein the psychoacoustic codec transport format comprises an Advanced Audio Coding (AAC) transport format or an AptX transport format.

Clause 40C. The device of any combination of clauses 29C-38C, wherein the legacy audio format comprises an Advanced Audio Coding transport format, and wherein the means for obtaining the extended audio data comprises means for obtaining the extended audio data from one or more fill elements specified in accordance with the Advanced Audio Coding transport format or an AptX transport format.

Clause 41C. The device of any combination of clauses 29C-40C, wherein the extended audio data represents higher order ambisonic audio data.

Clause 42C. The device of any combination of clauses 29C-40C, wherein the second audio data comprises second higher order ambisonic audio data, and wherein the means for obtaining the enhanced audio data comprises: means for de-mixing the first audio data to obtain first higher order ambisonic audio data; and means for rendering, based on the first higher order ambisonic audio data and the second higher order ambisonic audio data, the enhanced audio data conforming to an enhanced audio format.

Clause 43C. A non-transitory computer-readable storage medium having stored thereon instructions that, when executed, cause one or more processors to: obtain, from a backward compatible bitstream conforming to a legacy transport format, a first audio transport stream representative of first audio data; obtain, from the backward compatible bitstream, a second audio transport stream representative of second audio data; obtain, from the backward compatible bitstream, one or more indications identifying synchronization information for one or more of the first audio transport stream and the second audio transport stream; synchronize, based on the one or more indications of the synchronization information, the first audio transport stream and the second audio transport to obtain synchronized audio data stream; obtain, based the synchronized audio data, enhanced audio data; and output the enhanced audio data to one or more speakers.

Clause 1D. A device configured to obtain a backward compatible bitstream, the device comprising: one or more memories configured to store at least a portion of the backward compatible bitstream, the backward compatible bitstream conforming to a legacy transport format; and one or more processors configured to: specify, in the backward compatible bitstream, a first audio transport stream representative of first audio data; specify, in the backward compatible bitstream, a second audio transport stream representative of second audio data; specify, in the backward compatible bitstream, one or more indications identifying synchronization information relative to the first audio transport stream and the second audio transport stream; and output the backward compatible bitstream.

Clause 2D. The device of clause 1D, wherein the first audio data comprises legacy audio data that conforms to a legacy audio format.

Clause 3D. The device of clause 2D, wherein legacy audio format comprises one of a monophonic audio format, or a stereo audio format.

Clause 4D. The device of any combination of clauses 1D-3D, wherein the second audio data comprises extended audio data that enhanced the first audio data to obtain enhanced audio data that conform to an enhanced audio format.

Clause 5D. The device of clause 4D, wherein the enhanced audio format comprises one of a 7.1 surround sound format and a 7.1+4H surround sound format.

Clause 6D. The device of any combination of clauses 1D-5D, wherein the synchronization information comprises: a first timestamp associated with each of one or more first portions of the first audio transport stream; and a second timestamp associated with each of one or more second portions of the second audio transport stream.

Clause 7D. The device of clause 6D, wherein the first portions include first audio frames, and wherein the second portions include second audio frames.

Clause 8D. The device of any combination of clauses 6D and 7D, wherein each of the first timestamp and the second timestamp is an eight-bit integer that repeats cyclically.

Clause 9D. The device of any combination of clauses 1D-8D, wherein the one or more processors are configured to output, via a transport layer protocol that provides coarse alignment between the first audio transport stream and the second audio transport stream, the backward compatible bitstream.

Clause 10D. The device of any combination of clauses 1D-9D, wherein the legacy transport format comprises a psychoacoustic codec transport format.

Clause 11D. The device of clause 10D, wherein the psychoacoustic codec transport format comprises an Advanced Audio Coding (AAC) transport format or an AptX transport format.

Clause 12D. The device of any combination of clauses 1D-10D, wherein the legacy audio format comprises an Advanced Audio Coding transport format or an AptX transport format, and wherein the one or more processors are configured to specify the extended audio data as one or more fill elements in accordance with the Advanced Audio Coding transport format or an AptX transport format.

Clause 13D. The device of any combination of clauses 1D-12D, wherein the second audio data represents higher order ambisonic audio data.

Clause 14D. A method of obtaining a backward compatible bitstream conforming to a legacy transport format, the method comprising: specifying, in the backward compatible bitstream, a first audio transport stream representative of first audio data; specifying, in the backward compatible bitstream, a second audio transport stream representative of second audio data; specifying, in the backward compatible bitstream, one or more indications identifying synchronization information relative to the first audio transport stream and the second audio transport stream; and outputting the backward compatible bitstream.

Clause 15D. The method of clause 14D, wherein the first audio data comprises legacy audio data that conforms to a legacy audio format.

Clause 16D. The method of clause 15D, wherein legacy audio format comprises one of a monophonic audio format, or a stereo audio format.

Clause 17D. The method of any combination of clauses 14D-16D, wherein the second audio data comprises extended audio data that enhanced the first audio data to obtain enhanced audio data that conform to an enhanced audio format.

Clause 18D. The method of clause 17D, wherein the enhanced audio format comprises one of a 7.1 surround sound format and a 7.1+4H surround sound format.

Clause 19D. The method of any combination of clauses 14D-18D, wherein the synchronization information comprises: a first timestamp associated with each of one or more first portions of the first audio transport stream; and a second timestamp associated with each of one or more second portions of the second audio transport stream.

Clause 20D. The method of clause 19D, wherein the first portions include first audio frames, and wherein the second portions include second audio frames.

Clause 21D. The method of any combination of clauses 19D and 20D, wherein each of the first timestamp and the second timestamp is an eight-bit integer that repeats cyclically.

Clause 22D. The method of any combination of clauses 14D-21D, wherein outputting the backward compatible bitstream comprises outputting, via a transport layer protocol that provides coarse alignment between the first audio transport stream and the second audio transport stream, the backward compatible bitstream.

Clause 23D. The method of any combination of clauses 14D-22D, wherein the legacy transport format comprises a psychoacoustic codec transport format.

Clause 24D. The method of clause 23D, wherein the psychoacoustic codec transport format comprises an Advanced Audio Coding (AAC) transport format or an AptX transport format.

Clause 25D. The method of any combination of clauses 14D-23D, wherein the legacy audio format comprises an Advanced Audio Coding transport format or an AptX transport format, and wherein specifying the extended audio data comprises specifying the extended audio data as one or more fill elements in accordance with the Advanced Audio Coding transport format or an AptX transport format.

Clause 26D. The method of any combination of clauses 14D-25D, wherein the second audio data represents higher order ambisonic audio data.

Clause 27D. A device configured to obtain a backward compatible bitstream conforming to a legacy transport format, the device comprising: means for specifying, in the backward compatible bitstream, a first audio transport stream representative of first audio data; means for specifying, in the backward compatible bitstream, a second audio transport stream representative of second audio data; means for specifying, in the backward compatible bitstream, one or more indications identifying synchronization information relative to the first audio transport stream and the second audio transport stream; and means for outputting the backward compatible bitstream.

Clause 28D. The device of clause 27D, wherein the first audio data comprises legacy audio data that conforms to a legacy audio format.

Clause 29D. The device of clause 28D, wherein legacy audio format comprises one of a monophonic audio format, or a stereo audio format.

Clause 30D. The device of any combination of clauses 27D-29D, wherein the second audio data comprises extended audio data that enhanced the first audio data to obtain enhanced audio data that conform to an enhanced audio format.

Clause 31D. The device of clause 30D, wherein the enhanced audio format comprises one of a 7.1 surround sound format and a 7.1+4H surround sound format.

Clause 32D. The device of any combination of clauses 27D-31D, wherein the synchronization information comprises: a first timestamp associated with each of one or more first portions of the first audio transport stream; and a second timestamp associated with each of one or more second portions of the second audio transport stream.

Clause 33D. The device of clause 32D, wherein the first portions include first audio frames, and wherein the second portions include second audio frames.

Clause 34D. The device of any combination of clauses 32D and 33D, wherein each of the first timestamp and the second timestamp is an eight-bit integer that repeats cyclically.

Clause 35D. The device of any combination of clauses 27D-34D, wherein the means for outputting the backward compatible bitstream comprises means for outputting, via a transport layer protocol that provides coarse alignment between the first audio transport stream and the second audio transport stream, the backward compatible bitstream.

Clause 36D. The device of any combination of clauses 27D-35D, wherein the legacy transport format comprises a psychoacoustic codec transport format.

Clause 37D. The device of clause 36D, wherein the psychoacoustic codec transport format comprises an Advanced Audio Coding (AAC) transport format or an AptX transport format.

Clause 38D. The device of any combination of clauses 27D-36D, wherein the legacy audio format comprises an Advanced Audio Coding transport format or an AptX transport format, and wherein the means for specifying the extended audio data comprises means for specifying the extended audio data as one or more fill elements in accordance with the Advanced Audio Coding transport format or the AptX transport format.

Clause 39D. The device of any combination of clauses 27D-38D, wherein the second audio data represents higher order ambisonic audio data.

Clause 40D. A non-transitory computer-readable storage medium having stored thereon instructions that, when executed, cause one or more processors to: specify, in a backward compatible bitstream conforming to a legacy transport format, a first audio transport stream representative of first audio data; specify, in the backward compatible bitstream, a second audio transport stream representative of second audio data; specify, in the backward compatible bitstream, one or more indications identifying synchronization information relative to the first audio transport stream and the second audio transport stream; and output the backward compatible bitstream.

Moreover, as used herein, "A and/or B" means "A or B", or both "A and B."

Various aspects of the techniques have been described. These and other aspects of the techniques are within the scope of the following claims.

What is claimed is:

1. A method of processing a backward compatible bitstream conforming to a legacy transport format, the method comprising:
    obtaining, from the backward compatible bitstream, a first audio transport stream representative of first audio data;
    obtaining, from the backward compatible bitstream, a second audio transport stream representative of second audio data;
    obtaining, from the backward compatible bitstream, one or more indications identifying synchronization information for one or more of the first audio transport stream and the second audio transport stream, wherein the synchronization information comprises: a first timestamp associated with each of one or more first portions of the first audio transport stream; and a second timestamp associated with each of one or more second portions of the second audio transport stream, and wherein each of the first timestamp and the second timestamp is an eight-bit integer that repeats cyclically;
    synchronizing, based on the first timestamps and the second timestamps, each of the one or more first portion of the first audio transport stream and the one or more second portion of the second audio transport stream to obtain a single synchronized audio data stream;
    obtaining, based on the single synchronized audio data stream, enhanced audio data; and
    outputting the enhanced audio data to one or more speakers.

2. The method of claim 1, wherein the first audio data comprises legacy audio data that conforms to the legacy audio format.

3. The method of claim 2, wherein legacy audio format comprises one of a monophonic audio format, or a stereo audio format.

4. The method of claim 2,
    wherein the second audio data comprises extended audio data that enhances the legacy audio data to obtain the enhanced audio data conforming to an enhanced audio format.

5. The method of claim 4, wherein the enhanced audio format comprises one of a 7.1 surround sound format and a 7.1+4H surround sound format.

6. The method of claim 1,
    wherein the first portions include first audio frames, and
    wherein the second portions include second audio frames.

7. The method of claim 1, further comprising receiving, via a transport layer protocol that provides coarse alignment between the first audio transport stream and the second audio transport stream, the backward compatible bitstream.

8. The method of claim 1, wherein the legacy transport format comprises a psychoacoustic codec transport format.

9. The method of claim 8, wherein the psychoacoustic codec transport format comprises an Advanced Audio Coding (AAC) transport format or an AptX transport format.

10. The method of claim 1,
    wherein the legacy audio format comprises an Advanced Audio Coding transport format or an AptX transport format, and
    wherein obtaining the enhanced audio data comprises obtaining the enhanced audio data from one or more fill elements specified in accordance with the Advanced Audio Coding transport format or the AptX transport format.

11. The method of claim 1, wherein the enhanced audio data represents higher order ambisonic audio data.

12. The method of claim 1,
    wherein the second audio data comprises second higher order ambisonic audio data, and
    wherein obtaining the enhanced audio data comprises:
    de-mixing the first audio data to obtain first higher order ambisonic audio data; and
    rendering, based on the first higher order ambisonic audio data and the second higher order ambisonic audio data, the enhanced audio data conforming to an enhanced audio format.

13. The method of claim 1, wherein synchronizing each of the one or more first portion of the first audio transport stream and the second portion of the audio transport stream comprises synchronizing, based on the first timestamps and the second timestamps and prior to performing transport format decoding with respect to either of the first audio data and the second audio data, each of the one or more first portion of the first audio transport stream and the one or more second portion of the second audio transport stream to obtain the single synchronized audio data stream.

14. A method of obtaining a backward compatible bitstream conforming to a legacy transport format, the method comprising:
    specifying, in the backward compatible bitstream, a first audio transport stream representative of first audio data;
    specifying, in the backward compatible bitstream, a second audio transport stream representative of second audio data;
    specifying, in the backward compatible bitstream, one or more indications identifying synchronization information relative to the first audio transport stream and the second audio transport stream, wherein the synchronization information comprises: a first timestamp associated with each of one or more first portions of the first audio transport stream; and a second timestamp associated with each of one or more second portions of the second audio transport stream, and wherein each of the first timestamp and the second timestamp is an eight-bit integer that repeats cyclically; and
    outputting the backward compatible bitstream.

15. A device configured to process a backward compatible bitstream, the device comprising:

one or more memories configured to store at least a portion of the backward compatible bitstream, the backward compatible bitstream conforming to a legacy transport format; and one or more processors configured to:

obtain, from the backward compatible bitstream, a first audio transport stream representative of first audio data;

obtain, from the backward compatible bitstream, a second audio transport stream representative of second audio data;

obtain, from the backward compatible bitstream, one or more indications representative of synchronization information for one or more of the first audio transport stream and the second audio transport stream, wherein the synchronization information comprises: a first timestamp associated with each of one or more first portions of the first audio transport stream; and a second timestamp associated with each of one or more second portions of the second audio transport stream, and wherein each of the first timestamp and the second timestamp is an eight-bit integer that repeats cyclically;

synchronize, based on the first timestamps and the second timestamps, each of the one or more first portion of the first audio transport stream and the one or more second portion of the second audio transport stream to obtain a single synchronized audio data stream;

obtain, based on the single synchronized audio data stream, enhanced audio data; and output the enhanced audio data to one or more speakers.

16. The device of claim 15, wherein the first audio data comprises legacy audio data that conforms to a legacy audio format.

17. The device of claim 16, wherein legacy audio format comprises one of a monophonic audio format, or a stereo audio format.

18. The device of claim 16, wherein the second audio data comprises extended audio data that enhances the legacy audio data to obtain enhanced audio data conforming to an enhanced audio format.

19. The device of claim 18, wherein the enhanced audio format comprises one of a 7.1 surround sound format and a 7.1+4H surround sound format.

20. The device of claim 15, wherein the first portions include first audio frames, and wherein the second portions include second audio frames.

21. The device of claim 15, wherein the one or more processors are further configured to receive, via a transport layer protocol that provides coarse alignment between the first audio transport stream and the second audio transport stream, the backward compatible bitstream.

22. The device of claim 15, wherein the legacy transport format comprises a psychoacoustic codec transport format.

23. The device of claim 22, wherein the psychoacoustic codec transport format comprises an Advanced Audio Coding (AAC) transport format or an AptX transport format.

24. The device of claim 1,
wherein the legacy transport format comprises an Advanced Audio Coding transport format or an AptX transport format, and
wherein the one or more processors are configured to obtain the enhanced audio data from one or more fill elements specified in accordance with the Advanced Audio Coding transport format or the AptX transport format.

25. The device of claim 15, wherein the enhanced audio data represents higher order ambisonic audio data.

26. The device of claim 15,
wherein the one or more processors are configured to de-mix the first audio data to obtain first higher order ambisonic audio data,
wherein the second audio data comprises second higher order ambisonic audio data, and
wherein the one or more processors are configured to render, based on the first higher order ambisonic audio data and the second higher order ambisonic audio data, enhanced audio data conforming to an enhanced audio format.

27. The device of claim 15, wherein the one or more processors are configured to synchronize, based on the first timestamps and the second timestamps and prior to performing transport format decoding with respect to either of the first audio data and the second audio data, each of the one or more first portion of the first audio transport stream and the one or more second portion of the second audio transport stream to obtain the single synchronized audio data stream.

28. A device configured to obtain a backward compatible bitstream, the device comprising:

one or more memories configured to store at least a portion of the backward compatible bitstream, the backward compatible bitstream conforming to a legacy transport format; and one or more processors configured to:

specify, in the backward compatible bitstream, a first audio transport stream representative of first audio data;

specify, in the backward compatible bitstream, a second audio transport stream representative of second audio data;

specify, in the backward compatible bitstream, one or more indications identifying synchronization information relative to the first audio transport stream and the second audio transport stream, wherein the synchronization information comprises: a first timestamp associated with each of one or more first portions of the first audio transport stream; and a second timestamp associated with each of one or more second portions of the second audio transport stream, and wherein each of the first timestamp and the second timestamp is an eight-bit integer that repeats cyclically; and output the backward compatible bitstream.

* * * * *